(12) United States Patent
Skinner et al.

(10) Patent No.: US 8,052,145 B2
(45) Date of Patent: Nov. 8, 2011

(54) DOCUMENT HANDLING APPARATUS

(75) Inventors: John A. Skinner, Havant (GB); Simon G. Calverley, Waterlooville (GB); David A. Brooks, Waterlooville (GB)

(73) Assignee: De La Rue International Limited, Basingstoke (GB)

( * ) Notice: Subject to any disclaimer, the term of this patent is extended or adjusted under 35 U.S.C. 154(b) by 171 days.

(21) Appl. No.: 12/308,751

(22) PCT Filed: Jun. 25, 2007

(86) PCT No.: PCT/GB2007/002356
§ 371 (c)(1),
(2), (4) Date: Mar. 10, 2009

(87) PCT Pub. No.: WO2008/001056
PCT Pub. Date: Jan. 3, 2008

(65) Prior Publication Data
US 2009/0278307 A1    Nov. 12, 2009

Related U.S. Application Data

(60) Provisional application No. 60/899,382, filed on Feb. 5, 2007.

(30) Foreign Application Priority Data

Jun. 28, 2006 (GB) .................................. 0612856.5

(51) Int. Cl.
*B65H 5/02* (2006.01)
(52) U.S. Cl. ......... 271/273; 271/262; 271/264; 271/272
(58) Field of Classification Search .................. 271/273, 271/264, 262
See application file for complete search history.

(56) References Cited

U.S. PATENT DOCUMENTS

| | | | |
|---|---|---|---|
| 4,255,651 A | 3/1981 | Phillips | |
| 4,398,711 A * | 8/1983 | Horst et al. | 271/263 |
| 4,420,151 A * | 12/1983 | Kobayashi | 271/263 |
| 4,614,867 A | 9/1986 | Lane | |
| 4,650,991 A * | 3/1987 | Croset et al. | 250/223 R |
| 4,684,119 A * | 8/1987 | Lane | 271/4.1 |
| 4,707,598 A * | 11/1987 | Croset et al. | 250/223 R |
| 4,748,481 A | 5/1988 | Kunihiro | |
| 4,919,747 A * | 4/1990 | Eagle | 156/497 |
| 5,029,845 A * | 7/1991 | Simpson-Davis | 271/262 |
| 5,203,555 A * | 4/1993 | Cannaverde et al. | 271/263 |
| 5,341,408 A | 8/1994 | Melcher et al. | |
| 5,430,664 A | 7/1995 | Cargill et al. | |

(Continued)

FOREIGN PATENT DOCUMENTS

DE    653947    12/1937

(Continued)

*Primary Examiner* — Stefanos Karmis
*Assistant Examiner* — Howard Sanders
(74) *Attorney, Agent, or Firm* — Oliff & Berridge, PLC

(57) ABSTRACT

A document handling apparatus is disclosed which is particularly well adapted for counting documents of value, such as banknotes. The document handling apparatus comprises an input module for receiving a stack of documents and feeding them one by one into the apparatus, a detector box which houses a series of detectors for detecting characteristics of the documents, a transport system for conveying documents within the apparatus, a doubles detector for sensing the passage of each document therethrough and a stacker module for stacking the output documents and presenting them to the user. The apparatus is based on a metal framework in a plastics housing.

15 Claims, 27 Drawing Sheets

U.S. PATENT DOCUMENTS

| | | | |
|---|---|---|---|
| 5,435,540 A * | 7/1995 | Martin et al. | 271/122 |
| 5,673,910 A * | 10/1997 | Wamsley | 271/259 |
| 6,000,693 A * | 12/1999 | Tranquilla | 271/263 |
| 6,573,983 B1 | 6/2003 | Laskowski | |
| 6,666,375 B1 | 12/2003 | Harriman et al. | |
| 6,817,611 B2 * | 11/2004 | DiRamio | 271/273 |

FOREIGN PATENT DOCUMENTS

| | | |
|---|---|---|
| DE | 810545 | 8/1951 |
| DE | 37 10 624 C1 | 10/1988 |
| DE | 40 41 429 A1 | 7/1991 |
| DE | 4 343 158 C1 | 6/1995 |
| EP | 0 130 824 A2 | 1/1985 |
| EP | 0 130 825 A2 | 1/1985 |
| EP | 0 168 202 A1 | 1/1986 |
| EP | 0 206 675 A2 | 12/1986 |
| EP | 0 368 433 A1 | 5/1990 |
| EP | 0 451 882 A2 | 10/1991 |
| EP | 0 698 366 A1 | 2/1996 |
| EP | 0 776 845 A1 | 6/1997 |
| EP | 1 221 679 A1 | 7/2002 |
| EP | 1 241 637 A2 | 9/2002 |
| EP | 1 254 435 B1 | 11/2002 |
| EP | 1 346 934 A1 | 9/2003 |
| EP | 1 353 301 A2 | 10/2003 |
| EP | 1 353 302 A2 | 10/2003 |
| FR | 2 108 495 | 5/1972 |
| GB | 2 106 081 A | 4/1983 |
| GB | 2 224 086 A | 4/1990 |
| JP | 03-058773 | 6/1991 |
| JP | 04-024537 | 2/1992 |
| JP | 06-073944 | 3/1994 |
| JP | 2000-161345 | 6/2000 |
| JP | 2003-032853 | 1/2003 |
| WO | WO 99/48040 | 9/1999 |
| WO | WO 00/58916 | 10/2000 |
| WO | WO 01/64368 A1 | 9/2001 |
| WO | WO 02/075671 A1 | 9/2002 |
| WO | WO 03/030107 A2 | 4/2003 |
| WO | WO 2005/109354 A | 11/2005 |
| WO | WO 2005/118443 A2 | 12/2005 |

* cited by examiner

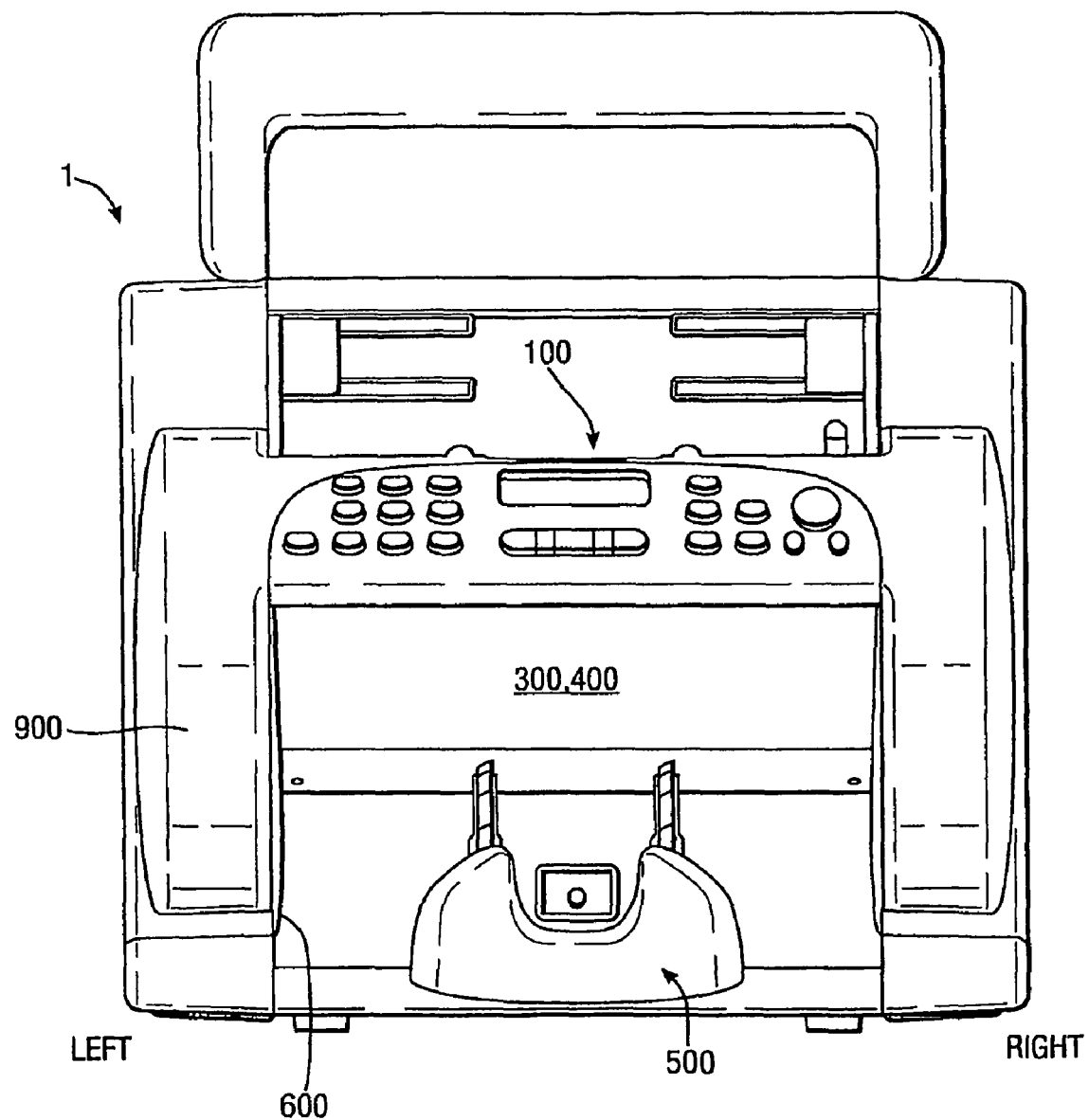
Fig.(i).

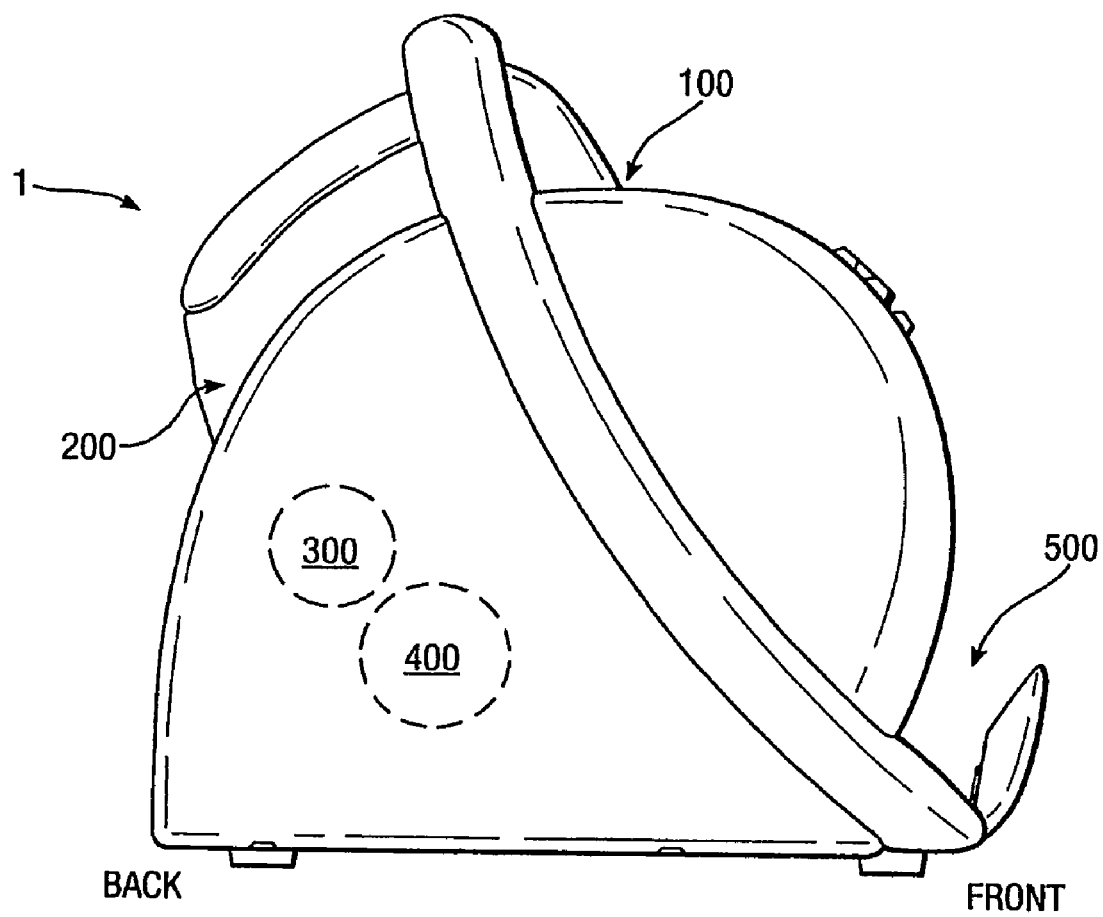

Fig.1B.
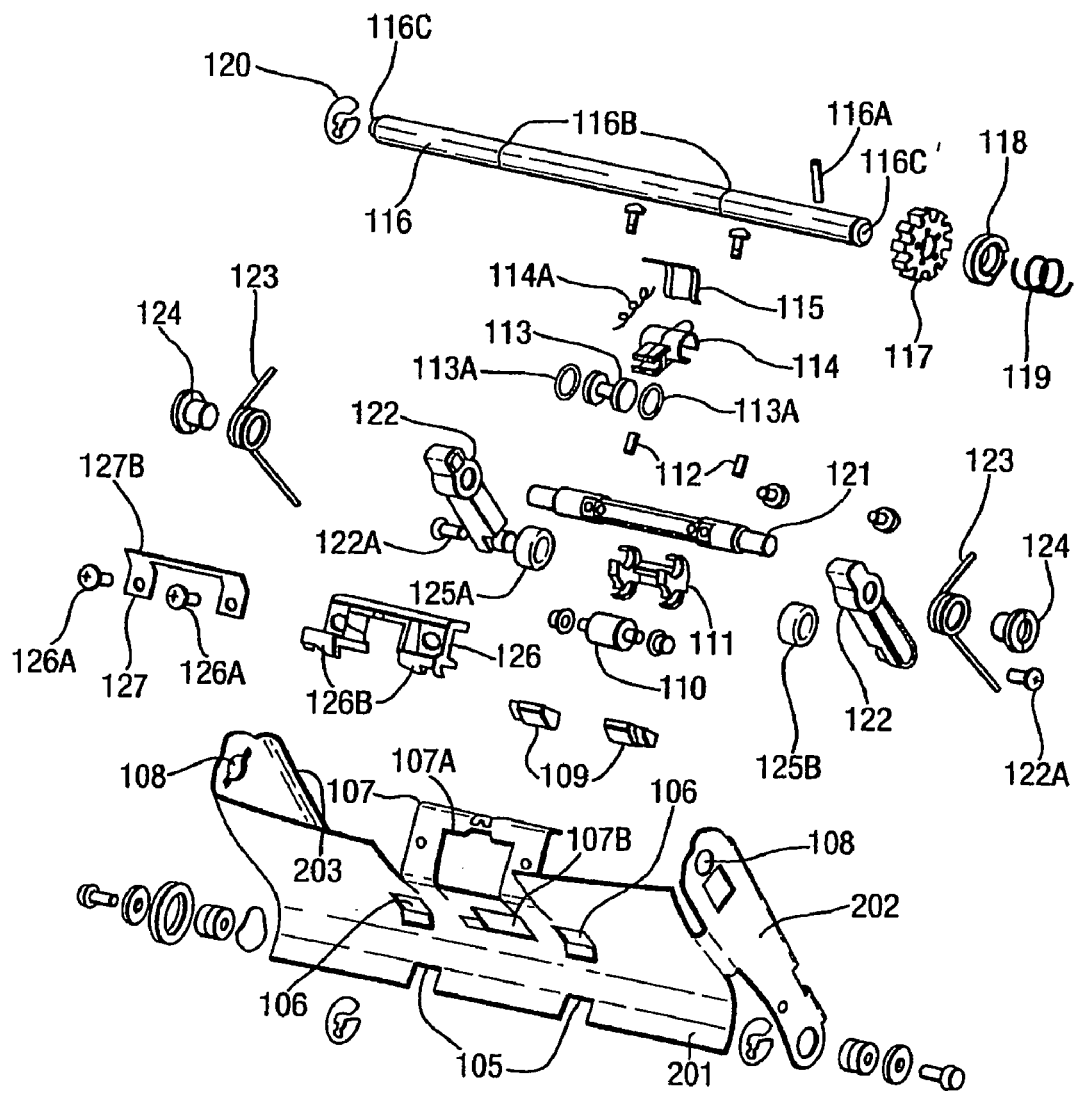
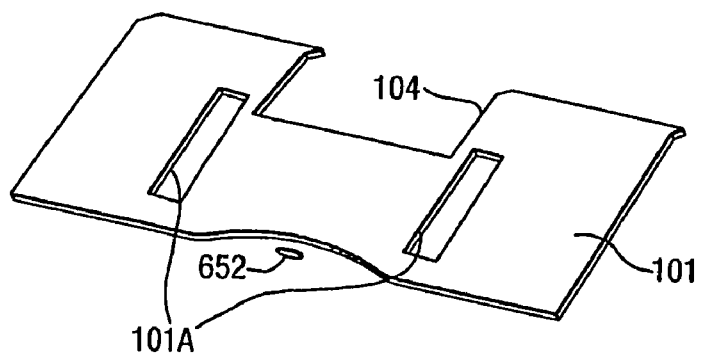

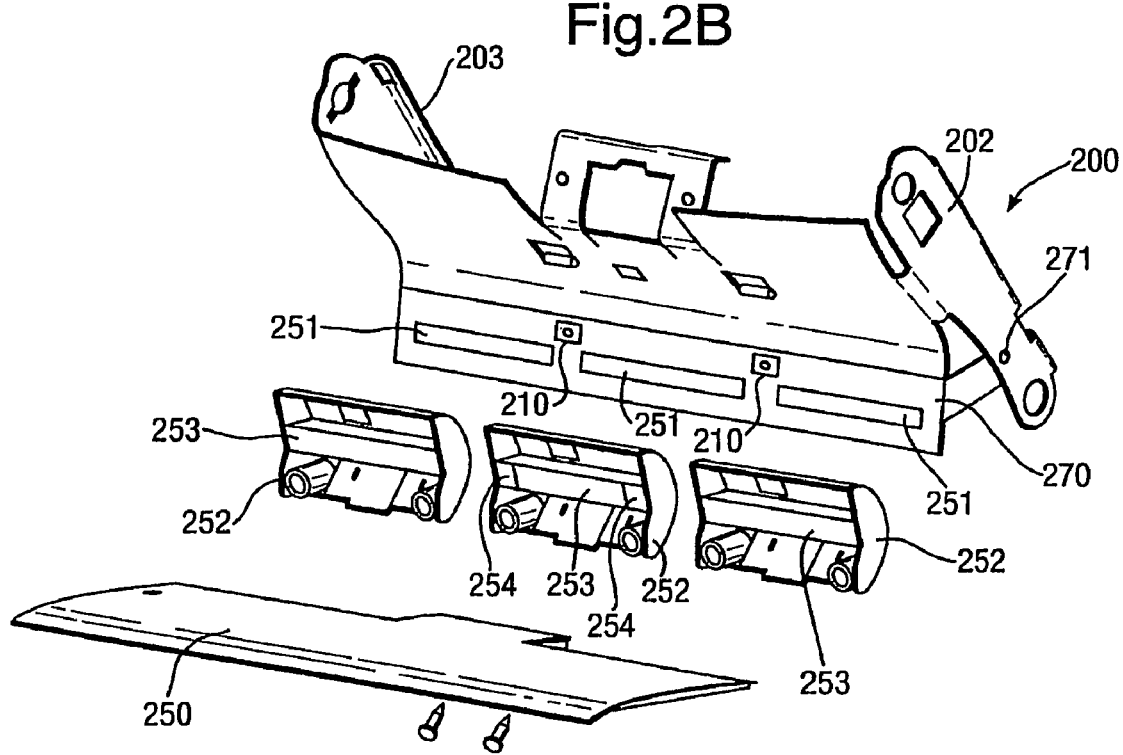

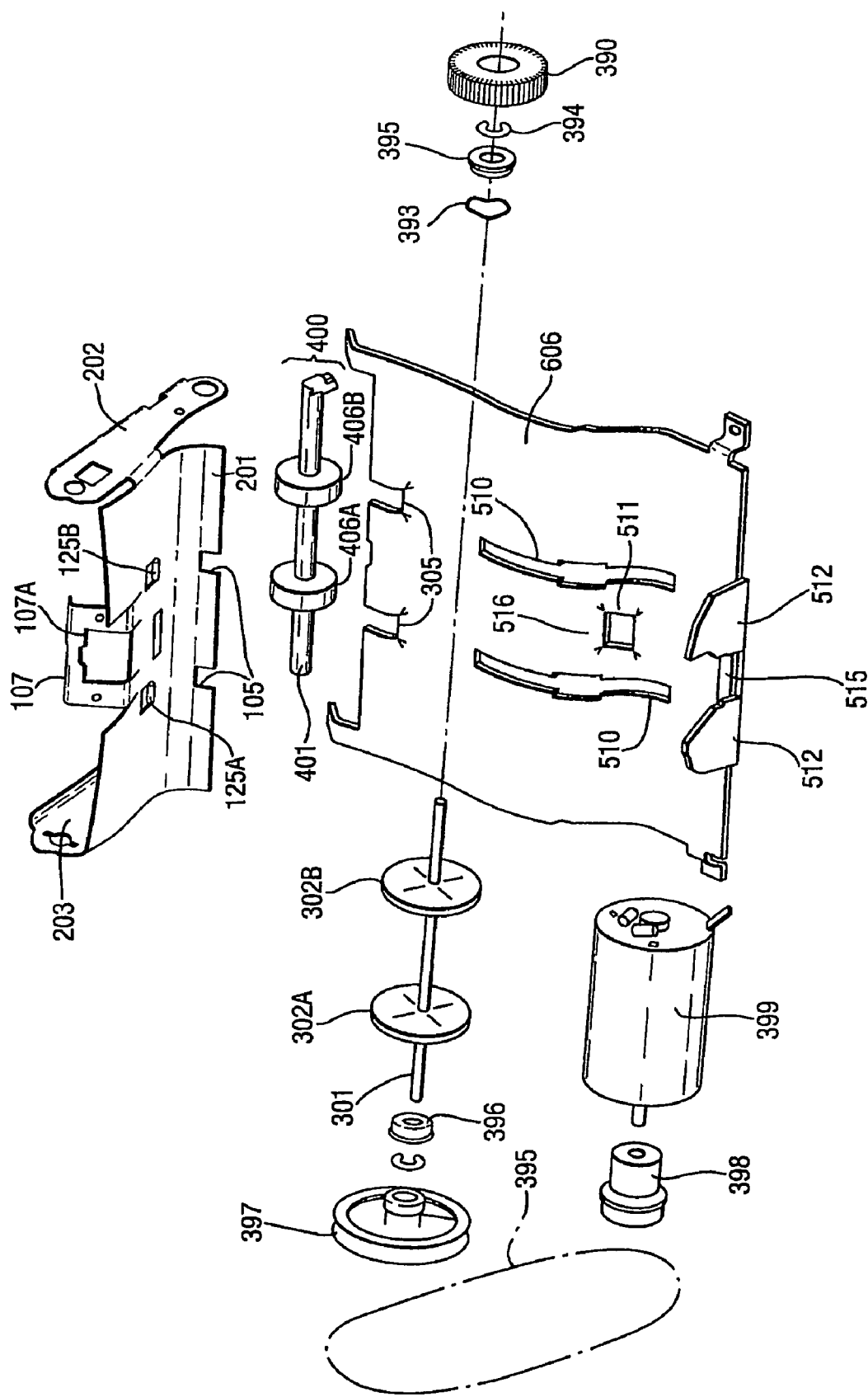

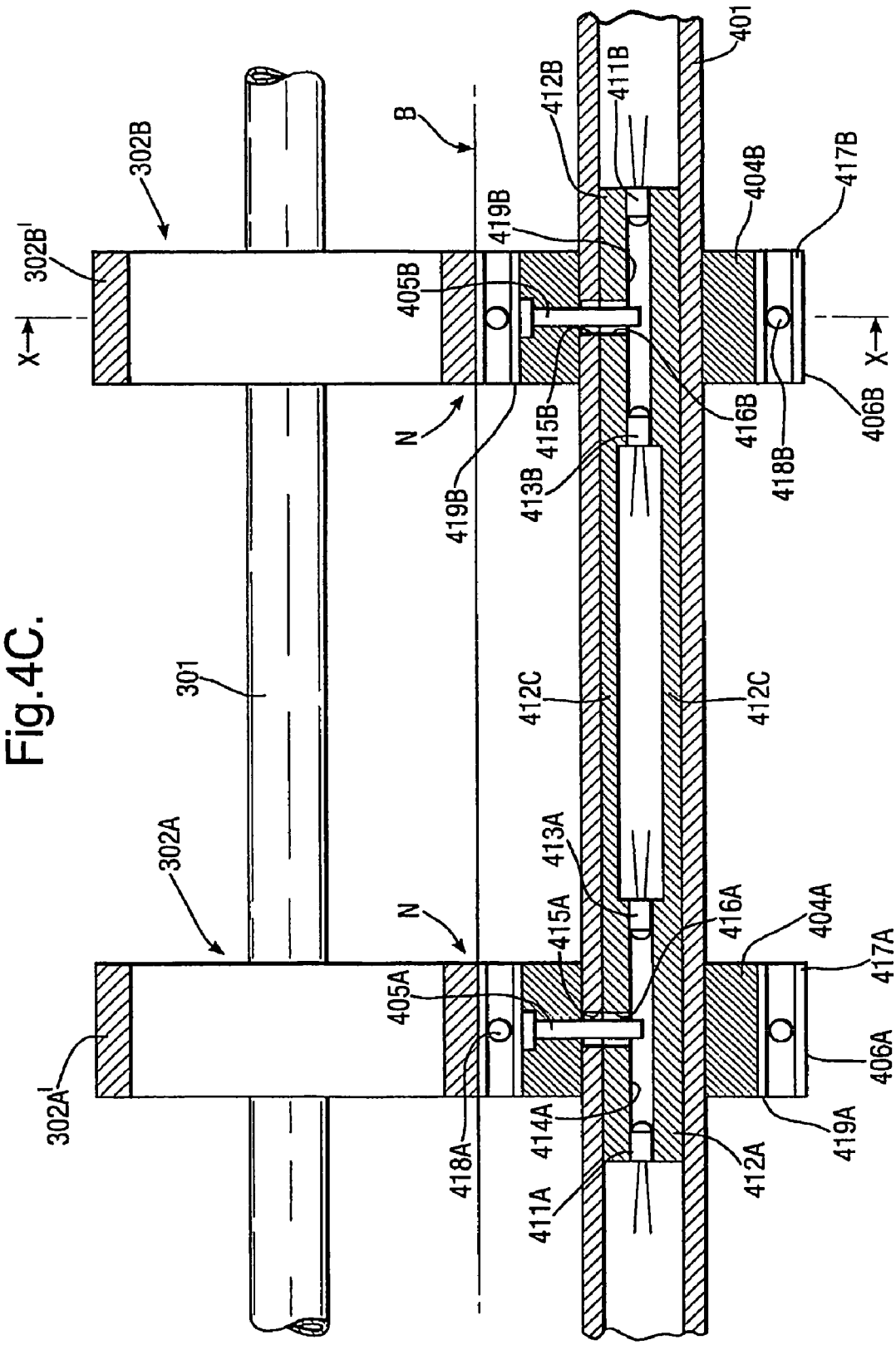

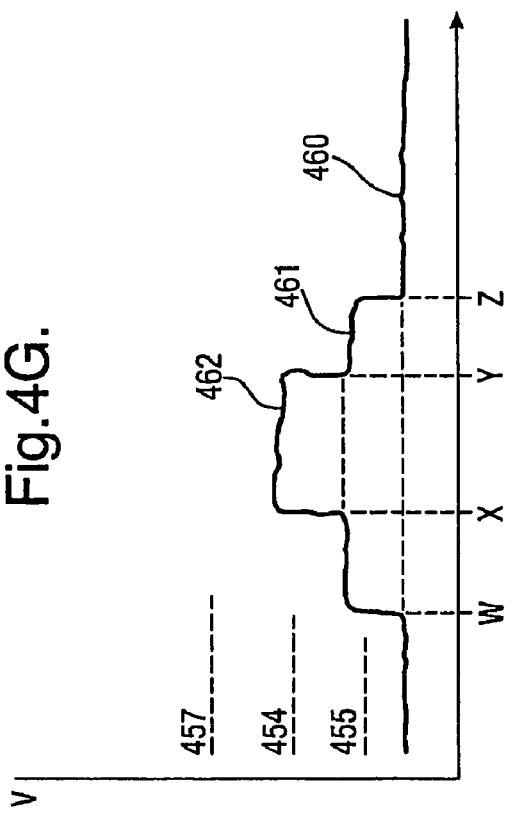
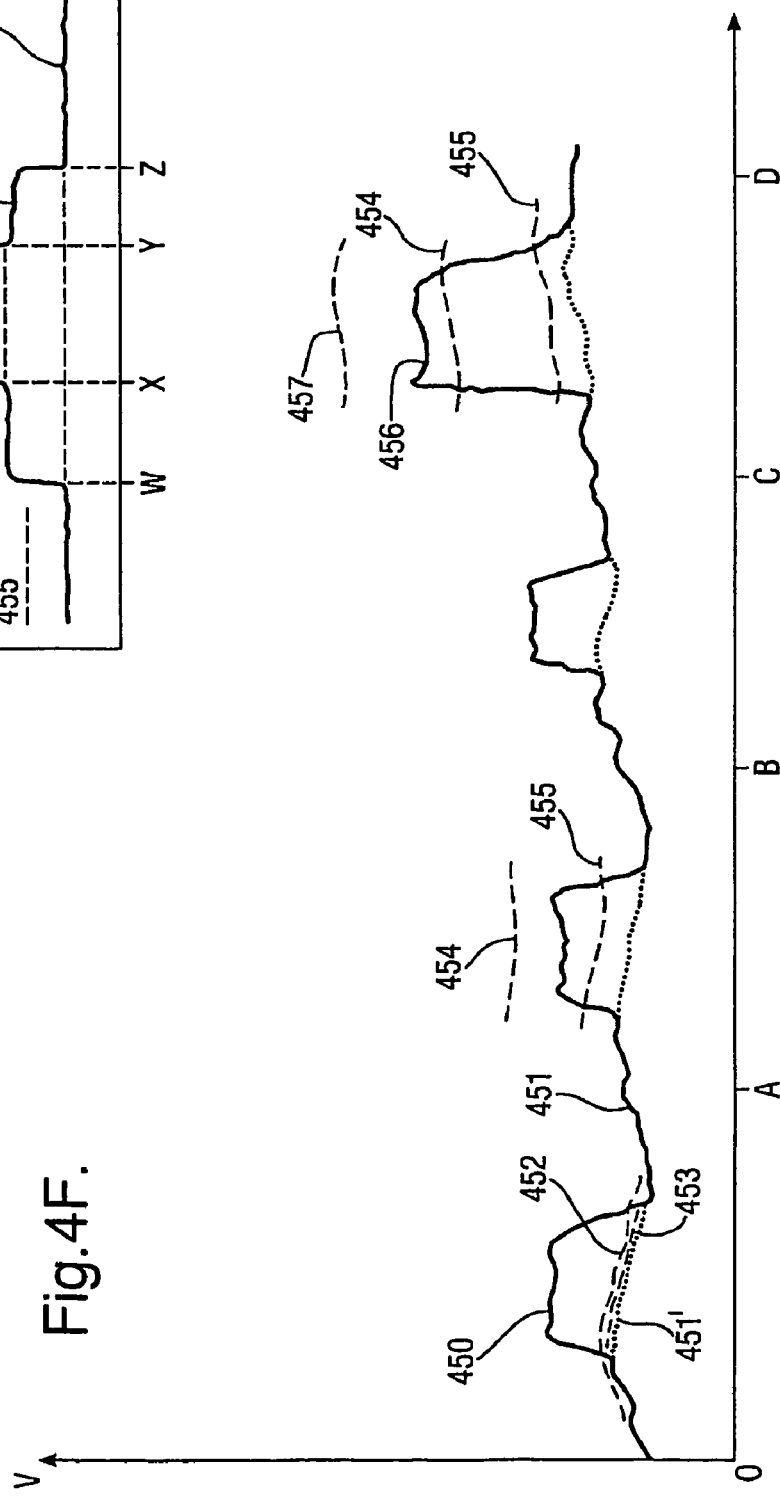
Fig.4G.
Fig.4F.

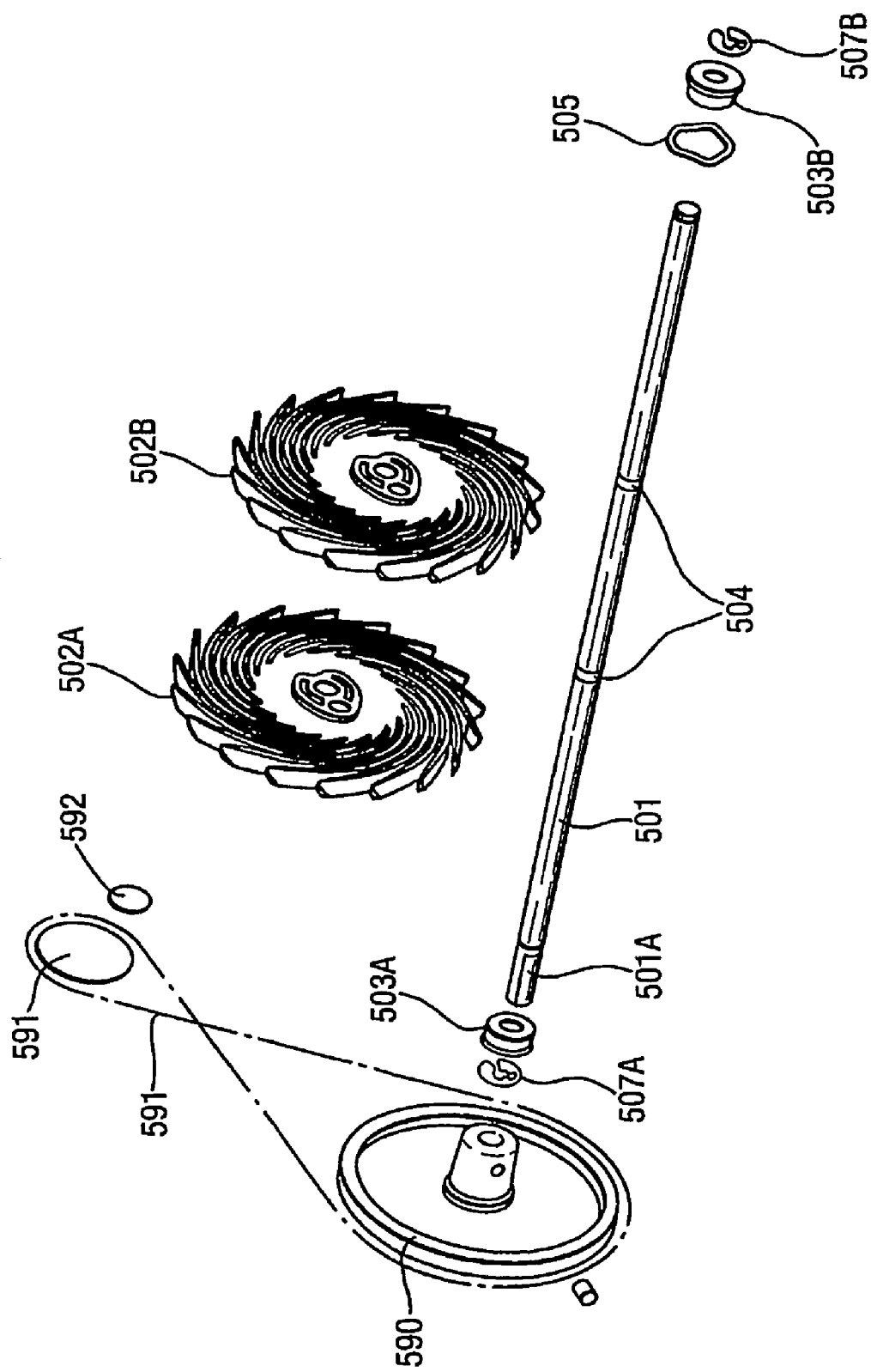

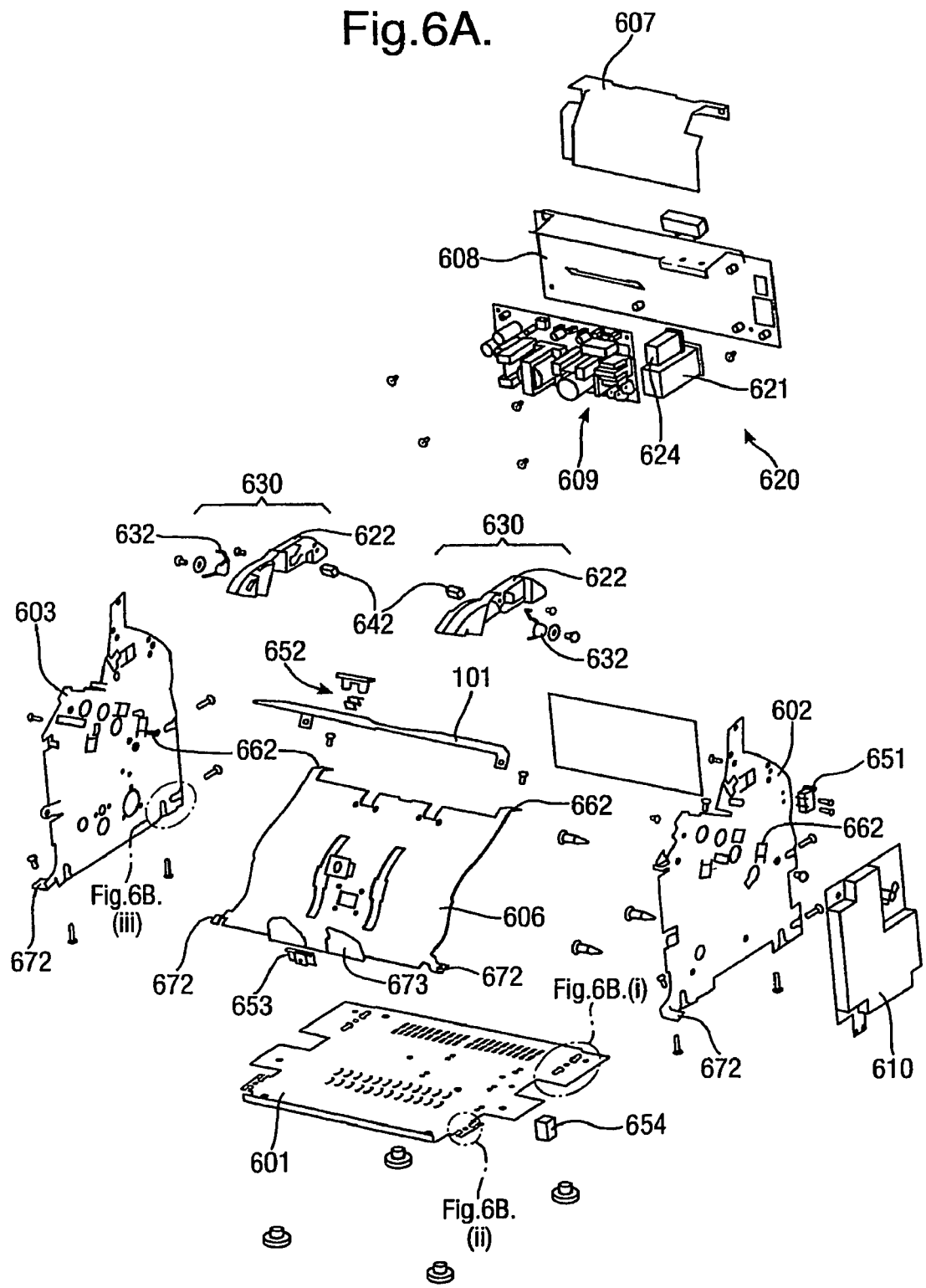

Fig.6B.
i)
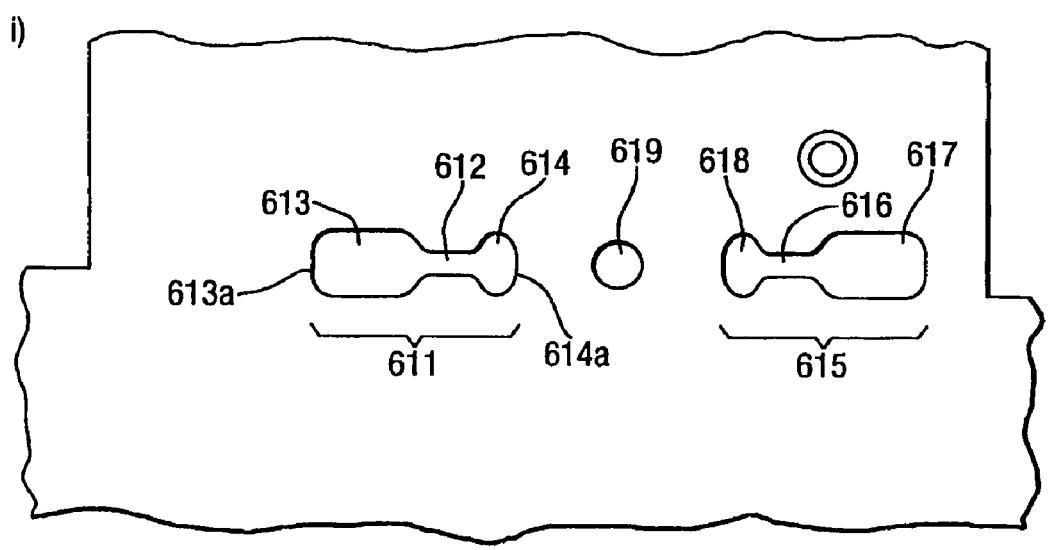
ii)
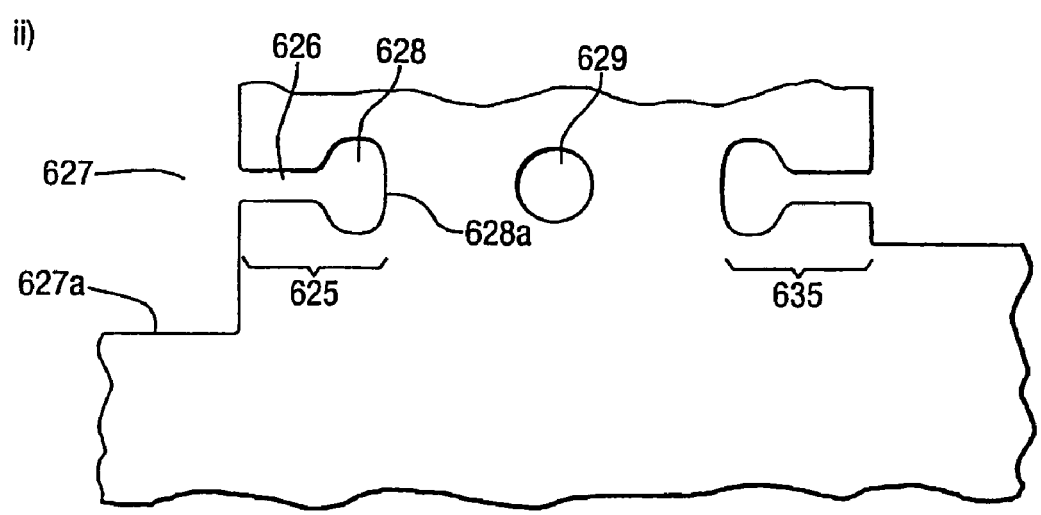

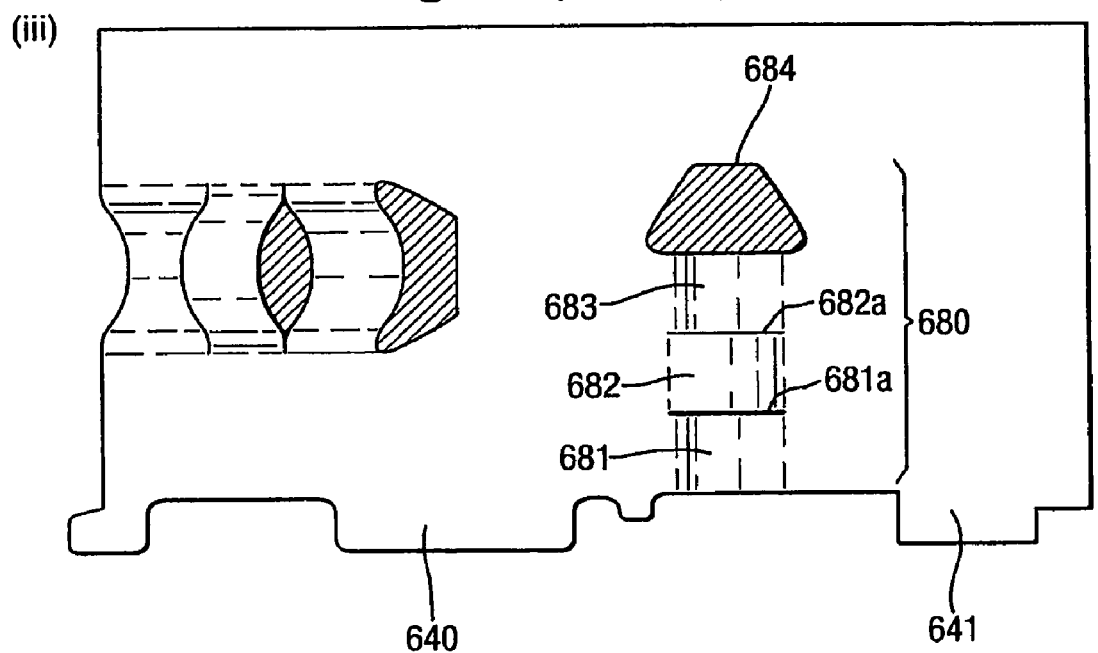

Fig.8A.
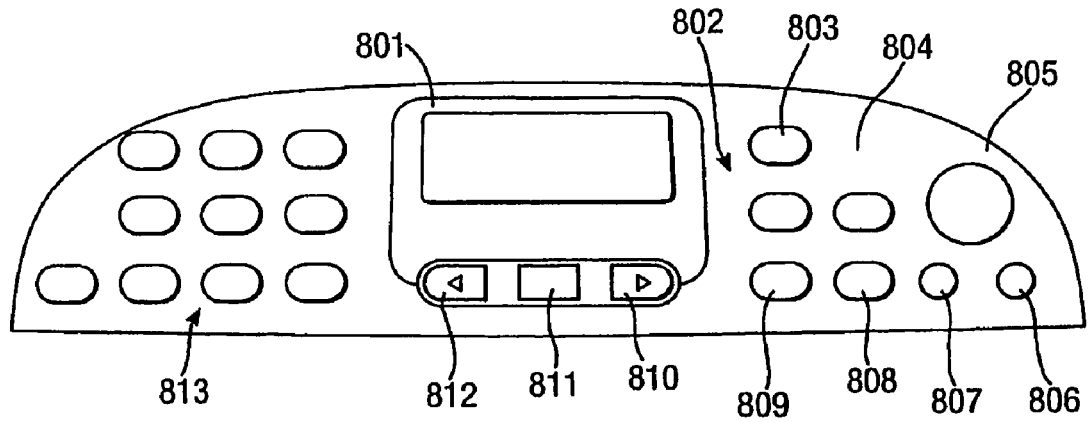
Fig.8B.
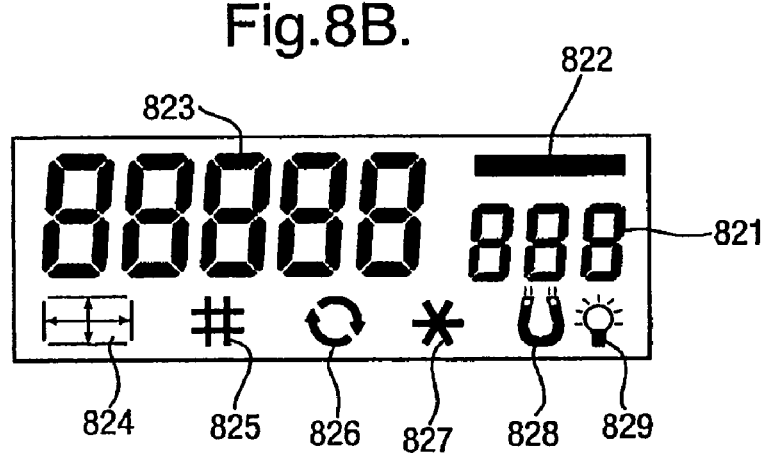
Fig.8C.

DOCUMENT HANDLING APPARATUS

This invention relates to a document handling apparatus and methods for operation thereof. The apparatus and methods are particularly suitable for counting documents of value, such as banknotes.

Typical document handling apparatus are constructed on a metal framework consisting of a series of panels fixed together with mechanical connectors such as screws, brackets and the like. Given the nature of the complex transport systems and sensitive detectors housed within the framework, it is of vital importance that the framework is constructed with high accuracy to precise measurements. In the past, this has been difficult to achieve and requires considerable expenditure on skilled workers to accurately manufacture and assemble the apparatus. One particular problem that has been found is that, even where the individual components are pre-prepared with holes and connectors in the correct positions, it is still possible to misalign the components during assembly, so causing a discrepancy in the build which is often not discovered until further stages of manufacture. Previous designs have attempted to address this by decreasing the size of the location holes provided in the components. However, this leads to problems in the manufacturing steps which produce the holes themselves, since the punches required to produce the holes are of such narrow dimension that they frequently are deformed during use, requiring replacement and causing increased time and cost.

In accordance with a first aspect of the present invention, a structure is provided having first and second walls arranged perpendicularly to one another, the first wall being provided with a first location aperture, and the second wall having a first location protrusion, the first location protrusion adapted to extend into the first location aperture so as to engage the first wall with the second in predetermined relation, wherein the width of the first location aperture varies along its length, comprising a central narrow portion located between first and second enlarged portions of increased width relative to the central narrow portion. By providing a central narrow portion located between first and second enlarged portions of increased width, it is possible to use a much stronger punch tool while still producing a location aperture of suitable minimum dimension to accurately position the two walls relative to one another.

Preferably, the width of the central narrow portion is adapted to accommodate the thickness of the location protrusion in a tolerance fit. In this way, the second wall is accurately located in a direction parallel to the width of the location aperture.

Further preferably, at least one of the first and second enlarged portions is provided with a flat edge substantially perpendicular to the length of the first location aperture. This flat edge provides a reference edge against which one end of the first location protrusion can be placed to thereby accurately locate the second wall in the direction parallel to the length of the location aperture. In this way, the two walls are accurately positioned relative to one another in two dimensions.

To increase the strength and rigidity of the punch tool, it is preferable that the combined length of the first and second enlarged portions is greater than that of the central narrow portion.

It is advantageous that the first wall should be further provided with a second location aperture and the second wall be further provided with a second location protrusion, the second location protrusion being adapted to extend into the second location aperture and wherein the width of the second location aperture varies along its length, comprising a second central narrow portion located between third and fourth enlarged portions of increased width relative to the second central narrow portion. The provision of two location holes and two location protrusions spaced by a width corresponding to the distance between the apertures decreases the likelihood of the parts being assembled incorrectly.

Preferably, the first and second location apertures are punched out of the first wall using a single tool in a single punch step. This ensures maximum accuracy of their positioning relative to one another.

Still preferably, the first and second location protrusions are punched into the second wall using a single tool in a single punch step. Again, the accuracy of the positioning of the location protrusions is thus ensured.

Advantageously, the first and second walls are joined to one another using a screw located between the first and second location apertures. Alternative fixing means such as brackets can be used instead, though this technique has been found to be most preferable since it uses the fewest number of components.

The first aspect of the invention further provides a punch tool for punching apertures in sheet material, the punch tool having a first cross section of varying width, comprising a first central narrow portion located between first and second enlarged portions of increased width relative to the first central narrow portion.

Preferably, the punch tool has a second cross section, laterally spaced from the first cross section, of varying width, comprising a second central narrow portion located between third and fourth enlarged portions of increased width relative to the second central narrow portion.

Some known metal frameworks utilise an edge screw arrangement for fixing the two walls to one another. The screw passes through an aperture in the first wall and into a cavity defined in an edge of the second wall by a series of wall portions which have been deformed out of the plane of the wall. The deformation is such that the portions contact a screw shank inserted into the cavity and enable a thread to be cut in the internal walls of the cavity.

However, it has been found that after repeated use, the cavity is found to undergo further deformation which leads to the deformed portions of the wall no longer gripping the screw. As a result, the screw can come loose and the wall components separate.

In accordance with a second aspect of the present invention, a structure is provided having first and second walls arranged perpendicularly to one another, the first wall being provided with an aperture for receiving a screw therethrough, and the second wall having first and second adjacent portions defined by parallel cuts through the second wall, the first portion being deformed out of the plane of the second wall in a first direction, and the second portion being deformed out of the plane of the second wall in the opposite direction, thereby forming a cavity between the first and second portions for receiving the shank of a screw passed through the first wall, wherein the second wall is further provided with an aperture continuous with the cavity formed between the deformed portions for receiving a nut for engaging a bolt passed through the first wall and cavity.

By providing an aperture in this way, a bolt can be used to secure the screw either in addition to or as an alternative to the thread cut in the cavity defined by the wall portions themselves. The bolt can either be inserted at manufacture, to avoid any reliance on the cavity itself, or as a retrofit component where the cavity is no longer performing as intended.

A further problem encountered with conventional metal frameworks is that apertures through the panels must be provided to allow for cables and such like to pass therethrough. Typically, these take the form of a circular hole sized to accommodate a grommet, which are typically made of polymeric material such as rubber and are substantially toroidal, having a space allowing cables to pass through the centre. The grommet is typically fitted into the aperture, and then the cables passed carefully therethrough. This can prove difficult and time consuming.

In accordance with a third aspect of the present invention, a structure is provided having at least a first wall provided with a cut-out in its periphery adapted for a cable to pass therethrough, and a grommet fitted within the cut-out for securing the cable relative to the first wall, wherein the cut-out includes protrusions for retaining the grommet within the cut-out. This makes it possible to "snap fit" the cables and grommet already fitted thereon into the aperture in a single step. The process is much faster and less prone to error than previous techniques.

Preferably, the cut-out has the form of a partial circle, preferably greater than a semi-circle.

In a document handling apparatus, it is of utmost importance that all the transport components (rollers, belt, etc.) remain correctly aligned at all times. Each set of components is mounted on a shaft between side walls of the framework. Conventional devices have relied on accurate manufacture and assembly to ensure that once the shafts are constrained within the framework walls, the rollers mounted thereon are retained in the desired positions. However, as well as problems caused by inaccurate construction, this technique can suffer from lateral movement of the shafts during transport and operation.

In accordance with a fourth aspect of the present invention, a document handling apparatus comprises first and second side walls laterally spaced from one another and a shaft extending there between, the shaft being supported at one end by a first bearing in an aperture provided in the first side wall, and at its other end by a second bearing in an aperture provided in the second side wall, the second bearing having a flange about its circumference, a clip being provided at each extremity of the shaft for retaining the respective bearing on the shaft, and a compression spring provided between the second side wall and the flange on the second bearing for urging the shaft into a predetermined reference position. By spring referencing the shafts against one side wall in this way, each shaft is automatically accurately positioned and remains so throughout use. By providing the compression spring between the second side wall and the flange on the second bearing, assembly is eased since the clip does not have to be fitted immediately adjacent to the compression spring, which can prove troublesome especially where the clip is held in position by a groove provided in the circumference of the shaft, since the compression spring can easily slip into the groove.

Preferably, the compression spring is a spring washer. Advantageously, the clips are circlips or e-rings and the shafts are provided with a circumferential groove adjacent each of its end for retaining the respective clip.

In conventional document handling apparatus, there is commonly a base unit which is static and a moveable unit which can be opened by the user to access the interior of the apparatus. In order to allow the moveable unit to open, it has not previously been possible to provide the apparatus with a lifting handle since this has obstructed the movement of the moveable unit. Instead, gripping positions have been provided on the base unit itself to aid the user in lifting it, although this has been found to be difficult and cumbersome.

In accordance with a fifth aspect of the present invention, a document handling apparatus is provided having a base unit and a movable unit mounted pivotably thereon, and a handle pivotably attached to the base unit adjacent to the movable unit, the handle being provided with at least one cam surface arranged to abut the movable unit such that, on pivoting the movable unit away from the base unit, the cam surface follows the movable unit, thereby pivoting the handle into a first raised position. By providing this cam arrangement, the handle automatically pivots out of the way when the moveable unit is opened. This makes it possible to provide the apparatus with a lifting handle without obstructing access to the interior of the machine.

Preferably, the handle is arranged relative to the moveable unit such that, once in its first raised position, the handle obstructs any further movement of the moveable unit relative to the base unit. Thus, the handle can have a further function as a stop. Advantageously, the handle is further pivotable by a user from its first place of position to a second place of position in which the handle no longer obstructs the movement of the moveable unit.

Document sensing assemblies for mechanically detecting the passage of documents therethrough are known to typically comprise a roller assembly mounted on a shaft and opposed by a guide surface. Documents passing through the nip defined between the roller assembly and the guide surface cause deflection of the roller assembly and/or shaft which can be monitored to detect overlapping documents. Such systems rely heavily on accurate positioning of the roller assembly relative to the guide surface to precisely define the size of the nip, which must be less then the thickness of a typical document. However, it has proved difficult to assemble the components in such close proximity, both in terms of the real physical difficulty associated with mounting two components very close to one another, and in terms of ensuring their spacing is accurate.

In accordance with a sixth aspect of the invention, a document sensing assembly for detecting the passage of documents therethrough is provided, the assembly comprising a shaft; at least one roller assembly mounted on the shaft; a guide surface, the roller assembly cooperating with the guide surface to define a nip there between; sensing means for sensing deflection of the at least one roller assembly relative to the guide surface in response to the passage of one or more documents through the nip between the roller assembly and the guide surface; and monitoring means for monitoring the sensed deflections; wherein the shaft comprises at least an eccentric portion on which the at least one roller assembly is mounted, such that the size of the nip defined between the roller assembly and the guide surface can be adjusted by rotation of the shaft.

By mounting the at least one roller assembly on an eccentric shaft, the size of the nip can be easily adjusted simply by rotating the shaft without any disassembly. Construction of the apparatus is also eased since the shaft on which the at least one roller assembly is mounted can be fitted into position with the roller assembly rotated out of pinch. Once fitted, the shaft can be rotated to move the roller assembly into its operational position. Preferably, the guide surface comprises at least one guide roller opposing the at least one roller assembly.

Advantageously, the at least one roller assembly is mounted on the shaft by means including a resilient portion, such that deflection of the at least one roller assembly relative to the guide surface cause deflection of the resilient portion relative to the shaft, and the sensing means sense deflection of the resilient portion to determine deflection of the at least one roller assembly.

Preferably, the sensing means are disposed within the shaft. Advantageously, the at least one roller assembly includes a rigid member protruding into the shaft, the rigid member being radially movable relative to the shaft in response to deflections of the resilient portion and cooperating with the sensing means.

Preferably, the sensing means includes means for generating and receiving electromagnetic radiation, the material of the rigid member being such that on deflection of the resilient portion, the proportion of electromagnetic radiation received by the receiving means varies due to movement of the rigid member. Advantageously, the generating means comprises one or more light emitting diodes, and the receiving means comprises a phototransistor.

Preferably, the monitoring means includes detection means for detecting whether deflection of the resilient portion is caused by the passage of one or of more than one sheet through the nip.

Advantageously, the at least one roller assembly comprises inner and outer races surrounding bearing means, the inner race being coaxial with the shaft and being supported on the shaft by the resilient portion.

Preferably, the rigid member comprises a pin abutting an inner surface of the inner race and protruding through an aperture in the shaft. Preferably, the sensing means is mounted in a housing which is slidable into and out of the shaft.

The apparatus could comprise any number of roller assemblies, but preferably it comprises two roller assemblies mounted in the shaft and spaced from one another.

Another problem encountered with conventional document sensing assemblies is the manner in which the shaft on which the roller assemblies are mounted is fixed into the framework of the document handling apparatus. Typically, the shaft has to be manually held in position, fixed to the interior of one side wall and then to the other side wall so that the shaft is secured. This is not only a complicated procedure but means that should the document sensing apparatus require adjustment or replacement, significant disassembly of the apparatus is required to gain access to the fixing on each side wall. It is therefore preferable that the shaft further comprises a keying block adjacent one end of the shaft, the keying block shaped so as to permit passage through a correspondingly-shaped aperture when the shaft is in a first predetermined orientation, and to prevent passage therethrough when the shaft is not in the first predetermined orientation. The use of a keying block in this way makes it possible to slide the shaft through an aperture provided in one of the side walls when the shaft is in the first predetermined orientation such that the opposite end of the shaft can be released from a support in the second side wall and the shaft then reversed out of the apparatus without requiring any disassembly of the framework. When the shaft is not in the first predetermined orientation, the keying block prevents lateral movement of the shaft, holding it in position.

Advantageously, the keying block is arranged such that the size of the nip between the roller assembly and the guide surface is greater when the shaft is in the first predetermined orientation than when it is rotated out of the first predetermined orientation. That is, the roller assemblies are out of pinch in the position which corresponds to that in which the shaft can be removed.

Therefore, a seventh aspect of the present invention provides a document handling apparatus comprising first and second laterally spaced side walls and a document sensing assembly as described above, the eccentric shaft being supported between the first and second side walls, the first side wall being provided with an aperture shaped to permit passage of the keying block through the first side wall when the shaft is in the first predetermined orientation, and preventing passage therethrough when the shaft is not in the first predetermined orientation.

Preferably, the keying block is provided with a protrusion, and the aperture is additionally shaped so as to engage the protrusion when the shaft is in a second predetermined position, thereby securing the document sensing assembly in position.

A key aspect of the document handling apparatus is that documents must pass through the system one by one in order to be accurately counted and authenticated. Thus, the primary function of the input means which feed documents into the apparatus is to ensure a single document is fed at a time. The feeder means typically comprise one or more roller assemblies opposing a guide surface which acts to strip or hold back surplus documents. The size of the nip defined between the roller assembly and the guide surface is key since this will determine how many documents are able to pass through. In conventional apparatus, the size of the nip is determined by careful assembly of the components, which can lead to errors and cause feeding problems.

In accordance with an eighth aspect of the present invention, a document handling apparatus comprises a roller assembly, a guide surface, the guide surface opposing the roller assembly to define a nip there between, and an eccentric shaft rotatably mounted in fixed relation to the roller assembly, wherein the guide surface is movably mounted relative to the roller assembly and the eccentric shaft urges the guide surface towards the roller assembly to a greater or lesser extent depending on the degree of rotation of the shaft, to thereby adjust the size of the nip. This construction makes it possible to make fine adjustments to the size of the nip after assembly, which can be carried out by a service engineer or by a user.

In a particularly preferred embodiment, the guide surface is supported by a plate which is pivotable relative to the roller assembly via a pivot point located at one end of the plate, the eccentric shaft being arranged to pass through an aperture located at the other end of the plate, distal from the pivot point, and bear upon the aperture to a greater or lesser extent depending on the degree of rotation of the shaft, to thereby pivot the plate and so adjust the size of the nip. Preferably, the guide surface comprises one or more of a roller, a wheel and a friction pad.

In conventional document handling apparatus having a document sensing assembly for detecting the passage of one or more documents therethrough, if overlapping documents are sent, the processing is stopped and the apparatus halted. The user has to manually retrieve the overlapped notes either from the interior of the note transport or from the output hopper if the notes have reached it. The batch of notes then has to be reprocessed. This of course is time consuming and leads to user dissatisfaction.

A ninth aspect of the present invention provides a method of controlling a document handling apparatus, the apparatus comprising a document sensing assembly for detecting the passage of one or more documents therethrough, and at least one detector for detecting characteristics of each document, the method comprising:

a) on receipt of a signal from the document-sensing assembly that more than one document has passed, determining whether the at least one detector is active;

b) if not, determining whether the number of documents N which have passed the document-sensing assembly is known; and c) controlling the document handling apparatus based on the outcome of step (b).

The method of the present invention recognises that there are some cases in which it is not necessary to halt processing on receipt of an overlapped banknote signal from the document sensing assembly. In particular, if no other detectors are active in the system (i.e. no denomination or authentication is required), provided that the document sensing assembly has accurately determined how many documents are overlapped, the process can potentially continue. The step of determining whether the at least one detector is active can be carried out by a user selecting a mode which does or does not involve any detectors—from knowledge of the current mode, the system can determine the outcome of step (a).

Preferably, if in step (b) the number of documents N which have passed the document-sensing assembly is known, then step (c) comprises:

c1) incrementing a count of the documents by N and processing the N documents in accordance with predefined rules.

However, in a small number of cases it will still be necessary to halt the process and so preferably, if in step (b) the number of documents N which have passed the document-sensing assembly is not known, then step (c) comprises:

c1) generating an error message and halting processing of any further documents.

If one or more detectors is active (i.e. the mode of operation requires authentication and/or denomination of the documents), it becomes necessary to assess whether each of the overlapped documents meets the applied criteria. Hence preferably, if in step (b) the number of documents N which have passed the document-sensing assembly is known, then step (c) comprises:

c1) determining whether the at least one detector has detected characteristics from each of the N documents which have passed the document-sensing apparatus;

c2) if so, determining whether the characteristics detected for each document are sufficient to determine whether or not the document meets a predetermined set of criteria;

c3) if so, incrementing a count of the documents by N and processing the N documents in accordance with pre-defined rules depending on the characteristics detected for each document.

If the detectors have not detected characteristics from each of the end documents, then the processing must be halted and an error message is generated.

This technique greatly reduces the number of scenarios in which it is necessary to halt processing.

Conventional document handling apparatus commonly use opto-slotted sensors in the form of timing wheels to monitor the speed of the transport. Typically, the timing wheel consists of a planar disc having a number of radial slots cut into its perimeter. The disc is typically made of a rigid material such as metal since the slots are preferably formed close to one another such that the areas of material in between the slots become thin and a strong material is required in order to avoid deformation. These timing wheels suffer from a number of problems. First, dust and dirt can become stuck in the narrow slots causing them to become radiation-opaque and resulting in an incorrect transport speed measurement. Also, the construction of the timing wheel requires the provision of a light gate acting parallel to the axis of rotation. This is typically difficult to mount and connect to a PCB (to which the rotation axis is normal) since either the radiation emitter or the radiation receiver must be elevated some way from the PCB.

In accordance with a tenth aspect of the present invention, a rotation sensing assembly comprises a timing wheel and a light gate having a radiation emitter spaced from a radiation receiver, the timing wheel extending into the light gate to intersect light emitted by the radiation emitter and having one or more slots defined therein, allowing passage of light therethrough, such that the light path between the emitter and receiver is alternately obstructed by the timing wheel and allowed to pass by the or each slot as the timing wheel is rotated, to detect rotation of the timing wheel, wherein the timing wheel comprises a substantially circular central platform defined about an axis of rotation, and a peripheral flange extending perpendicularly from the central platform around the circumference of the wheel, the or each slots being defined in the peripheral flange substantially parallel to the axis of rotation.

By arranging the slots in a peripheral flange substantially parallel to the axis of rotation, the light gate can be constructed such that both components are mounted directly to the PCB. Further, any dust or dirt which falls into the slots is subject to centrifugal force as the timing wheel rotates such that it does not become lodged in the slots.

In conventional document handling systems, a stack of documents is fed into the machine from an input hopper one by one. One or more feed roller assemblies are driven forward by a motor to urge the lowermost document in the stack towards the document transport path. When the apparatus is required to stop feeding, the roller is decelerated and brought to a halt. The roller is accelerated to its operational speed by applying a forward current to the motor, and is decelerated by applying a reverse current. One problem that has been frequently encountered in conventional apparatus is that the reverse voltage, if applied for too long, can cause the rollers to start turning backwards and any banknotes left in the input hopper to fly backwards off the machine. This is because conventional control involves determining the length of time for which the forward current is applied to attain the operational speed, and then applying the reverse current for the same period of time. This is not found to give particularly accurate results.

An eleventh aspect of the present invention provides a method of controlling a motor arranged to drive at least one roller assembly in a document handling apparatus, comprising:

a) on receipt of a start signal, supplying a forward current to the motor to thereby accelerate the at least one roller assembly;

b) monitoring the speed of the at least one roller assembly and monitoring the level of forward current supplied to the motor;

c) when the monitored speed of the at least one roller assembly reaches a predetermined speed, recording the corresponding magnitude of forward current supplied to the motor;

d) on receipt of a stop signal, supplying a reverse current to the motor to thereby decelerate the at least one roller assembly;

e) monitoring the level of reverse current supplied to the motor and comparing the monitored level with the recorded magnitude of forward current;

f) when the monitored level of reverse current reaches the recorded magnitude of forward current, switching off the reverse current and thereby halting the at least one roller assembly.

By monitoring the current levels and switching off the reverse current when it reaches the same magnitude as the recorded forward current, the present method achieves much more accurate halting of the feeding apparatus. The roller comes to a halt before starting to turn in reverse.

The method can control the reverse current to switch off exactly when the monitored reverse current reaches the recorded magnitude, or in other embodiments step c) further comprises calculating a tolerance range around the recorded magnitude of forward current, and in step f), the reverse current is switched off when the monitored level of reverse current falls within the tolerance range.

In conventional document handling apparatus adapted to process banknotes, it is usual that all available detectors are active during processing of banknotes. If detectors are to be enabled or disabled this is performed manually by the user through a user interface. If all the detectors are left active, this consumes a considerable amount of energy and causes unnecessary heating of the apparatus, especially where the detectors involve numerous light sources. Manual activation or deactivation of each detector is arduous and prone to user error.

A twelfth aspect of the present invention provides a method of controlling a document handling apparatus adapted to process banknotes, the apparatus comprising at least one detector for detecting characteristics of each banknote, the method comprising:

a) identifying a currency of the banknotes to be processed;
b) retrieving a currency table corresponding to the identified currency, the currency table defining one or more characteristics of the banknotes to be detected; and
c) enabling and/or disabling the or each detector in accordance with the characteristics of the banknotes to be detected.

In step a), identification of the currency may be input by the operator or may be performed automatically by the document handling apparatus based on the detector characteristics of the first banknote to be processed.

Preferably, if the detected characteristics of a banknote do not correspond to the currency identified in step a), repeating steps a) to identify a new currency, and performing steps b) and c) based on the new currency.

An example of a document handling apparatus demonstrating the above mentioned inventions will now be described with reference to the accompanying drawings, in which:

Figure (i) is a front view of a document handling apparatus with its handle in a raised position;

Figure (ii) is a left side view of the document handling apparatus of Figure (i), with its handle in a lowered position;

FIG. 1b is an exploded view illustrating certain components of the feeder module;

FIG. 2b is an exploded view showing components of the detector box in a second embodiment;

FIG. 3 shows an exploded view of components in the transport system;

FIG. 4c is a cross-section through the doubles detector assembly;

FIG. 4f illustrates the output from photo-transistors in a doubles detector assembly;

FIG. 4g shows the output from the photo-transistors in the case of partially overlapping banknotes;

FIG. 5 is an exploded view showing the main functional components of the stacker module;

Figure 6C:
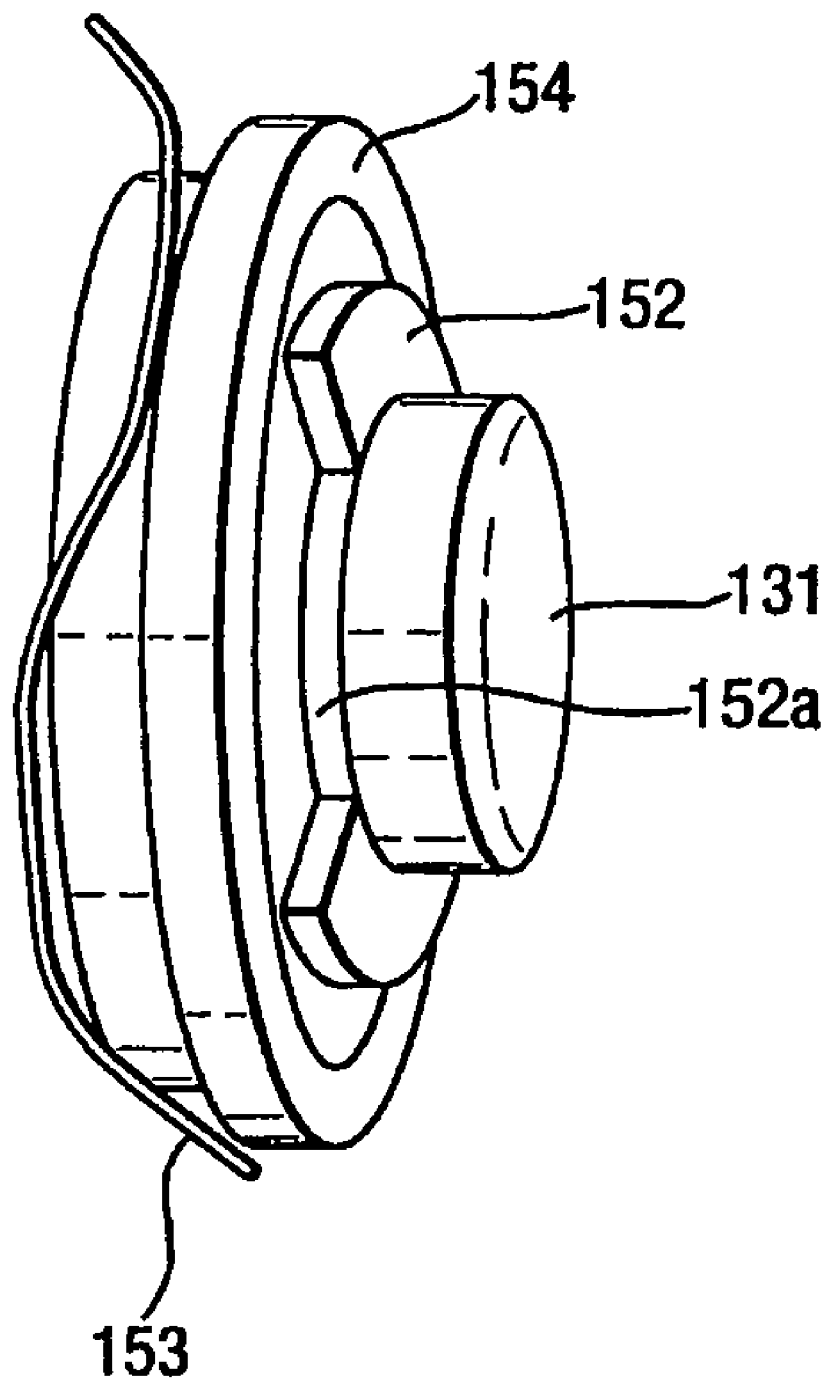
FIG. 6a is an exploded view showing components making up the framework of the document handling apparatus.
Figure 6D:
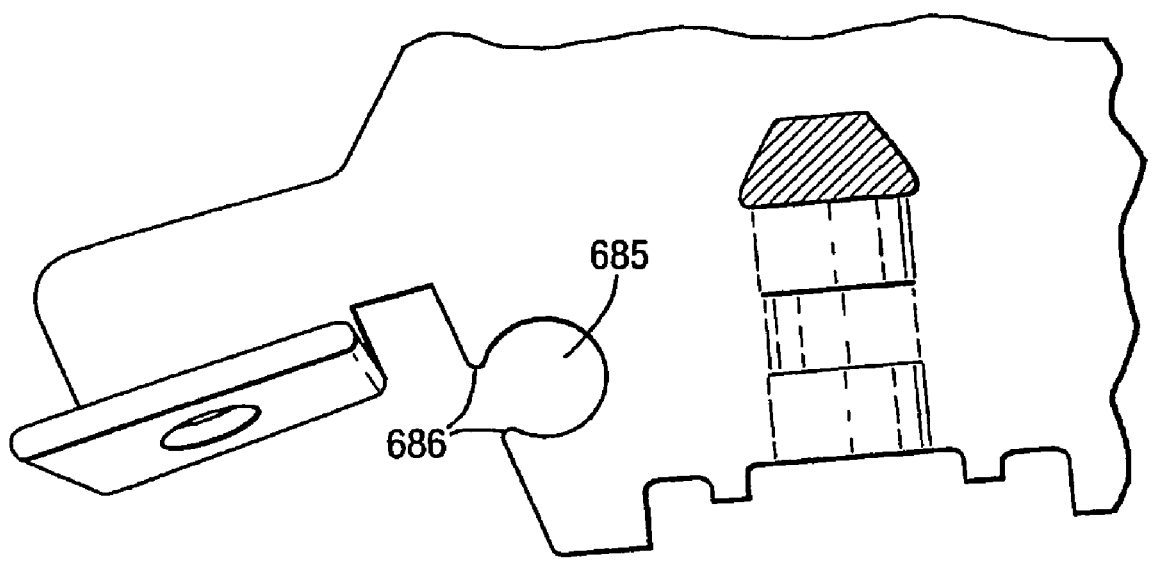
Figure 7:
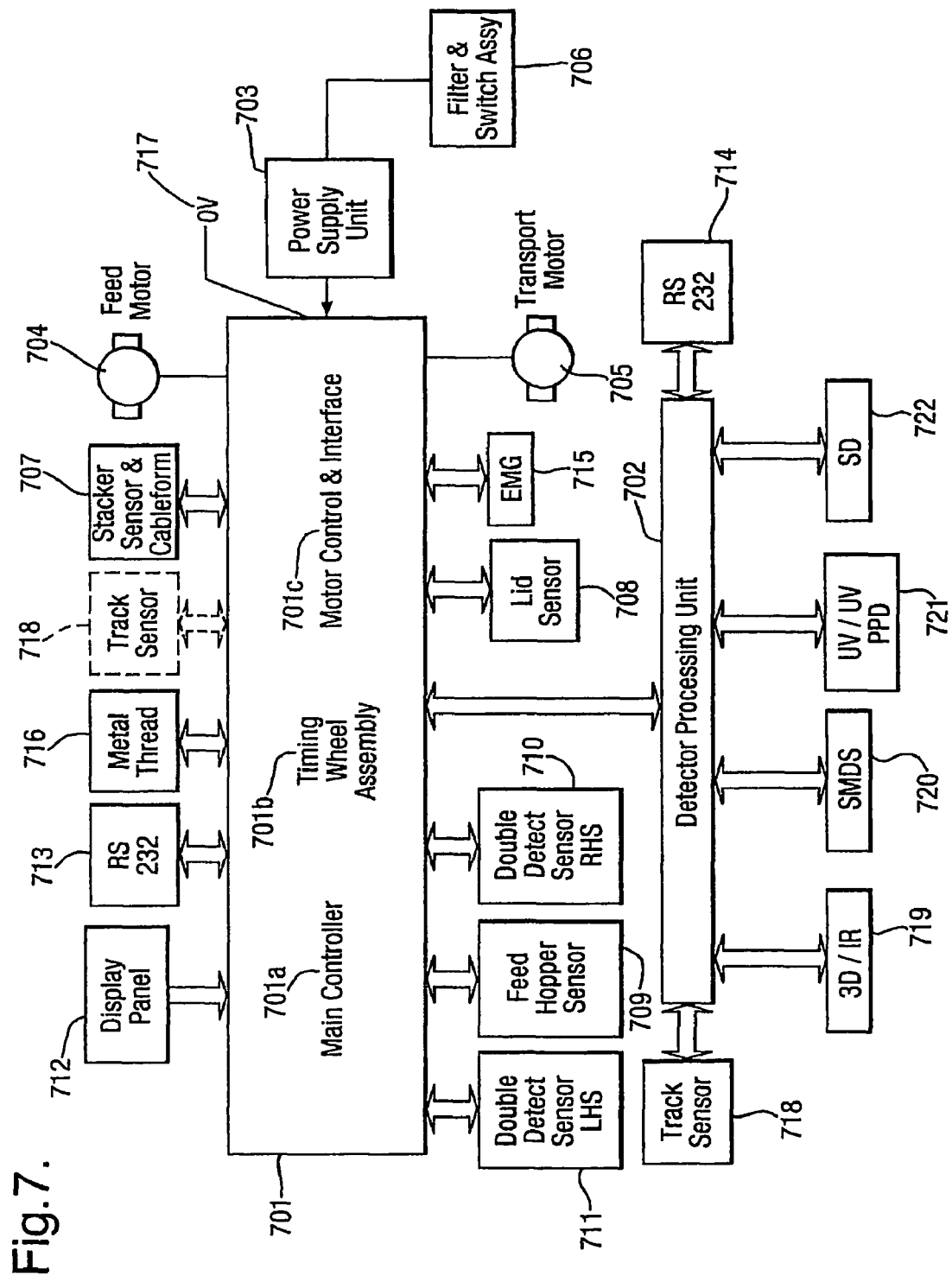
Figure 9:
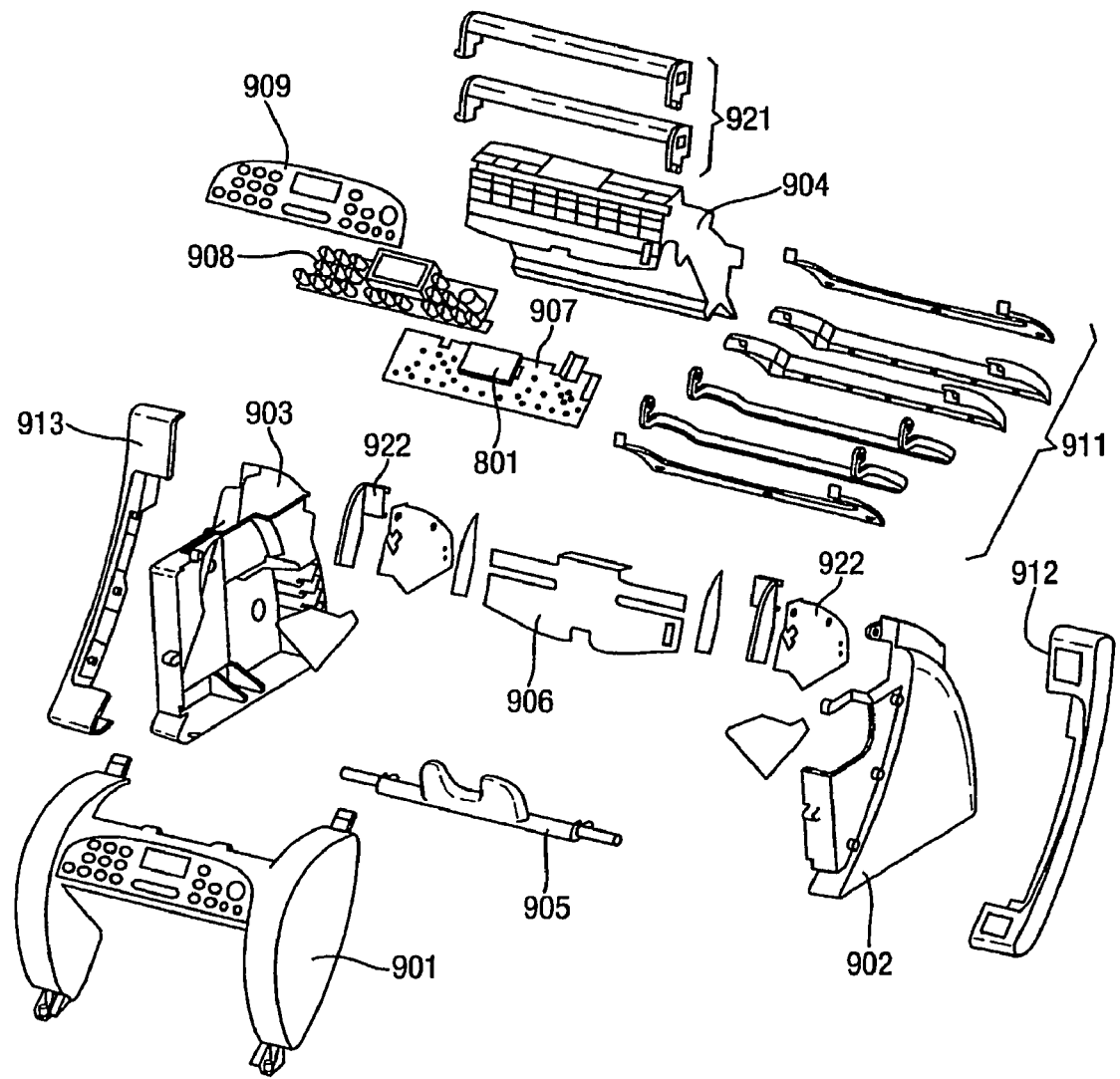

FIG. 6b (i), (ii) and (iii) illustrate features of the framework;

FIG. 6c shows mounting of a transport shaft within the framework;

FIG. 6d shows further features of the framework;

FIG. 7 illustrates the control systems of the document handling apparatus;

FIG. 8a illustrates the front display control panel of the document handling apparatus;

FIG. 8b illustrates the LCD display;

FIG. 8c shows an example of an output which can be printed from the document handling apparatus; and FIG. 9 is an exploded view showing the components of the external housing.

OVERVIEW

This description relates to an apparatus for handling documents. In particular, the apparatus is adapted to count banknotes, and may also perform authentication and denomination discrimination. The apparatus will therefore generally be described as a counter, but it will be appreciated that its functions are not limited to this. Similarly, the apparatus is primarily described as handling banknotes; however any suitable documents could be counted or otherwise processed using the device.

Throughout the description below, the orientation of the banknote counter will be referenced as shown in Figures (i) and (ii). Namely, the side of the apparatus at which notes enter and exit the machine is termed the front, and left and right are defined from the point of view of a user facing the front of the machine.

Figures (i) and (ii) depicts the constituent modules of the banknote counter 1. A stack of banknotes to be counted is placed into the feeder module 100 which feeds the banknotes, one by one, into the apparatus. The banknotes are transported past detector box 200 by the transport system 300. The detector box 200 includes one or more sensors which detect properties of the passing banknotes to be used for authentication and/or denomination discrimination. In some variants, additional detectors may be disposed further along the transport path. Characteristics of the banknotes which may be detected include its width and length, as well as security features such as luminescence, magnetic properties and the like.

The note is then transported through a doubles detector 400 which takes a measurement of the thickness of the passing note. This can be used to confirm that only a single note has been fed in or to identify overlapping notes to the counter. The signal from the doubles detector is used to count the number of banknotes through the machine.

From the doubles detector, the banknotes pass into stacker module 500, where they are formed into a stack using stacker wheels and presented to the user for collection.

The counter 1 is based on a metal frame 600 and provided with an outer plastics housing 900. The operation of the counter 1 is controlled by a control and sensing system 700 comprising printed circuit boards (PCBs) disposed within the housing 900, mounted on framework 600. Optionally, communications terminals may be provided on the PCBs for connection to an external computer in order to update the programs installed on the PCBs.

1. FEEDER MODULE 100

Figure 1A:
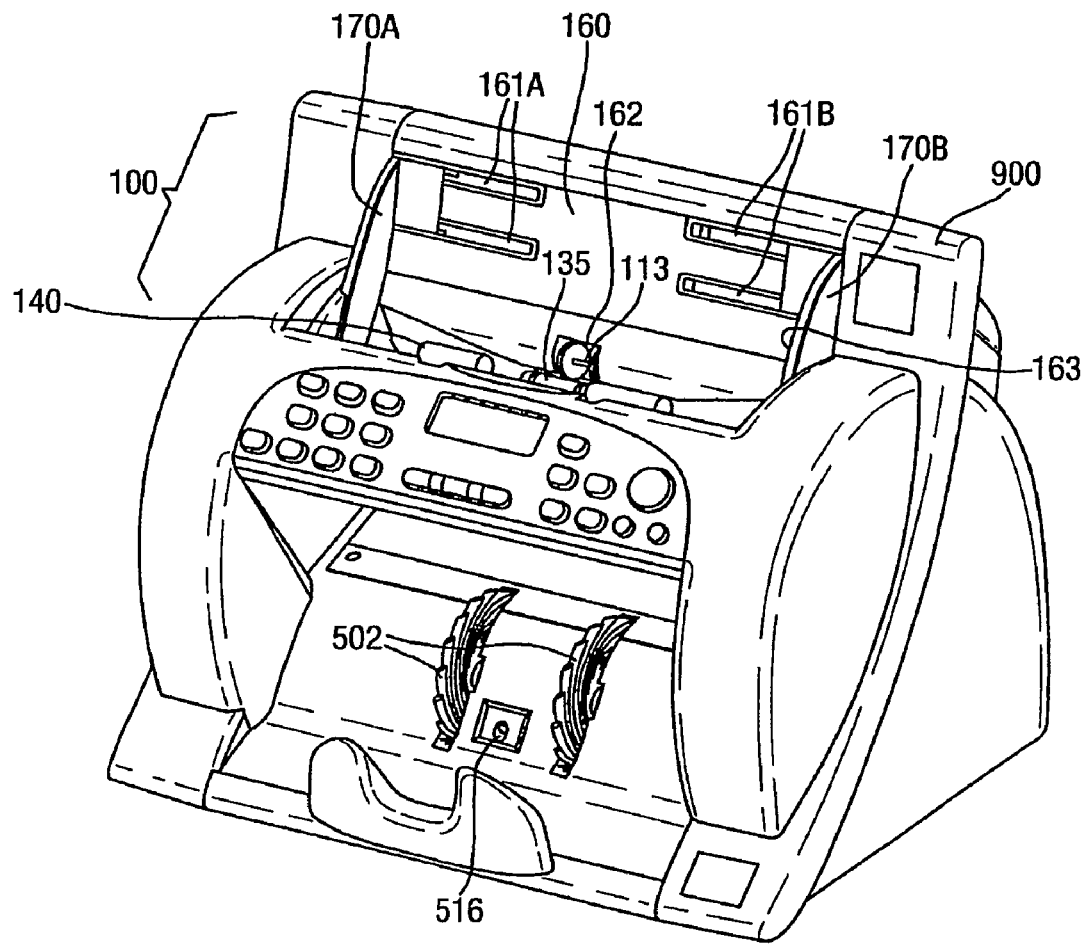
FIG. 1a is a perspective view of a document handling apparatus.
Figure 1C:
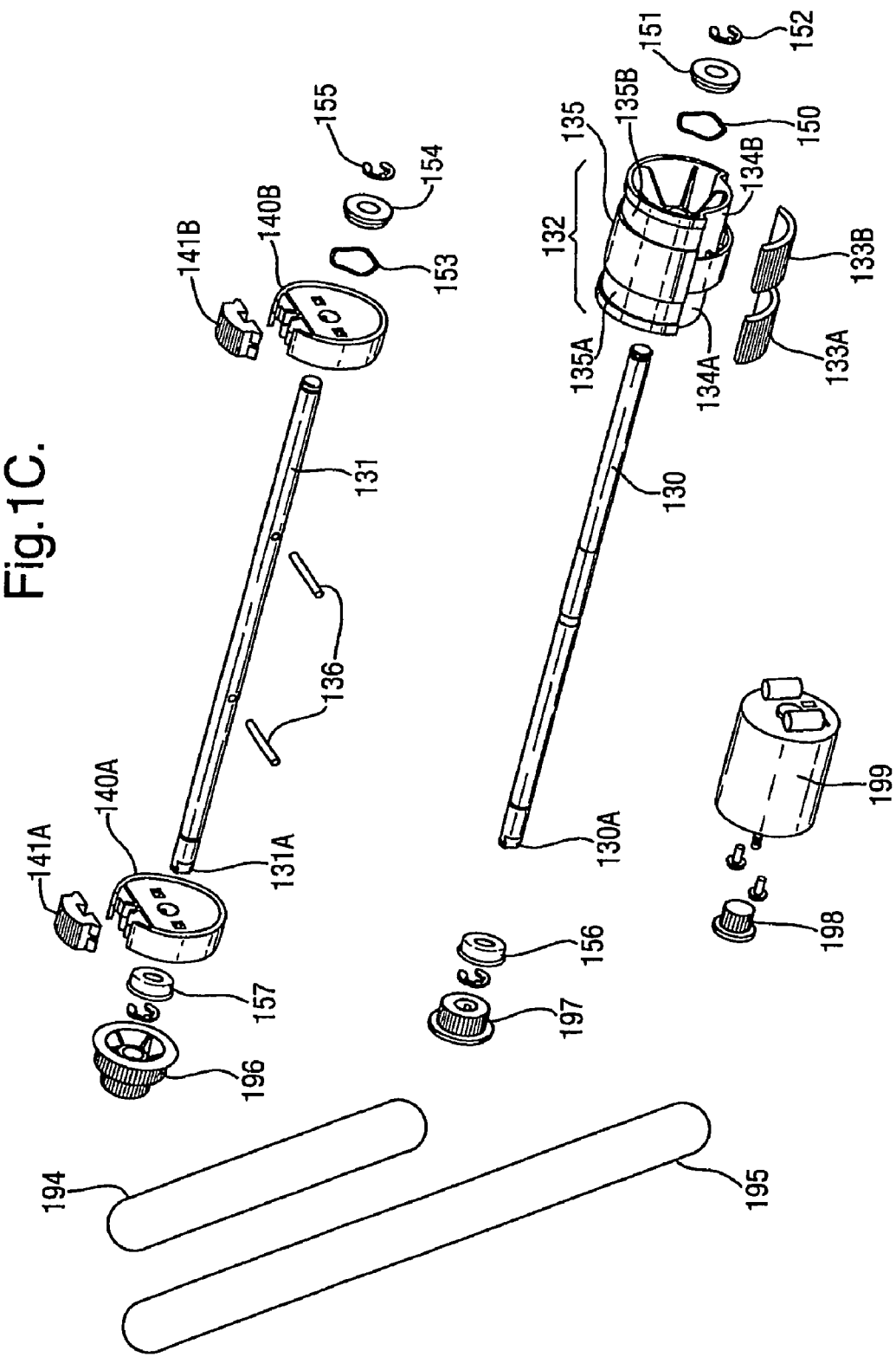
FIG. 1c is an exploded view showing transport components of the feeder module.

The feeder module 100 is located at the top of the banknote counter 1 as shown in FIG. 1*a*. The main function of the feeder module 100 is to feed notes into the counting apparatus one by one, without skew and at an accurately controlled speed. This is achieved by a series of feed rollers, shown in FIG. 1*c*, and careful management of the size of the feed gap, achieved by the feed gap adjuster arrangement shown in FIG. 1B. The feed gap adjuster is described in section 1.1 and the feed rollers in section 1.2 below.

A stack of banknotes is placed on feeder plate 101 which is supported by the metal framework 600 of the apparatus at an angle of approximately 30° to the horizontal. The stack rests against feeder back plate 160, a metal plate supported in the framework 500 at approximately 90° to the feeder plate 101. The stack of banknotes is centred on the feeder plate 101 by guide members 170*a* and 170*b*, which are slidably coupled to the feeder back plate 160 via elongated grooves 161*a* and 161*b*. The distance between the guiding members 170*a* and 170*b* can be manually adjusted to account for different note widths by sliding each guide relative to the feeder back plate 160. The guide members 170*a* and 170*b* may be movable independent of one another, or in certain embodiments may be self-centering. In some cases it is advantageous to align certain banknote features with the relevant sensor, and the guide members may therefore be arranged to self-centre about a position offset from the midpoint of the machine.

A feed sensor 652 is positioned adjacent to the feed plate 101, mounted on a portion of the plastics housing 900 (shown in FIG. 9). This portion of the housing is flush with the feed plate 101 and protrudes underneath the banknote stack in use. When a stack of banknotes to be counted is positioned on the plate 101, the feed sensor 652 is covered. Thus the presence of banknotes in the feeder module is detected and the control system initiates processing. Typically, the feed sensor 652 is a reflective infrared sensor.

The feeder plate 101 consists of a metal plate having two apertures 101*a*, elongate in the direction of banknote movement, through which feeder wheels 140*a* and 140*b* extend. The feeder plate 101 is additionally provided with a cut-out 104 at its edge adjacent the feeder back plate 160. A feed roller assembly 132 extends through the cut-out. Thus the stack of banknotes placed on feeder plate 101 is supported by the two feeder wheels 140*a* and 140*b* and the feed roller assembly 132. These components and their functions are described in greater detail below.

The feeder back plate 160 is provided with a cut-out 162 in the centre of its edge adjacent the feeder plate 101. A freewheeling roller 113, mounted on detector box plate 201, extends through cut-out 162 towards the feed roller assembly 132. In use, polymer o-rings 113A mounted on the freewheeling roller 113 contact the stack of banknotes. This assists in the feeding of a single note by controlling the leading edge of the note being fed.

Behind freewheeling roller 113 is mounted a pinch roller 110. In use, pinch roller 110 contacts the central ridge 135 of the feed roller assembly 132 and so is driven in the direction of banknote transport. This assists in moving the note on to the transport system 300.

Either side of pinch roller 110 are mounted pads 109 which are made of a high friction material such as rubber. These are supported by a casting 126, mounted to the detector box plate 201 as described below. The pads 109 create a "wedge" shape on the front of the banknote stack, thereby promoting the feeding of a single note.

The distance between the pads 109 and the feed roller assembly 132 is termed the feed gap. To ensure that a single note is fed into the apparatus, the feed gap should typically be greater than one note thickness but less than two note thicknesses. However for certain currencies, the feed gap is preferably less than one note thickness, in which case feeding of a note relies on deformation of the feed roller assembly.

1.1 Feed Gap Adjuster

The components making up the feed gap adjuster are shown in FIG. 1*b*. The freewheeling roller 113, pinch roller 110 and pads 109 are supported in the counting apparatus by detector box plate 201. As described in sections 2 and 3 below, detector box plate 201 guides the banknotes into the transport system 300 from the feeder module 100 and is equipped with one or more sensors for authentication and denomination discrimination mounted in apertures 108. The detector box plate 201 is pivotally mounted to the metal framework 600 of the apparatus at its end furthest from the freewheeling roller 113.

The detector box plate 201 has lateral sections 202 and 203 at its right hand and left hand sides respectively. Apertures 108 provided are provided in the ends of these sections furthest from the detector box pivot point. An adjuster shaft 116, having eccentric end portions 116C, is mounted between apertures 108 and is provided with an adjuster wheel 117, fixed relative to the adjuster shaft 116 by pin 116*a*. The adjuster shaft 116 is forced against the left hand lateral section 203 by virtue of a spring 119 and bushing 118 assembly at the right hand end which acts against the left hand side lateral section 203.

The detector box plate 201 includes a tab 107 and aperture 107*a* through which the freewheeling roller 113 is mounted alongside the pinch roller 110. The freewheeling roller 113 and the pinch roller 110 are each supported in respective brackets 114 and 111. Each bracket 114 and 111 pivotally couples to a support shaft 121. Freewheeling roller 113 and its bracket 114 are resiliently biased towards tab 107 by means of spring 114*a*. The pinch roller 110 and corresponding bracket 111 are biased against tab 107 via leaf spring 115.

The adjuster shaft 121 on which the rollers 110 and 113 are mounted is supported on tab 107 by means of casting 126 which fits to the support shaft 121 and tab 107 by means of screws 126A. The casting 126 also mounts pads 109 in two recesses 126B. A guard plate 127 is affixed to the front of casting 126 by the same screws 126A. Thus, the freewheeling roller 113, pinch roller 110 and pads 109 are supported by tab 107 of detector box plate 201.

In use, the end portions 116C of the adjuster shaft 116 abut latch boxes 642, shown in FIG. 6. These form part of the assembly which holds the detector box 200 in its closed position within the framework 600 and are described in section 6. The position of each latch box 642 is fixed relative to the feed roller assembly 132 during operation of the counter 1.

Each end portion 116C is offset from the axis of shaft 116 so as to act as an eccentric cam. When the adjuster shaft 116 is rotated, by means of adjuster wheel 117, the eccentric cams (ends 116C of the shaft 116) act against the latch boxes 642, bearing on the apertures 108 in the detector box plate 201 to a greater or lesser extent. In this way, the distance between the latch boxes 642 and the detector box plate 201 is controlled, thereby adjusting the feed gap between the pads 109 and the feed roller assembly 132. The adjuster wheel 117 is marked at intervals to indicate to the user the relative size of the feed gap in the current setting.

In use, the adjuster wheel 117 is accessible through an aperture 163 in the feeder back plate 160 (shown in FIG. 1A). The feed gap may need to be adjusted in use to account for different thicknesses of banknote, which may be encountered with different currencies, or for parameters such as the age of the notes being counted and the age of the machine, since wear will cause the rollers to thin slightly.

The feed gap is initially determined by the alignment of casting 126, on which the pads 109 are mounted, with support shaft 121. As already described, these components are fitted to one another by screws 126A. The holes through which screws 126A pass have a degree of tolerance and as such, in order to align the components correctly, grub screws 112 are provided which pass through the top surface of casting 126 and rest on the upper side of support shaft 121. By urging the casting 126 against support shaft 121 via grub screws 112 during assembly, the components are held in fixed alignment whilst screws 126A are tightened. The depth of grub screws 112 can be adjusted by turning them, which allows a coarse adjustment of the feed gap to be made during assembly or servicing.

The normal separation for the feed gap is set so that the pads 109 are centrally set to the feed roller assembly 132 and gently rub the high friction inserts 133 when the adjuster wheel 117 is closed by three notches.

To set the feed gap from scratch, the following method may be followed:
1. Slacken the screws 126A that hold the casting 126 to the support shaft 121.
2. Turn the adjuster wheel 117 to the fully closed position, then open it by three notches.
3. Adjust the grub screws 112 on the top of the casting 126 until the pads 109 feel to be just touching the feed roller assembly inserts 133.
4. Ensure the pads 109 are set centrally by sliding the casting 126 sideways as required.
5. Retighten the screws 126A.
6. Open the adjuster wheel 117 by three notches.
7. Check the feed gap using a 0.2 mm feeler gauge or two strips of paper.
8. If the feed gap is too large or too small on either side, slacken the clamp screws 126A, adjust the grub screws 112, retighten the clamp screws 126A and recheck.

To recheck and set the feed gap on a machine previously set:
1. Close the adjuster wheel 117 until the pads 109 are just touching the feed roller assembly inserts 133.
2. Open the adjuster wheel 117 by three notches.
3. Follow steps 7 and 8 above.

The support shaft 121 is additionally used to mount two roller arms 122, one either side of the casting 126. Each roller arm extends rearwardly to rest against the detector box plate 201 via screws 122a at locations adjacent to apertures 106 in the detector box plate 201. A roller 125a and 125b is mounted on each roller arm 122 and extends through the aperture 106. These rollers form part of the transport system 300 and are described in section 3.

Pegs 124 mounted on the outer ends of the support shaft 121 are used to support hinge springs 123 which act against the rearward end of each roller arm, via screw 122a, and against the adjuster shaft 116. The adjuster shaft 116 is provided with two circumferential grooves 116b which locate the ends of hinge springs 123. Thus the rollers 125 are biased towards the banknote transport path.

1.2 Feed Rollers

As already described, the stack of banknotes rests on top of feeder wheels 140a and 140b and feed roller assembly 132. The feeder wheels 140a and 140b are mounted on front feeder shaft 131, and fixed relative to the shaft by pins 136 (see FIG. 1c). The front feeder shaft 131 is supported between the sidewalls 602 and 603 of the metal framework 600 (FIG. 6), in flange bearings 154 and 157. The shaft 131 is referenced against the left hand side of the framework by spring 153 acting against clip 155.

Each feeder wheel 140a and 140b is provided with a respective insert 141a and 141b of a high friction material such as silicone or rubber. Each insert 141 stands proud of the wheel surface and has a series of grooves running parallel to the wheel axis. The inserts fit into a recess provided in each feeder wheel 140a and 140b so as to complete the circumferential surface of the wheel. The recesses are provided with a keying feature which protrudes radially and cooperates with a corresponding groove in the inner face of the insert 141. These keying features run parallel to the axis of the feeder wheel 140 such that the insert can be fixedly retained in the feeder wheel 140 by sliding it relative to the wheel until its sides register with the sides of the wheel. This also allows for straightforward removal and replacement of the insert during the lifetime of the machine.

The remainder of the feeder wheel circumference is integral with the feeder wheel moulding and is made of a plastics material having a relatively low friction. This section of the feeder wheel is therefore unable to impart drive to a banknote resting on top of the wheel. The relative proportions of the high friction and low friction areas of the wheel circumference are selected such that a single note is transported per revolution of the feeder wheels 140. This is achieved by matching the distance traveled during one revolution by the high friction portion (the insert 141) to the length (short edge dimension) of a typical note. The limiting factor is the length of the smallest note which the machine may encounter: the insert must be short enough to contact only a single one such note during one revolution, yet long enough to ensure the note reaches the transport system 300.

The feed roller assembly 132 is mounted on rear feeder shaft 130, which is supported by flange bearings 151 and 156 in the metal framework 600 towards the detector box. The feed roller assembly 132 is centred on the rear feeder shaft 130 such that it is located between the two feeder wheels 140a and 140b. The feed roller assembly consists of a drum made of plastics material having two feeder tracks 135A, 135B on its left and right sides. The feeder tracks are separated by a central ridge 135 which, as described above, contacts the pinch roller 110 in use. Each feeder track 135A, 135B is opposed by a rubber pad 109, shown in FIG. 1b, which is mounted to the detector box plate 201 by moulding 126. Like the feeder wheels 140, a portion of each feeder track 135A, 135B is provided with a high friction surface, whereas the remainder of the track is smooth. The high friction portions are provided by inserts 133a and 133b, made of grooved rubber, which fit into recesses 134a and 134b respectively. The inserts 133 may be overmoulded into the roller or may be fixed in place by adhesive. After assembly, the whole length of each feeder track is provided with a circumferential channel. In the low-friction portion, this increases the distance between the surface of the feed roller assembly 132 and the corresponding rubber pad 109, thereby assisting in the prevention of transmission of drive to the banknotes for a proportion of each revolution. In the high friction portion, the channels cause a degree of corrugation which helps to separate the notes. The relative proportion of the high friction surface compared to the low friction surface is selected such that a single note is fed per revolution of the feed roller assembly 132, and again this is achieved by ensuring that the high friction surface (insert 133) covers a distance approximately equal to the length of a banknote during one revolution.

The high friction portions of the feeder wheels 140a and 140b and the feed roller assembly 132 are positioned relative to one another such that as the banknote leaves the high friction portion of the feeder wheels 140, it is picked up by the high friction portion of the feed roller assembly 132. The relative position of the high-friction inserts 133,141 on the feeder wheels 140 and the feed roller assembly 132 is known as the feeder timing. This timing can be adjusted by sliding the timing belt 194 off the front feeder shaft cog 196, rotating the front feeder shaft 131, and then re-fitting the belt 194. The timing should be set such that both the feeder wheel inserts 141 and the feed roller assembly inserts 133 become visible above the feed plate 101 at the same time. The tolerance on the setting is +/−one tooth.

The pinch roller 110 acts against the central ridge 135 of the feed roller assembly 132 to provide additional drive once the banknote has been fed past the free wheeling roller 113. This ensures that the banknote reaches the first pinch point in the transport system 300, discussed below in section 3.

1.3 Feeder Module Drive

The front and rear feed shafts 130 and 131 are driven by feeder motor 199. This is mounted to the inside of the metal framework 600 on the left hand side panel 603 near to the base of the machine. The front feeder shaft 131 is provided with a cog 196 which clips on to a non-circular end portion of the shaft 131. The cog 196 is driven by motor 199 through motor cog 198 and timer belt 195. The rear feeder shaft 130 is provided with a similar cog 197 which is driven by a second timer belt 194 directly from cog 196 on the front feeder shaft. The feeder wheels 140 and feed roller assembly 132 are thereby constrained to rotate in the same direction and at the same speed at the surfaces of the rollers. The back EMF of the drive motor 199 is monitored in order to measure the speed at which the shafts 130 and 131 are rotated, and this is controlled using a pulse width modulated signal from the control PCB. The actual speed of the notes is determined based on the note throughput, which is monitored by a track sensor in the detection box 200 (see section 2.1).

In conventional feed systems, when feeding is to be stopped, the voltage applied across the motor is reversed for a predetermined period of time to decelerate the feed rollers and bring them to a halt. This technique carries the risk that the predetermined duration of the reverse voltage may in practice be too long, in which case the feed rollers begin rotating in the wrong direction. If there are any notes left on the feed plate, they are ejected backwards from the machine.

In the present banknote counter, such problems are overcome by the provision of bipolar monitoring systems which can measure current and/or voltage in the forwards and backwards directions. On starting feeding, the "start-up" current required to start the rollers and bring them to their operational speed is monitored and recorded. When it is desired to stop feeding, a reverse current is applied and this is monitored and compared with the recorded, start-up current. From the start-up current, the reverse current required to stop the feed rollers (i.e. stall the motor) can be determined accurately and, when the monitored reverse current reaches that point, the current is switched off. Thus the feed rollers are stopped precisely at the point at which the motor halts, and there is no risk of running backwards.

Figure 1D:
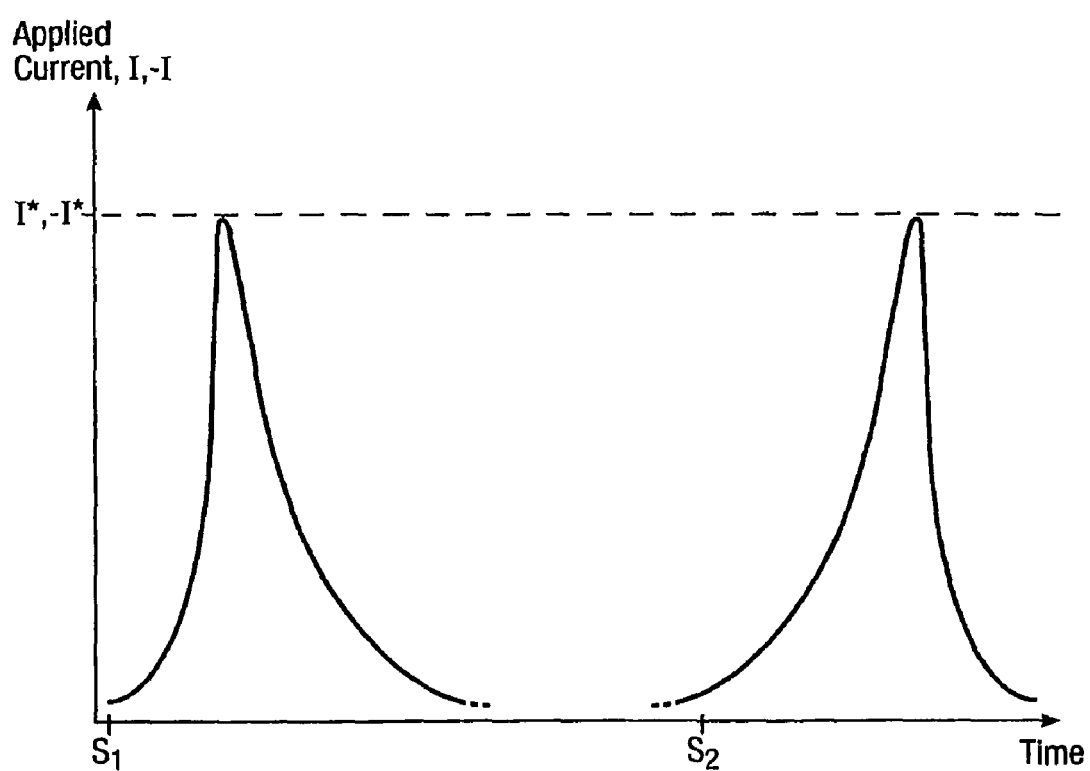
FIG. 1d is a graph showing the magnitude of the current applied to the feeder motor varying with time during a typical start/stop cycle.

FIG. 1D illustrates the motor current during a typical start/stop cycle. On receipt of a start signal at time $S_1$, the processor supplies power to the motor and the current level is monitored and fed back to the processor. The processor also monitors the actual speed of the rollers via timing wheel 390 (see Section 3 below) or the back-EMF of the motor 199. When the rollers reach their predetermined operational speed, the processor records the current applied, I* and reduces the applied current to prevent further acceleration. When the system reaches a stop signal at time $S_2$, (e.g. because the current batch is complete), the processor applies a reverse current to decelerate the motor. The level of reverse current is monitored and, when it reaches the same magnitude as the recorded level of forward current I* (or falls within a predefined tolerance range), the supply power is halted. In this way the roller assembly is halted before it can rotate backwards.

As a safety precaution, in some cases the system will apply additional monitoring means by timing how long it takes for the rollers to reach operational speed on start up and, using this time as a guide when decelerating. If the deceleration continues for significantly longer than the recorded time period without reaching the recorded current level I* the system may deduce that an error has occurred and halt power supply to the motor.

2. DETECTOR BOX 200

The detector box 200 is pivotally mounted to the rear of housing side panels 602, 603 and comprises a detector box plate 201 of stainless steel with two lateral sections 202, 203. Each lateral side section 202, 203 is connected to a respective housing side panel 602, 603 by means of a washer assembly 212 mounted within, and either side, of apertures 214, not shown. The detector box is mounted opposite the feeder mechanism 100 and above the transport mechanism 300 and also includes the feed adjuster assembly.

On embodiments comprising detectors in addition to a track sensor 209, a bracing plate 204 is attached at an angle to the horizontal at the centre of each of the lateral sections 202, 203. Upon this bracing plate 204 a number of printed circuit boards (PCBs) are mounted. Typically, one PCB is attached to the bottom of the bracing plate 204 and one or more PCBs 206 are attached to the top. PCBs are fastened to the bracing plate 204 using one or more plastic fastening pins 205. The bracing plate 204 can be removed from the detector box plate 201 by unscrewing two screws 207 that fasten the bracing plate 204 to the lateral sections 202, 203, enabling the PCBs mounted thereon to be removed for servicing or replacement.

The detector box provides a modular mounting platform for any detectors required by the system that act on banknotes passing along the transport path, together with the integrated circuits that control such sensors. The whole detector box assembly can be removed by unscrewing the screws attaching the lateral sections of the detector box 200 to the housing side panels 602, 603 allowing easy disassembly for service or replacement.

There are a number of detector modules that can be mounted within the detector box and these will be described in turn below.

2.1 Track Sensor

The track sensor is the most basic detector available and typically comprises an infrared LED and a photodiode. Its role is to track the arrival and departure of each individual note as it moves along the transport pathway. This signal can then be used as part of counting operations. Typically, the detector is located near the centre of detector box plate 201.

When other detectors are mounted within the device the signals from the track sensor are routed to the detector box PCB 206 for processing. If no additional detectors are mounted then the signals from the photodiode sensor are communicated to the main controller PCB 610 of the banknote counter in order to count the number of notes passing through the transport.

2.2 Ultra Violet (UV) Fluorescence Detector

The banknote counter typically uses UV detector systems based on two common methods: measuring the fluorescence of a banknote under UV radiation and measuring the amount of reflected UV light. The UV fluorescence detector operates according to the principles of the first method.

Common copy paper has the property that it emits radiation in the visible blue spectrum under illumination from a UV source. This is due to the presence of excitable compounds within the paper. In order to prevent counterfeiting most banknotes are printed on security paper that is designed to emit a very low level of visible blue radiation under UV illumination. These differing fluorescence levels can thus be detected using suitable sensors and used as the basis of an authenticity test.

The UV fluorescence detector comprises a suitable UV source for illuminating a section of the banknote and a photodiode for measuring the visible blue fluorescence: if a low level of fluorescence is detected then the base paper is UV "dull" and is likely to be genuine; if a high level of fluorescence is detected then the base paper is UV "bright" and is likely to be counterfeit. Such a decision can be made using standard logic or probabilistic methods known in the art, a preferred approach using a threshold applied to the photodiode signal. Typically the photodiode signal is also amplified several times within a PCB attached to the UV fluorescence detector to obtain a higher signal to noise ratio, before being sampled and digitalised by a sensor signal-processing unit located on the main detector board PCB 206.

The monitoring of the visible blue radiation intensity is carried out by a data processing and detector control processor connected to the sensor signal processing unit and illumination control unit. The processor receives pulses at a rate of 1 kHz and uses these pulses to sample the intensity in an integrate-and-dump manner. Alternatively, the processor can receive encoded pulses from the transport system control electronics, allowing the processor to monitor the speed of movement of a banknote and hence appropriately control sampling of the sensor output signals.

Often banknotes contain additional fluorescent security features that emit radiation in other visible bands. These features allow additional authentication when a banknote is manually inspected under UV light. However, these features can interfere with the detection of blue fluorescence as a UV "bright" signal can be recorded from a fluorescent security feature even if the banknote is genuine and composed of UV "dull" security paper. The banknote counter addresses this problem in two ways: one, by providing an optical filter stack in front of the photodiode; and two, by analysing the photodiode signal as a banknote passes and ignoring a "bright" response that is only present for a fraction of the short edge length of the banknote. The former acts as a tight narrowband filter, only passing visible light in the blue bandwidth appropriate to copy paper fluorescence. The latter is calculated by the sensor signal-processing unit using the arrival signal from the track sensor 209 and the speed of operation from the main control PCB 610.

Preferably, a 380 nm UV LED provides the UV source. The UV source may either provide a constant illumination level or, for detectors that are required to work in noisy conditions, stray light etc, then the illumination source may be modulated. The control of a source can be provided by an illumination control unit mounted upon the detector box PCB. A reference offset is also used to compensate for background blue light. This is calculated by switching off the UV source and recording the signal received at the photodiode. This offset can then be subtracted from the measured signal when using the detector.

2.3 Paper Property Detector (PPD)

The second method of authentication using UV radiation monitors the amount of UV light reflected from a banknote. From experimental tests it has been determined that genuine banknotes reflect a higher level of UV radiation than counterfeit notes. The difference in reflected UV is significant in the 350 nm to 400 nm wavelength band.

The UV reflectance or PPD detector thus comprises a UV source and a photodiode adapted to measure the intensity of reflected UV radiation. These components are mounted upon a small PCB that performs much of the low-level processing. The UV illumination source is again typically a 380 nm UV LED, which allows a longer wavelength of UV radiation to be used within a smaller wavelength range, when compared to standard UV lamps. Typically an optical filter is also placed before the photodiode to filter out any visible light that may affect the measurement of UV radiation.

In operation, the PPD detector will determine the amount of UV reflected from the first banknote in a batch. This intensity signal will then be amplified within the source and sensor PCB and fed to the sensor signal processing unit and illumination control unit upon detector box PCB 206. This unit will record the level of reflectance and use this as a reference for the other notes. Thus on the feeding of the next banknote in the batch, the unit will check that the intensity of the reflected UV light lies within a user defined range centred on the recorded reference intensity. If the banknote lies outside of this range then a counterfeit error will be signalled.

In other embodiments, if the first banknote in a batch can be denominated then a typical value of UV reflectance, or a typical range of UV reflectance, can be retrieved from the memory of the banknote counter based on the current currency and detected denomination. Subsequent banknotes can then be analysed to see whether the level of UV reflectance falls within a range based on the retrieved data. Alternatively, when operating with mixed denominations each note is denominated and then the recorded UV reflectance value is checked against a retrieved range for the chosen denomination.

Additionally, the reference used in the two processing methods need not be obtained from the first banknote alone, but can be determined dynamically and/or cumulatively based on the detected reflectance value for a plurality of processed banknotes.

2.4 UV Combined Sensor Housing

The two UV detectors described above can be combined into a single assembly that uses one UV source and two photodiodes: one to measure the fluorescence of the banknote and the other to measure the reflected UV. Two sets of optical filters are also placed in front of the two photodiodes as described previously. Both detectors remain independent but the use of a single UV LED reduces power consumption.

Typically, the UV LED and the two photodiodes are contained within a single assembly located between the transport rollers. The plane of the assembly face is orientated so that the upper section of such an assembly is indented below the surface of the detector box plate 201 and the lower section of the assembly protrudes from the same surface. The indentation and protrusion are typically of a few millimeters. A note passing through the transport path will meet the indentation before the protrusion, and thus the orientation of the assembly face prevents notes becoming snagged upon the sensors and aids note transfer through the transport path.

Where only a reflected UV detector is provided, authenticity will typically be confirmed if the amount of reflected UV exceeds a threshold or lies within a predetermined range. Where a fluorescence detector is also provided then an additional test can be made, the document being confirmed as genuine only if the level of fluorescence falls below a predetermined threshold.

Where two detectors are provided, the UV LED current is calibrated to be the same for the operation of both detectors. The calibration process involves: inserting a special calibration document with known UV fluorescence and reflectance properties; calibrating the UV fluorescence detector to set the LED current and amplifier gain using the fluorescence calibration value for the document; and calibrating the reflectance amplifier gain using the reflectance calibration value for the document, noting that the LED current remains the same as for the UV fluorescence. The calibration settings (LED current and amplifier gain) will remain as calibrated until the next calibration is performed by a service engineer.

Further details of a combined UV detector can be found in European Patent EP1254435.

2.5 Size Detector (SD)

The size detector measures the short-edge dimension of a passing banknote. The short-edge measurement can then be used to denominate currencies whose notes have different short-edge sizes or to authenticate notes of currencies with a common short-edge size. The former enables users to identify a rogue denomination in a bundle of notes, provided the size difference is large enough between adjacent denominations. The identification of a denomination from the short-edge measurement is performed by using the measured short-edge value as a reference in a denomination table. The denomination table is stored in memory and contains the expected short-edge size or size range for each denomination used in a particular currency. The denomination table is typically pre-loaded in the banknote counter.

The size detector uses a plurality of LEDs 211, mounted within a polymer casing 252 with a hemispherical profile, positioned opposite two transmissive optical sensors 210a, 210b mounted inboard of the drive rollers. The polymer casing 252 is attached to transport roof plate 250 and forms part of the transport pathway. Typically such optical detectors operate in the infrared radiation (IR) band. Whilst the system herein is described with relation to a transmissive system, radiation can also be measured in a reflective capability by replacing sensors 210a and 210b with their equivalent reflective counterparts.

The transmissive optical sensors 210a, 210b measure the amount of light radiation transmitted, in use, from the plurality of LEDs 211. The sensor signal will be attenuated when a banknote moves along the transport path and blocks the transmitted light. The signals from the detectors are feed to, and processed by, the main detector box PCB 206. The note size measurement is calculated by processing the attenuated signals from the optical sensors 210a, 210b together with the speed of the passing note to determine the position of the leading and trailing edges of the notes.

By comparing the signal from the left detector 210a with the signal from the right detector 210b a skew measurement can also be calculated that is proportional to the angle of the short-edge of the banknote with the horizontal. Compensation for skew can then be applied to the signal data and the subsequent size measurement can be compared with calculator limits to determine the note acceptability. The skew measurement is also stored in memory and can be used to correct data obtained from other detectors.

2.6 3D Detector

The 3D detector combines the SD detector described previously with an additional detector to measure the long-edge dimension of a banknote. This additional dimension improves the banknote counter's ability to identify the denomination of a given banknote and provides another parameter that can be checked for authenticity. A 3D detector is required for denominating currencies that have a common banknote short edge length across several denominations, for example the Euro. In these cases a short edge dimension alone is not enough to differentiate between denominations.

Figure 2A:
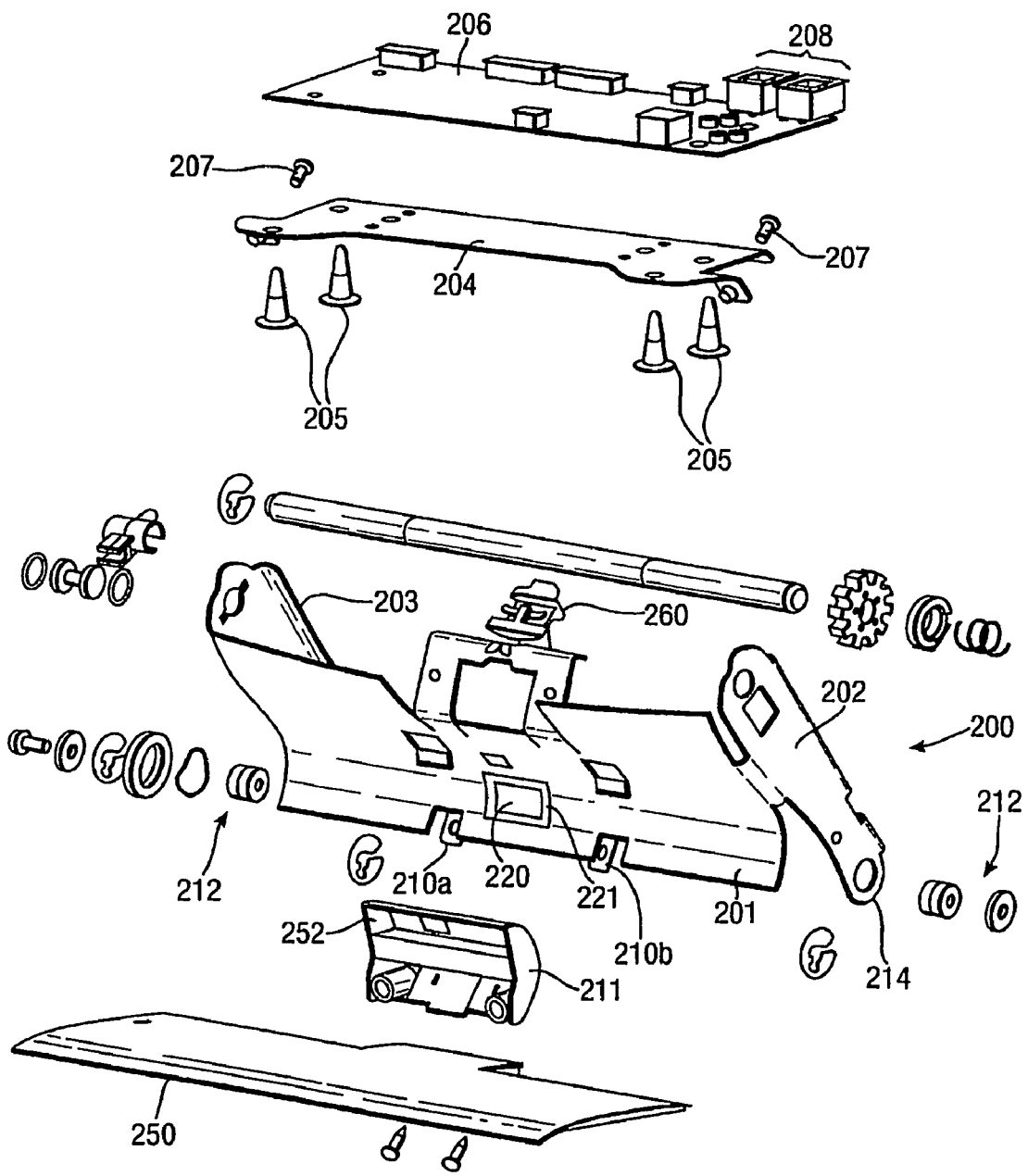
FIG. 2a is an exploded view showing components of the detector box.

With reference to FIG. 2B, the 3D detector consists of one illumination and sensor array mounted inboard of the drive rollers, and two illumination and sensor arrays mounted outboard of the drive rollers, either side of a note path. The detector arrays are orientated transversely to the transport path and each illumination array consists of a polymer casing 252, within which are mounted a plurality of LEDs 253, preferably fifteen. This plurality of LEDs 253 provides an even level of illumination to a sensor array 251 mounted within die-cast housing 270. Each sensor array 251 is mounted on the opposite side of the transport path to the respective plurality of LEDs 253 and includes a strip photodiode, coated with an IR transmissive filter material, and aligned with the illumination arrays. The IR transmissive filter material is IR transparent with a visible blocking resin to reduce the effects of the SD detector and any UV detectors present, as well as the effects of ambient lighting. The sensor photodiode is also covered with a light control film which collimates the light and also reduces the effects of stray light. Each of the three photodiodes is actually made up of three separate photodiode chips wired in parallel, effectively acting as a single larger photodiode chip.

Each sensor also consists of scanner electronics to determine those elements exposed to the illumination and those shaded by the passing document. The control signals for illumination arrays are communicated through a flexi-circuit mounted onto the transport roof plate 250 and a cable to the detector box PCB 206. The data from the photodiode sensor is transmitted via a cable to the size controller upon the detector box PCB 206. The detector box PCB 206 then processes the information to decide the size of a note and, possibly, the denomination.

Die-cast housing 270 is screwed to the lateral sections 202,203 of the detector box plate 201 at location 271. In order to accommodate the die-cast housing 270 a section of the detector box plate 201 is removed to raise the lower edge of the plate. In use, the die-cast housing 270 fits above the double detector rollers and opposite the transport rollers. As all the 3D sensor assemblies are sealed within the die-cast housing 270, the detector can be removed as one complete unit. Thus the sensor assemblies can easily be removed for servicing or replacement. A metal housing is also used to prevent static.

In order to prevent interference between the SD and 3D illumination and sensor systems, the SD LEDs 254 mounted within the 3D illumination arrays emit light of a different wavelength to the IR LEDS used by the 3D system. Typically, yellow LEDs are used in the SD system and the SD sensors 210 are adapted and/or filtered to only detect light in the yellow waveband.

As a banknote passes the row of illumination and sensor arrays, the detectors begin a scan of each of the LEDs in each of the three arrays of LEDs 253, beginning with the right or left most LED in each set. The IR radiation is transmitted across the transport pathway and is detected by the one or more photodiodes 251 located opposite. The measured IR intensity is then sampled to generate a pixel covering a predetermined area opposite each LED, this information being stored in a memory upon the detector box PCB 206. This process is repeated for each LED of each array of LEDs 253, the "n"th LED of each array being lit simultaneously, until one scan line of pixels is complete. Multiple scan lines, performed in the same manner with subsequent LED cycles, are further recorded in order to determine the dimensions of the note. If a banknote obstructs the transmission of the IR signal then a lower intensity measurement will be made. By comparing the location of high intensity and low intensity pixels the location of each of the long-edges of a banknote can be made. For greater resolution the data is often interpolated to gain accuracy of +/−2 mm.

To prevent loss of resolution due to the positioning of transport rollers 302a and 302b in between the three illumination arrays, the LEDs located either side of the transport rollers are angled towards the transport rollers at an acute angle to the plane of the transport rollers 302a and 302b. This configuration and an equivalent 3D detector process are described in more detail in EP1248224.

2.7 Infra Red (IR) Detector

The IR detector comprises three illumination and sensor arrays to measure the IR transmission properties of a passing banknote. The resultant IR image of the note can be used for authentication and possibly denomination, depending on the currency counted. The IR detector is typically combined with the 3D detector as it uses the same set of IR illumination and sensor arrays as illustrated in FIG. 2B.

As a banknote passes, the detectors begin a scan of each of the LEDs in each of the three arrays of LEDs 253, beginning with the right or left most LED in the set. The IR radiation from each LED is transmitted through the banknote in dependence upon the materials on or in the banknote and is detected by the one or more photodiodes 251 located opposite. The measured IR intensity is then sampled to generate a pixel covering a predetermined area opposite each LED, this information being stored in a memory upon the detector box PCB 206. Like the 3D detector the IR illumination arrays are connected to the detector box PCB 206 via a flexi-circuit mounted on the transport roof plate 250 and a cable. This process is repeated for each LED of each array of LEDs 253 in the same manner as the 3D detector until one scan line of pixels is complete. Multiple scan lines, performed with subsequent LED cycles, are further recorded in order to produce an IR image of the note.

A microprocessor is also connected to the memory. The microprocessor is programmed to identify the denomination of a banknote and/or its authenticity using some or all of the entire resultant IR image. In one example, the denomination and the authenticity are determined separately. For example, certain regions of a banknote can be reviewed for the purposes of denomination, if the current currency contains clear IR features that change with denomination. The same regions can also be used to authenticate notes denominated using other detectors. Other regions that remain constant across different denominations can also be reviewed for the purposes of authenticity of a currency. However, in other applications, particularly if the whole banknote is considered, then a single processor can be used to establish both denomination and authenticity.

A typical algorithm for determining denomination and authenticity first measures the short-edge and/or long edge dimensions of a banknote using the SD and/or 3D detectors. This provides one or two parameters to reference the denomination look-up table for the currently selected currency. Once the denomination has been determined, the recorded IR image is checked against a reference IR image for the current denomination stored within memory. The reference IR image is addressed using data stored within the current denomination entry of the denomination table. If the recorded IR image and the reference IR image match according to certain comparison criteria then the denomination and authenticity can be confirmed. If the images do not match then an error is signalled.

In other situations a currency may use a plurality of notes with a common size. In this case the short-edge and/or long edge dimensions can provide a plurality of references in the denomination look-up table for the currently selected currency, and thus a plurality of possible reference IR images. The recorded IR image can be compared with the reference images from the plurality of denomination candidates and any match will confirm the current denomination. If there is no match then an error can be signalled.

An example of a system using IR detectors can be found within published European patent application 1366472.

2.8 Enhanced Magnetic (EMG) Presence Detector

The EMG detector provides a method of determining if a banknote has any magnetic material in its central portion and is used as a test for authenticity.

The detector assembly 220 for this sensor is typically mounted within a plastic housing 221 below the UV sensor in the centre of the detector box plate 201. In other embodiments the EMG head can be positioned anywhere along the note path. Additionally, a plurality of heads could be to give better note coverage. The EMG detector is connected to a separate control PCB (not shown) mounted to the rear of the detector box plate 201. In previous banknote counters the EMG detector was coated in a beryllium copper "shim". However, within the current embodiment the EMG detector has a ceramic coating that increases the durability of the head.

The detector assembly 220 comprises two inductive heads, which measure different magnetic properties of the banknote. The first head is an active head and thus generates a magnetic field. If the banknote contains magnetic material this becomes magnetised and alters the nature of the magnetic field, which is detected by circuitry within the first head to record a first magnetic measurement. The second head is passive and so does not generate a magnetic field. It measures any magnetic field that remains due to magnetised material in the banknote, after the magnetic field generated by the first head has decayed. This second measurement is referred to as a 'soft' measurement. Such signals are then transmitted to the detector box PCB 206 where they can be used as a measure of authenticity. Typically authenticity is determined using calculations based on the ratio of the two measurements. The ratiometric measurement can be compared with expected measurements for known banknotes stored in memory. However, in other embodiments each signal could be analysed separately, for example by comparing the measured level with a threshold.

The EMG detector can also be used in a reduced functionality mode wherein only one of the heads is operation. This allows the detection of magnetic material but does not distinguish between a 'hard' and 'soft' detection.

2.9 Superior Magnetic Detector System (SMDS)

This detector system is used to check for the presence of a security thread that may be printed on banknotes and read information coded within the thread. Such a security thread may be a simple metallic thread or comprise segments of magnetic material and segments of non-magnetic material. It is possible to arrange the segments of magnetic and non-magnetic material such that they represent a code. For example the segments can be arranged into fixed length elements so that they represent a binary word and this word may be repeated several times along the thread. In one example, the fixed length elements may have a length of 2 mm, the presence of magnetic material indicating a binary 1 and the absence indicating a binary 0.

Figure 2C:
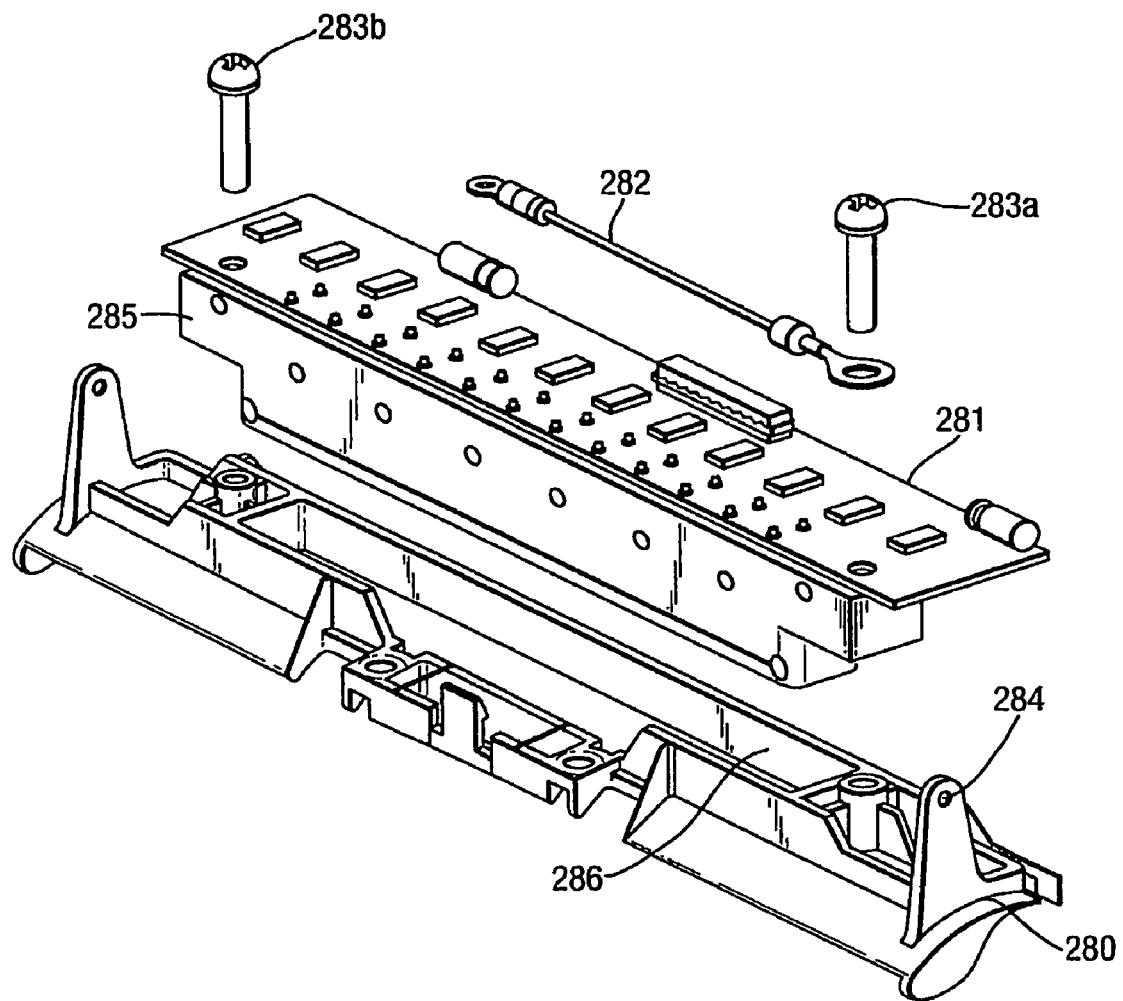
FIG. 2c is an exploded view showing an SMDS detector.

The SMDS detector is shown in FIG. 2C. The magnetic head assembly 285 is attached to a low-level signal processing PCB 281 and the two items fit into aperture 286 within plastic moulding 280. The signal processing PCB 281 is secured using screws 283*a*, 283*b*. Earthing rod 282 is electrically connected to screw 283*a* and plastic moulding 280 in turn. In use, the plastic moulding 280 is connected to the lateral sections 202,203 of the detector box via joints 284, in a similar manner to the 3D die-cast housing. However, unlike the 3D detector housing the various components of the SMDS detector can be disassembled. The SMDS detector is grounded to the metal chassis of the banknote counter.

The arrangement of the SMDS detector in use is similar to that of the 3D/IR detector shown in FIG. 2B. The array of heads sits in the same position as 3D/IR sensor arrays 251, opposite a series of foam rollers located in place of the 3D/IR LED arrays 253 within polymer casing 252. The array of heads covers the majority of a passing note and the three sets of rollers mounted opposite the detector head ensure the notes make adequate contact. Signals from the detector then pass to the detector board PCB 206 for initial processing. A detector processor will then receive data gathered by the detector interface and will pass denomination and authenticity information to the main controller. On some currencies banknote issue information can also be retrieved from the coded thread and used by the main controller.

The code within the thread is read by temporarily magnetising any magnetic material within a thread and arranging for the banknotes to be carried by the transport mechanism so that they pass by the array of magnetic heads, the magnetic material of a thread being in close proximity to the heads. Each of these heads then generates a signal upon detecting a portion of a thread.

As the lateral position of a magnetic thread may vary from note to note and with lateral movement of the note with the transport, a series of magnetic heads, typically twelve, are arranged transversely to the transport pathway. After a note has passed the array of heads by a small amount, typically 22 mm, a primary head is designated by the detection of a signal corresponding to a thread. One or more secondary heads are also designated as the heads on one or both sides of the primary head. Output signals from the primary and secondary heads are monitored to generate a representation of the thread, and the magnitude of the primary and secondary signals are compared such that if the magnitude of the output signal from a secondary head exceeds that from the primary head, the primary and secondary heads are reallocated accordingly. Because typically the code on the thread is non-symmetrical and digitisation starts before the end of the note, it is possible to know the denomination, facing and orientation of the note very soon after the note has traversed the detector.

In parallel all the channels are recorded to allow a magnetic image of the note to be captured. Positions on the note can then be checked for both absence and presence of magnetic features such as serial number ink, as predicted by the facing, orientation and denomination information already determined from the coded thread. The orientation and/or facing can also be determined from the position of the serial number. This allows advanced authentication and denomination pattern matching.

The information stored within the magnetic thread can be used for denomination and/or authenticity. When authenticating the banknote the detector typically checks whether a thread signal is detected, if it is then the passing banknote contains a magnetic thread and is likely to be genuine. The absence of such a signal can be used to generate a counterfeit error. When denominating the pattern of the code signal and/or magnetic features within the banknote are compared with reference patterns within a denomination table and the appropriate denomination is selected if there is a match. An example of systems using the SMDS principles can be found in European Patent Applications 1,221,679, 1,353,301 and 1,353,302.

2.10 Metallic Thread Composition

A metallic thread composition sensor can be provided which measures the composition of metallic materials within a metal thread to allow for authentication.

Figure 2D:
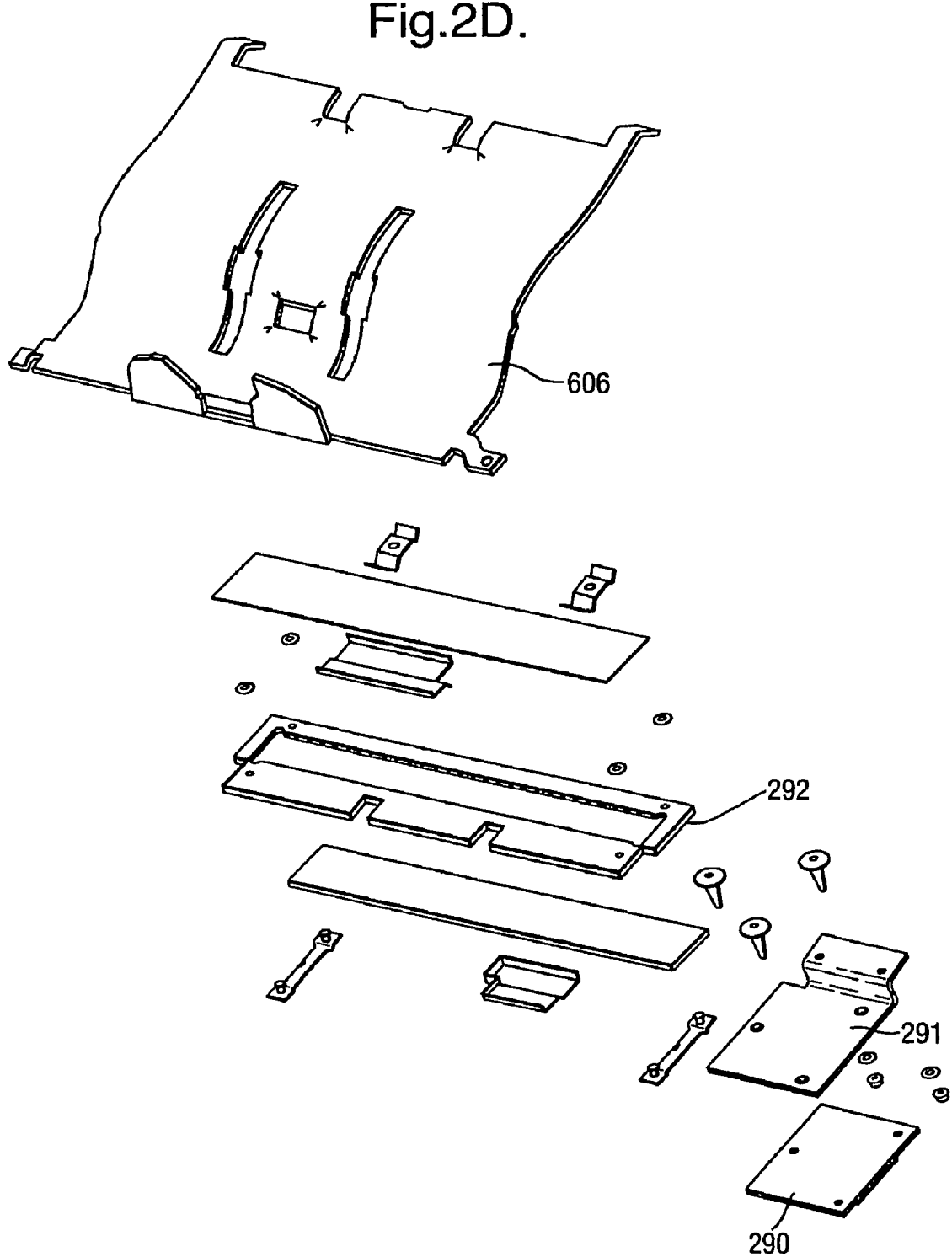
FIG. 2d is an exploded view showing a composition detector.
Figure 2E:
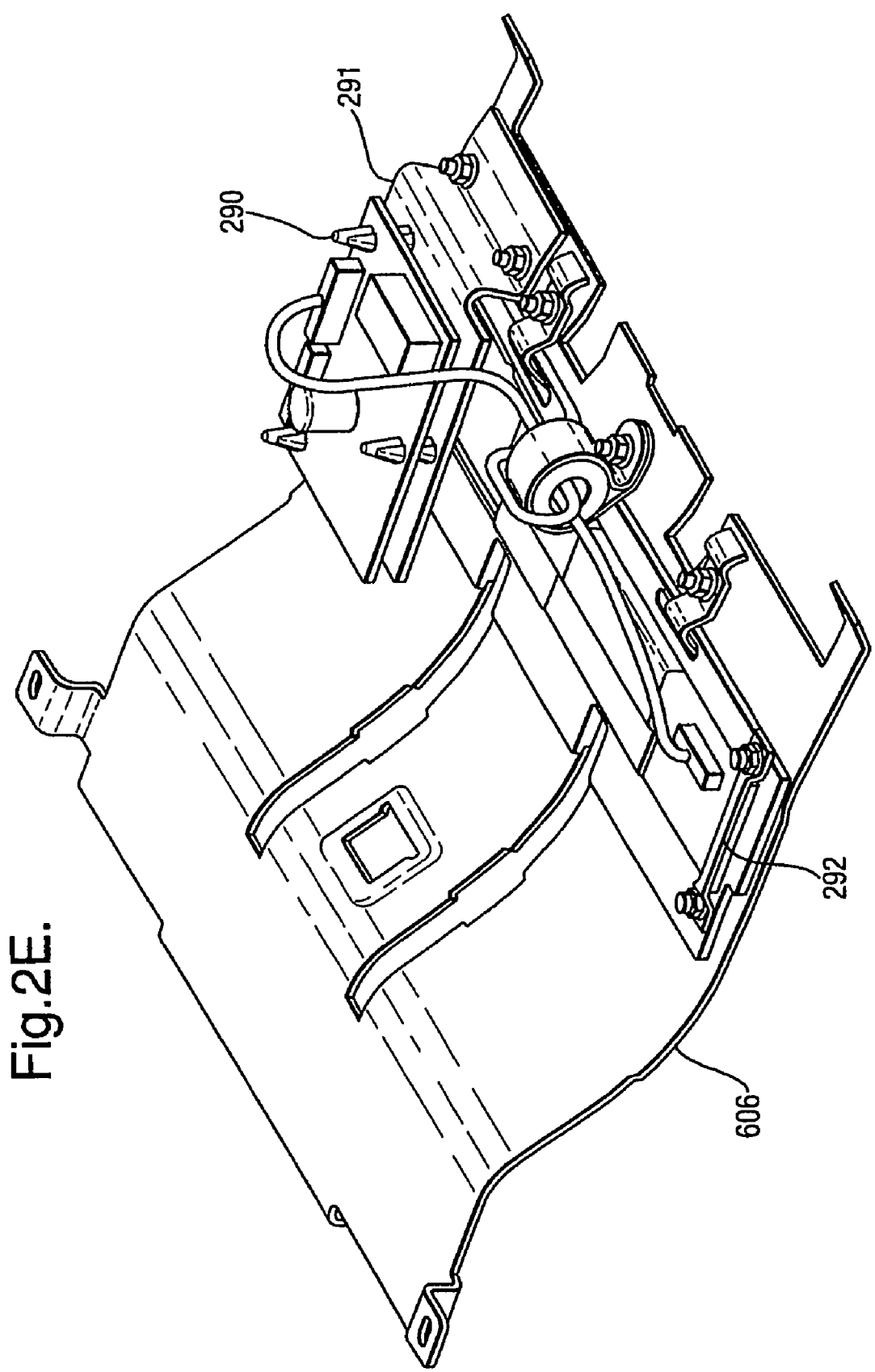
FIG. 2e shows the assembled composition detector of FIG. 2d.

FIGS. 2D and 2E respectively illustrate an exploded and assembled view of the composition detector. The detector head 292 is mounted above the stacker wheels 502*a*, 502*b* in transport plate 606. The detector head 292 is connected to a PCB 290 mounted on angled bracket 291 that is fastened to the top of the transport plate 606. The detector operates using capacitive coupling, wherein the detector head 292 forms an array of antennae that are adapted to transmit and receive electrical signals. Any metallic compounds within a passing banknote will alter the amplitude response and time characteristics of a received signal, which can be used to identify or authenticate a genuine banknote. Such a detector system is described in detail in published European Patent Application 0698866.

3. TRANSPORT SYSTEM 300

Once the note has been fed into the banknote counter 1 by the feeder module 100, it is picked up by the transport system 300 which transports the banknote past the detector box 200 to the stacker 500. The feed roller assembly 132 in combination with the pinch roller 110 provides sufficient drive to enable the note to reach the first pinch point of the transport system, after which the transport system 300 takes over movement of the note.

The components making up the transport system 300 are shown in FIG. 3.

Drive is provided by drive wheels 302*a* and 302*b*, which are mounted on drive shaft 301. Each drive wheel 302 has a metal core and a relatively high friction outer circumference, made for example of rubber. The drive shaft 301 is supported by bearings in the sidewalls of the metal framework 600. At its left end, the drive shaft couples with a pulley 397, which is driven via a rubber belt 397*a* by transport motor 399 and its associated motor pulley 398. Towards the right hand end of drive shaft 301, a spring washer 393 and clip 394 arrangement references the drive shaft 301 against the left hand wall of the framework 600.

The right hand end of the drive shaft 301 is coupled with a timing wheel 390 for monitoring the speed of revolution.

Unlike conventional timing wheels, the timing wheel 390 comprises slits which have a portion 390a which is parallel to the axis of rotation, in addition to a radial portion 390b. A slotted opto-sensor (not shown) is provided to monitor the rotation of the timing wheel 390. The sensor comprises a light gate (not shown) mounted on the control PCB (described in section 7 below), disposed such that the parallel portions 390a of the slits pass between its terminals as the wheel rotates. This arrangement has a number of advantages over conventional timing wheels having radial slits, including a simpler construction of components since the opto-sensor may be mounted directly to the PCB. Moreover, conventional timing wheels suffer from the accumulation of dirt and dust in the radial slits which can prevent the transmission of light, leading to an erroneous signal from the light gate. The use of parallel slits, such as portions 390a, prevents the build-up of dust in the slits by allowing any dust caught to exit through the slots by virtue of centrifugal force. The timing wheel is typically made of plastic and the slots are preferably formed by photolithography.

The intermittent signal from the slotted opto-sensor, combined with knowledge of the slit dimensions, permits accurate measurement of the speed at which the drive wheels 302a are rotating. The processing of this signal is described in greater detail in section 7 below.

The drive wheels 302 are opposed by two sets of rollers 125 and 406, thereby providing two pinch points along the transport path at which drive is transmitted to the banknote. The contact between the rollers 125 and drive wheels 302 provides the first pinch point in the transport system, which takes the note from the feeder module 100. The rollers 125a and 125b protrude through detector box plate 201 as shown in FIG. 3 and are mounted on spring-loaded roller arms 122 as described above in section 1.1. There is no drive supplied to the rollers 125 and they can therefore freewheel against the drive wheels 302. The rollers 125a and 125b are made of metal in order to provide a relatively low friction surface compared to the rubber coated drive wheels 302. This reduces the amount of friction between the two components which could otherwise lead to significant wear and overheating.

Along its lower edge, the detector box plate 201 meets the transport plate 606. This lower edge is provided with a cut-out 105 which corresponds to a cut-out 305 in the adjacent edge of the transport plate 606. When the detector box 200 is closed, the cut-outs 105 and 305 together form apertures through which rollers 406a and 406b extend. The rollers 406a and 406b form part of the doubles detector 400, which will be described in detail below in section 4. For the purposes of this discussion, it is sufficient to note that they are rotatably mounted on doubles detector shaft 401 and are not driven, thereby freewheeling against the drive wheels 302a and 302b respectively. Like the rollers 125a and 125b, doubles detector rollers 406a and 406b have a metal surface.

Thus a banknote enters the transport system 300 from the feeder module 100 and follows a U-shaped path around the drive wheels 302a and 302b, guided by the detector box plate 201 and transport plate 606 and driven at the two pinch points described above. From the second pinch point, the note passes into the stacker module 500, described in section 5 below.

A number of measures are taken to aid the smooth passage of the banknote through the transport system 300. All of the apertures and cut-outs in the detector box plate 201 and the transport plate 606 are provided with an indent surrounding their edges which face the oncoming banknote, such that the cut edge of the plate material is sub-flush. As a result, the leading edge of a banknote approaching for example apertures 106 (through which rollers 125a and 125b extend) will pass smoothly over the (flush) first edge of the aperture, since the banknote is well supported by the plate up to that point. Having passed over the aperture, the leading edge of the banknote is prevented from catching on the second edge of the aperture by the indentation.

Similarly, each sensor mounted in an aperture in the detector box plate 201 is arranged such that its leading edge is sub-flush and its trailing edge stands proud of the detector box plate 201. This avoids the banknote being caught by the second edge of the aperture, since the banknote surface is lifted away from the detector box plate 201 at this point.

The transport motor 399 is preferably controlled such that the surface of the drive wheels 302 run at the same speed as the surface of the feeder wheels 140 and the feed roller assembly (both of which are driven by feeder motor 199). However, in some embodiments, the transport system 300 may be driven at a rate slightly higher than that of the feeder module 100 so that the notes are "snatched" from the feeder module. This is of particular importance where very large notes are being fed, since the gap between the notes is smaller than in typical cases. Too small a gap does not give the control system sufficient time to analyse the detector results from each note as it passes. By arranging the transport motor 399 to drive the transport system 300 slightly faster than the feeder motor 199 drives the feeder module 100, notes are accelerated into the transport system and the gaps between them are increased. In some embodiments, the counter can be arranged to detect notes larger than a certain threshold and automatically adjust the relative speeds of the two motors 199 and 399. The sensors which carry this out are described above in section 2. The speeds of the motors are controlled by a pulse width modulated signal generated by the controller (see section 7 below).

4. DOUBLES DETECTOR 400

Figure 4A:
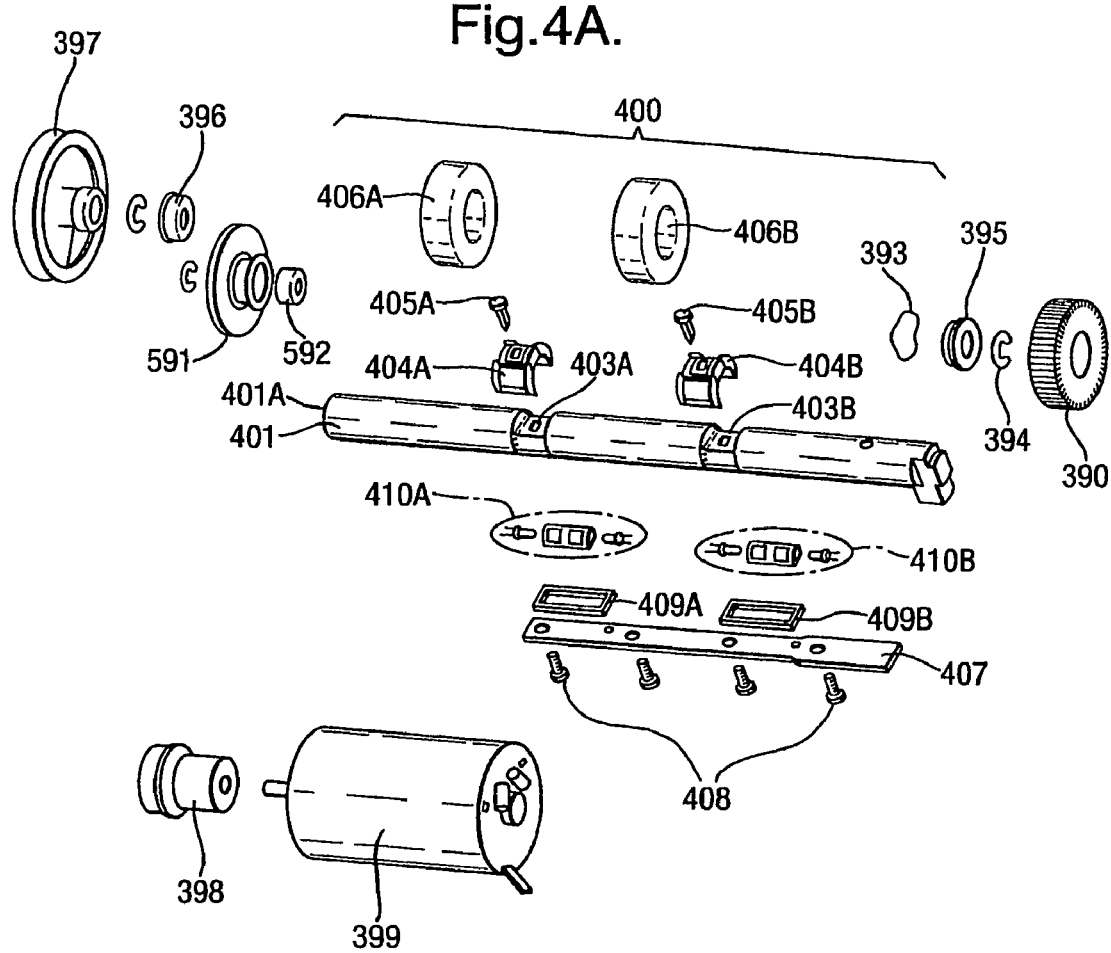
FIG. 4a shows an exploded view of the doubles detector components.
Figure 4B:
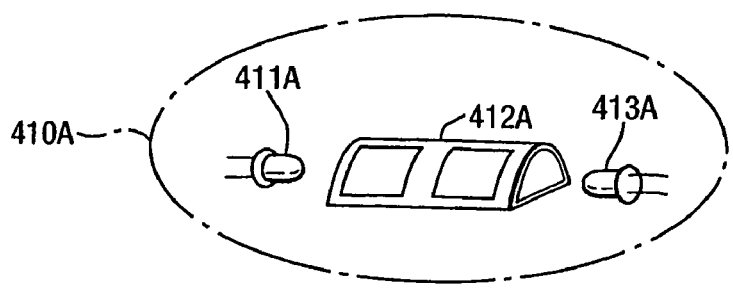
FIG. 4b is an enlarged view showing details of the opto-sensor assemblies.

As described in section 3 above, the second pinch point in the transport system 300 is provided by contact between drive wheels 302 and doubles detector rollers 406. In addition to this role in the transport system, the drive wheels 302 and the doubles detector rollers 406 together define sheet sensing apparatus for detecting the passage of two or more notes simultaneously and for counting banknotes. The detection of two or more notes passing simultaneously is termed doubles detection and the components making up the doubles detector 400 is shown in FIGS. 4A and 4B (note here the drive wheels 302a and 302b have been removed for clarity).

The doubles detector 400 and associated processing techniques are also described in EP-A-0168202, EP-A-0206675, EP-A-0451882, EP-A-0130825 and EP-A-0130824.

4.1. Doubles Detector Construction

As described in section 3 above, the drive wheels 302 are non-rotatably mounted to a drive shaft 301 which is rotatably mounted to the framework 600. Each drive wheel 302a and 302b has an outer anular portion 302a' and 302b' of rubber. Each drive wheel 302 contacts a respective doubles detector roller 406a and 406b, rotatably mounted on the doubles detector shaft 401. In the embodiment shown in FIG. 4A, the shaft 401 is provided with recesses 403A and 403B within which the rollers 406 are located. The drive shaft 301 is driven by transport motor 399.

The drive wheels 302 and doubles detector rollers 406 are spaced apart by a distance less than the thickness of the banknotes B being counted.

At least a portion of the doubles detector shaft 401 is hollow. In the present embodiment, the shaft 401 has a solid bore which is locally hollowed out from the back (not shown) to accommodate the opto-sensor assemblies 410a and 410b. The doubles detector shaft 401 is supported by the framework 600, and carries the two doubles detector rollers 406a and 406b. These are identical in construction and each contact a respective one of the guide wheels 302a and 302b. In the embodiment shown in FIG. 4A, the interior of the shaft 401 is accessed via removable base 407, which is affixed using screws 408.

Each doubles detector roller 406 comprises a roller bearing having an annular outer race 417, an annular inner race 419 and bearings 418 positioned between the inner and outer races. The bearing is mounted coaxially about the shaft 401 on a rubber portion 404. The rubber portion may be annular (as shown in FIG. 4C) or may surround only a portion of the shaft 401 towards the opposing drive wheels 302 (as shown in FIG. 4A). A pin 405, typically made of plastic, abuts the radial inner surface of the inner race 419 and extends through the rubber portion 420 and an aperture 415 provided in the shaft 401 so as to protrude into the shaft.

A moulded plastics holding 412 is mounted within the shaft 401. This housing 412 may be provided in the form of a single moulding extending between both doubles detector rollers 406a and 406b, in which case it comprises a central tubular portion 412c integral with end portions 412a and 412b, each of which have a bore 416a and 416b communicating with the tubular portion 412c. Alternatively, as shown in FIGS. 4A and 4B, the plastics housing 412 may be provided in the form of two separate components 412a and 412b making up part of the opto-sensor assemblies 410a and 410b (FIG. 4B), and the central tubular portion 412c may be omitted. Each component 412a and 412b is mounted on a plate 409a and 409b, on base 407, for ease of removal.

In the opto-sensor assemblies 410, a pair of light emitting diodes 413a and 413b are mounted in the inner ends of the bores 414a and 414b, while a pair of phototransistors 411a and 411b are mounted at the outer ends of the bores 414. For clarity, only portions of the connecting wires from the light emitting diodes and the phototransistors have been illustrated. In fact, these wires will pass along and out of the shaft 401 to monitoring circuitry to be described below. To facilitate assembly, all wires extend from the same end of the shaft 401. Each portion 412a and 412b of the housing also has an aperture 416a and 416b communicating with the bore 414a and 414b and in alignment with the aperture 415a and 415b respectively. The pins 405a and 405b extend through the apertures into the bores 414a and 414b.

Figure 4D:
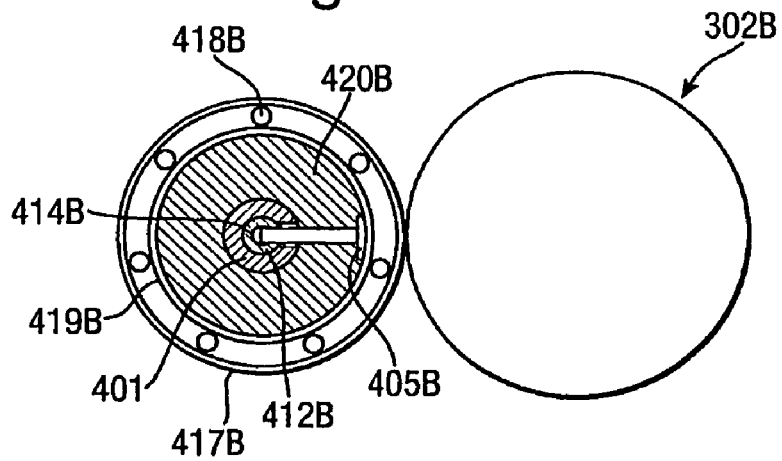
FIG. 4d is a cross-section through a roller assembly and the opposing guide surface.

FIG. 4D shows a cross-section along line X to X in FIG. 4C and illustrates the protrusion of the pin 405b into the bore 414b.

Figure 4E:
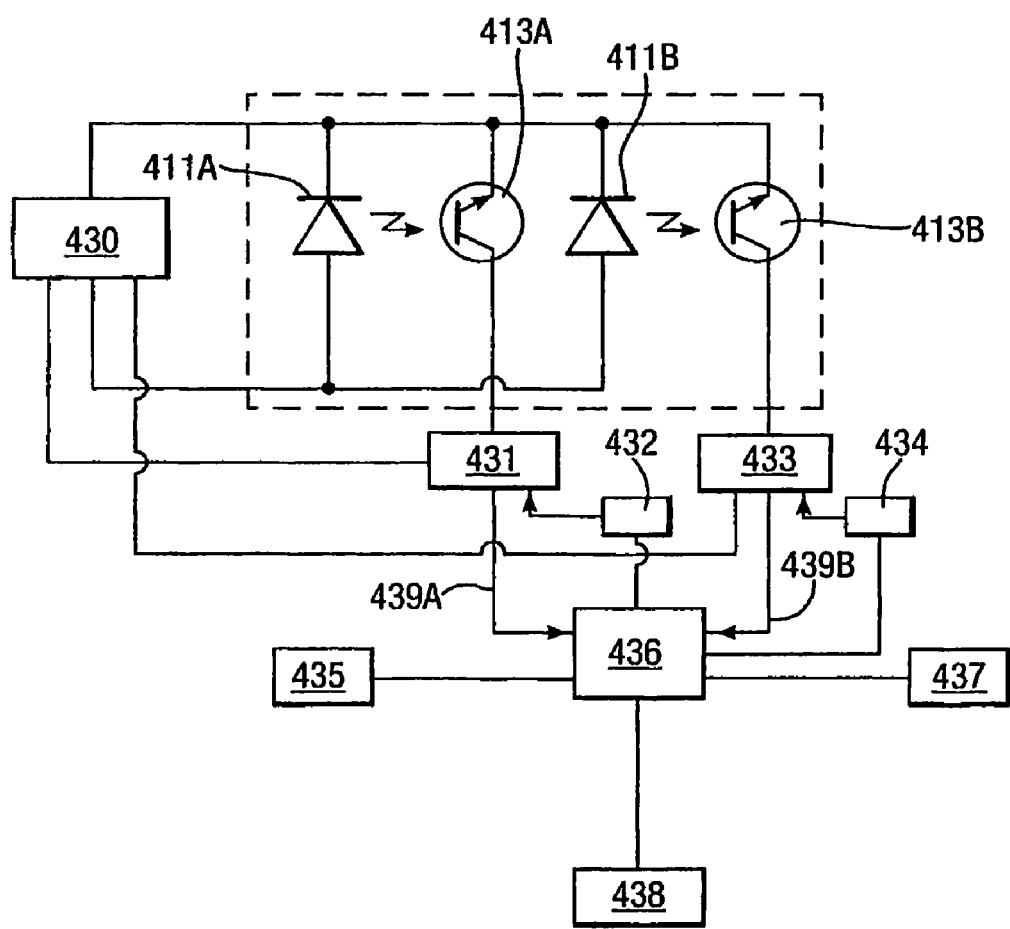
FIG. 4e is a schematic illustration of a circuit for use with the doubles detector.

The circuitry is illustrated schematically in FIG. 4E. In practice, this will be incorporated into the control PCB to be described in section in 7 below. The two light emitting diodes 411a and 411b and the phototransistors 413a and 413b are each connected to a power source 430. The section of the circuit shown enclosed in the dashed lines is that section mounted in the plastics housing 412. The output from each phototransistor is fed via respective voltage comparators 431 and 433 back to the power source 430. The output from the comparators 431 and 433 is fed to a microcomputer 436. The microcomputer 436 is also connected to a conventional counter and error display unit 438.

4.2 Doubles Detector Operation

Initially, the drive wheels 302 are rotated and, with no sheet present between the drive wheels 302 and doubles detector rollers 406, any deflection of each doubles detector roller 406 accompanied by compression of the respective resilient portions 420 adjacent the drive wheels 302 will be sensed in a manner described below at a number of equally spaced intervals through one revolution of the doubles detector rollers 406. The number of intervals corresponds to the number of slots on the timing wheel 390 (see section 3), here 32. Compression of each rubber portion 420 in a radially inward direction will be accompanied by radially inward movement of each pin 405. Each LED 411 continuously omits light which impinges on respective phototransistors 413 causing them normally to be partially switched on. If a pin 405 moves radially inwardly, the pin 405 will increasingly obscure the path of optical rays from the LEDs to the phototransistors, thus increasing the amount by which the phototransistors are cut off.

The output from the phototransistors 413 (illustrated in FIG. 4F) is fed to the voltage comparators 431 and 433. Using a successive approximation technique, the microcomputer 436 causes the comparators 431 and 433 to compare these outputs at 32 equally spaced positions around the drive wheel 302 (which will be determined by monitoring the timing wheel 390 described in section 3 above) with voltage values supplied to the comparators 431 and 433 via digital to analogue converters 432 and 434. This produces 32 sampled voltage values which are then stored in the respective memories 435 and 437 as a guide surface profile or datum level. A typically profile is illustrated by a line 451 in FIG. 4F. The 32 sampling positions occur between the origin of the graph in FIG. 4F and the position marked A, and the guide surface profile comprises that portion of the line 451 up to the position A and including the dotted portion 451'.

FIG. 4F illustrates the voltage input to the comparators 431 and 433 over a number of revolutions of the doubles detector rollers 406 and it will be seen that the guide profile comprising the lines 451 and the dotted portion 451' is generally the same in each portion OA, AB, BC and CD.

A first voltage threshold 452 is set up to defined by a constant differential just above the profile 451. This differential is just greater than the respective variation in phototransistor output voltage due to electrical noise but less than the change in output voltage due to the passage of the thinnest expected banknote. The first threshold, in the form of a differential over the datum level 451, may be set up during manufacture of the apparatus or subsequently by a user.

In use, banknotes B are fed by the transport system 300 into the nip N formed between the doubles detector rollers 406 and the drive wheels 302 (see FIG. 4C). The banknote B will be fed between the drive wheels 302 and the doubles detector rollers 406 due to the continuous rotation of the drive shaft 301, the note being fed along the transport plate 606 into the stacker module 500.

Each LED 411 continuously emits light which impinges on respective phototransistors 413 causing each phototransistor to pass collected current at an initial level. Each pin 405 normally partially obscures the light path. When a banknote B is presented to the nip N between the drive wheels 302 and the respective doubles detector rollers 406, the banknote B will be taken up and transported through the nip, and each rubber portion 404a and 404b will be compressed radially inwardly due to pressure exerted from the outer race 417 via the bearings 418 and the inner race 419. This movement will also be accompanied by a radially inward movement of each pin 405a and 405b, which will thus further obscure the path of optical rays from the LEDs to the phototransistors, thus further attenuating light transmitted to the phototransistors.

Repeatedly, at each of the 32 sampling positions, the microcomputer 436 adds the preset differential to the respective voltages stored in the memories 435 and 437 to define the first threshold 452 and supplies these to the comparators 431 and 433. An example of a set of output signals caused by the presence of a single note in the nip N is illustrated by a line 450 in FIG. 4F. It will be seen that part of the line 450 is the same as the line 451 but that over a portion of the sampling region OA it is substantially different. The comparators 431 and 433 compare successively the 32 values with the corresponding 32 values from the microcomputer 436 and generate an output on lines 439a and 439b (FIG. 4E) related to whether or not the thresholds 452 are exceeded. As is to be expected from a banknote with substantially constant thickness, the difference between the signals represented by the line 450 and the corresponding portion 451' of the stored profile is substantially uniform.

When the threshold 452 has been exceeded at a number of the sampling positions (normally less than 32 since the length of a banknote is generally shorter than the drive wheel's circumference) it is assumed that a banknote has passed through the nip N. If the presence of a banknote is detected by both phototransistors 413a and 413b then the microcomputer 436 causes the counter unit 438 to implement the count by one. In addition, in response to the feeding of the first note, a single sheet threshold 455 is calculated by the microcomputer 436 representing the difference between the comparator input and stored data profile corresponding to a note having marginally greater than half the thickness of the note detected, for example 0.625 times the thickness of the note detected. Other fractions could also be used.

The microcomputer 436 also calculates a double sheet threshold 454 corresponding to one sheet thickness, and a triple sheet threshold 457 corresponding to two sheet thicknesses that other multiples could be used.

For the remaining banknotes, the voltage signals input to the comparators 431 and 433 are compared to each of the 32 sampling positions with each of the new thresholds to determine which of the thresholds are exceeded. This will be described below.

With typical materials, it is unlikely that two successive full rotations of the drive wheels 302 and doubles detector rollers 406 will cause the phototransistors 413 to provide exactly similar outputs due to dirt coming off the banknotes. Thus, for example, even when no note is present in the nip N, a subsequent voltage input to the comparators 431 and 433 might have the form shown by a line 453 in FIG. 4F. It should be noted that this change will be less than the differential defined by the difference between the first threshold 452 and dating 451 and so the microcomputer 436 will determine that the threshold 452 was not exceeded and thus the passage of a note have not occurred.

Additionally, over a period of time, the output from the phototransistors may change significantly, that is by an amount similar to that which would be expected from the passage of a note. In order that the apparatus can still function, the microcomputer 436 causes a new profile to be stored by the memories 435 and 437 instead of the previously stored profile 451 and 451' just before a new stack of banknotes are counted. Since the first threshold 452 is defined in terms of the differential it will be adjusted automatically.

In some cases, a folded banknote may be passed through the apparatus, in which case one of the comparators 431 or 433 may indicate the presence of a note while the signals passed to the other comparator 431 or 433 will suggest that no note is present. The microcomputer 436 can detect from the signals passed to it along the lines 439a and 439b that they represent different differences and in such a case can cause the unit 438 to display an appropriate error message.

The microcomputer 426 can also be programmed to be able to detect half notes as well as folded notes, and notes which have been fed in a skewed manner. In addition, one important feature is that the length (i.e. the short edge dimension) of the notes fed can be determined. Where the output from the phototransistors 413 is monitored at eight or more positions, a progressively more accurate determination of the length of a note being fed can be achieved. This is particularly useful since it provides a non-time dependent method of measuring note length.

After a stack of notes has been fed, the microcomputer 436 may erase a differential stored representing the thresholds 455, 454 and 457, but the differential representing a threshold 452 will remain permanently stored. The apparatus is then ready to process a new stack of banknotes.

4.3 Use of Doubles Detector Output

As mentioned above, when determining the thickness at a number of points on the first reference note fed, the note length in the direction of travel can also be determined. This information can be utilised in conjunction with the thickness later to assist in counting subsequent notes and determining if overlapped, short or long notes are being fed.

In particular, the following information may be deduced by the microprocessor 436:

If a double thickness is sensed by one sensor and only a single thickness by the other and the lengths are correct, this may represent a note with tape on one side. Depending on the selected mode, the effect of the tape may be ignored, or the machine may stop to permit operator inspection of the rogue note. Similarly if only a part of a correct length note is sensed as double thickness then this may represent a folded or dog-eared note and the "double thickness" output signal may be ignored in some cases.

If a thickness greater than two times the note thickness is sensed, i.e. the output signal exceeds the triple sheet threshold 457 over part of the sensing zone, then an error condition is indicated as a three note thickness has been detected. In some cases, the first note may not be a single "correct" note and therefore false values of the note length and thickness, and hence the calculated threshold, may be determined. The processing and subsequent notes will indicate whether or not this is the case.

In a particularly preferred example, the doubles detector processing circuit records the profile of the note thickness as it travels through the nip N and examines the result for the possibility of overlapping notes. A schematic output signal for the case of partially overlapping notes passing simultaneously through the nip is shown in FIG. 4G. The normal output when no note is between the rollers is indicated by the signal level 460 and thresholds 455, 454 and 457, described above, are shown for scale.

The leading edge of the overlapping notes enters the nip N at point W, wherein the outputs signal indicates a single note thickness (signal 461 is greater than threshold 455 but less than threshold 454). After the note has traveled some way through the nip, the output signal increases to 462, indicating a double note thickness (level 462 is greater than threshold 454 but less than threshold 457). After some distance, at point Y, the signal decreases once more to level 461, indicating a single note thickness. After another distance at point Z, the signal returns to level 460 indicating the presence of no note within the nip. The microprocessor 436 recognises this output pattern of single note thickness, double note thickness, single note thickness with no intervening gaps as corresponding to a partially overlapping banknote.

In order to verify this assessment, measurements of the distance between points W and Z and between X and Y are taken. The two lengths are added together and the total is compared with a recorded value corresponding to the combined length of two notes (in the short edge direction). If the measured and recorded values correspond to within a predetermined error margin, the profile is recognised as that of two overlapping banknotes.

The banknote length against which the microcomputer 436 compares the measured distances can be set in a number of different manners. In a first mode, the user can input the denomination and currency into the apparatus control system (see section 8 below), which looks up the relevant note length in a table, or retrieves it from a remote source. Alternatively, the note length can be entered directly. In a second mode, the apparatus can use the first banknote in the stack as a reference note, taking a measurement of its length and recording this value for comparison with later signals. A further alternative is to use a running average, updated as each note is counted, or use an average length of the last n notes where n is a predetermined number.

Depending on the mode in which the machine is operating, the overlapping banknotes could be rejected and the apparatus brought to a halt or, alternatively, they can be accepted and counted as two banknotes without the need to stop the counting process. These possibilities are discussed in U.S. Pat. No. 4,255,651 and U.S. Pat. No. 5,341,408.

However, such conventional systems are inflexible since they force the operator either to have every "double" rejected by the system and the machine stopped, or to accept every "double" without the opportunity for checking. The latter in particular may be inappropriate where the counting apparatus is also being used to authenticate and/or denominate the notes.

In a preferred mode of operation, the manner in which the present system handles an "overlapped banknotes" signal from the doubles detector depends on what other sensors are active in the banknote counter. That is, on receipt of a signal indicating that more than one note has passed, before deciding how to continue processing, the system first determines whether any of the detectors in the detector box are active.

If no authenticating or denominating sensors are active (e.g. the apparatus is operating in "piece" mode—see section 8.2.a), provided the doubles detector can determine that only 2 notes passed, an overlapped signal increments the counter by 2. In other words, both of the two notes are counted and the apparatus continues to process the remaining notes without stopping. If the doubles detector output was non-conclusive, the processing is halted and an error message generated.

If any authenticating or denominating sensors are active, the behaviour of the apparatus depends on the outputs from at least one of those sensors. By comparing the output of the doubles detector with that of each sensor, the control PCB can identify whether that sensor has produced an output signal for each note distinguished by the doubles detector 400. For example, if the doubles detector recognises two notes, yet the sensor generates only one output signal, the control PCB determines that one note has been "missed" by the sensor.

In a case such as this where one or more notes are "missed" by a sensor, an "overlapped banknotes" signal from the doubles detector causes the apparatus to stop processing notes and to display an error message. The overlapping notes can then be inspected by an operator who decides whether or not to proceed with the count cycle.

On the other hand, where the number of output signals from the sensor corresponds to the number of notes identified by the doubles detector, an "overlapping banknotes" signal from the doubles detector increments the count by 2 (that is, N, when N is the number of banknotes the doubles detector has sensed) and the apparatus continues to process the remaining notes without stopping.

Numerous variants of this technique are envisaged including similar processing of "triple banknotes" signals from the doubles detector, in which case, depending on the active sensors, the count may be incremented by 3 if all 3 notes have been analysed by the sensors. In theory, this could be extended to any number of overlapping banknotes. Similarly, the method could depend on the output of all the active sensors, or only a subset of them. This subset may be pre-set, may depend on the mode of operation or may be selected by a user.

The particular signals from the sensors which determine processing may also be selected as appropriate. For example, instead of simply identifying that a signal has been obtained for each passing banknote, that signal may be further evaluated to confirm, for instance, that it is within certain acceptable limits to exclude the possibility of an erroneous signal. Other characteristics may also be evaluated before the note count is incremented, e.g. whether each note has been found to be authentic.

What is key to the technique, however, is that sensors other than the doubles detector 400 are evaluated when determining the response of the system to an "overlapped banknotes" signal. If there are no active sensors, there is no contention and no need to stop the machine. In other cases, outputs (or lack of outputs) from at least one sensor in addition to that from the doubles detector 400 are used in deciding how to react. This enables the system to respond in a manner which is most appropriate to the operational mode selected. Moreover, the technique can be used reliably in cases where the apparatus is used to authenticate and/or denominate notes, in addition to counting them, since the system ensures that every note is analysed by the sensor(s), even if it forms part of a "double" or "triple". If this does not occur, the system stops to permit manual inspection.

The sensors referred to above are those described in section 2 and include one or more of a UV (Fluorescence) detector, a UV-PPD detector, a size detector (SD), a 3D detector, a track sensor, an EMG detector, a SMDS and a metallic thread detector.

4.4 Doubles Detector Mounting

The doubles detector shaft 401 is mounted into the sidewalls of the framework 600 by means of a bolt 401*a* at the right hand side wall and a keying block 402 at the left hand end. The shaft 401 is eccentric such that when it is rotated the rollers 406*a* and 406*b* are moved away from the drive wheels 302, i.e. out of pinch. Rotating the shaft 401 in this manner also brings the keying block 402 into register with a aperture in the left hand side wall of the framework through which the keying block 402 and the left hand end of the shaft 401 can travel. Thus the doubles detector shaft can be removed straightforwardly by undoing the bolt 401*a*, rotating the doubles detector shaft 401 through approximately 90°, pushing the doubles detector shaft 401 together with the keying block 402 through the aperture in the sidewall a short distance, thus freeing the right hand end from the right hand sidewall, and reversing the assembly out of the counter apparatus.

4.4.1 Eccentric Doubles Detector Shaft

Conventional mechanical doubles detector assemblies which rely on the nip between the roller assemblies and the guide surface being sufficiently small such that passage of a sheet therethrough causes deflection of the roller assembly, suffer from the problem that it is physically difficult to assemble the roller assembly shaft in such close proximity to the guide surface. Furthermore, it is difficult to ensure the accuracy of the gap between the roller assemblies and the guide surface. The present banknote handling apparatus over-comes this problem through the use of an eccentric shaft on which the at least one roller assembly is mounted. Specifically, the shaft should comprise at least an eccentric portion on which the at least one roller assembly is mounted. Rotation of the shaft moves the roller assembly mounted thereon towards or away from the guide surface, thereby making it possible to adjust the nip dimension quickly and straightforwardly, without any disassembly.

The manner in which shaft eccentricity is implemented can be selected according to the particular design. In the present example, rather than giving the shaft 401 itself an asymmetric shape, the axis about which the shaft rotates is moved away from the axis of symmetry by virtue of bolt 401a and keying block 402. In particular, as is shown in FIG. 4a, the keying block 402 is provided with a protrusion which engages an aperture in the side wall within which the shaft can rotate. It will be noted that this centre of rotation of this protrusion is offset from the axis of symmetry of the shaft 401, thereby causing eccentric rotation.

4.4.2 Keying Block

Figure 4H:
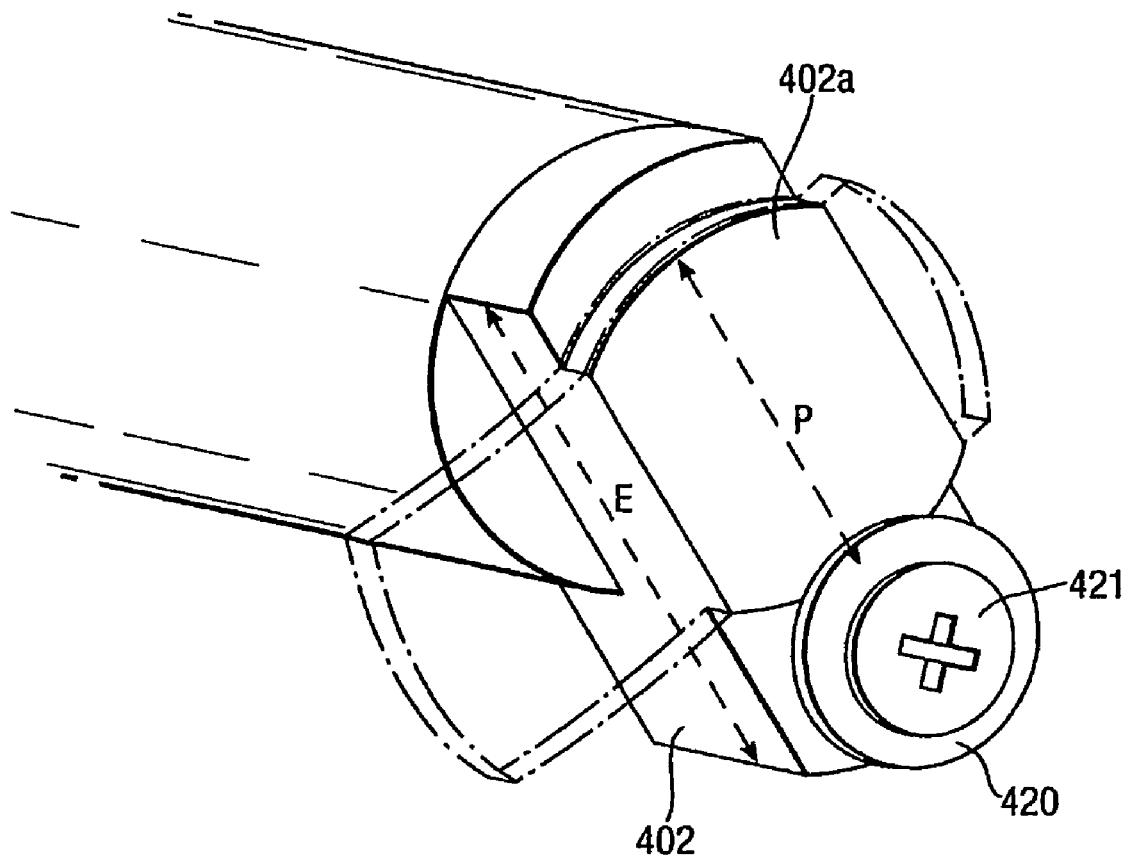
FIG. 4h is an enlarged view showing the cooperation between the doubles detector shaft and the side wall of the apparatus.

As well as achieving eccentricity, the keying block 402 performs a number of additional functions. First, as noted above, the keying block is shaped so as to permit passage through a correspondingly shaped aperture in the side wall of the apparatus when the shaft is in the first predetermined orientation, and to prevent passage therethrough when the shaft is not in the first predetermined orientation. In the present example, this is achieved by giving the keying block 402 an elongate shape and providing the aperture in the form of a keyhole. The elongate keying block 402 can only pass through the aperture when the long dimension e of the keying block 402 (see FIG. 4H) is aligned with that of the keyhole aperture. It is preferred that this first predetermined orientation does not correspond to the "in pinch" position of the shaft, i.e. rotation of the shaft into this first predetermined orientation moves the roller assemblies out of pinch (see Section 4.4.1 above).

When the keying block 402 is aligned with the aperture, it can pass through the aperture a short way, thus freeing the opposite end of the shaft and enabling the assembly to be removed straightforwardly. When the keying block 402 is not aligned with the keyhole aperture, the doubles detector shaft is constrained within the apparatus.

The keying block 402 is further provided with a protrusion 402a which takes the form of a section through a circle, having two opposite curved edges and two opposite straight edges. The long dimension p of the protrusion is aligned with that of the elongate keying block 402, and they share the same width.

When the shaft is longitudinally in position between the side walls of the apparatus, the curved edges of the protrusion 402a engage the circular part of the keyhole aperture provided in the side wall. This enables rotation of the shaft 401 whilst holding the shaft laterally and longitudinally in position.

An aperture is provided adjacent to the keyhole aperture for receiving a screw 421 therethrough which, once the doubles detector shaft has been rotated into pinch, is used to secure the shaft and prevent any further rotation.

4.5 Scraper

In order to ensure an accurate measurement of the banknote thickness determined by the doubles detector 400, it is important that the nip N between the drive wheels 302 and the doubles detector rollers 406 remains clean and clear of any foreign objects. During use of the machine one problem which may be encountered is the build-up of dust and dirt on the surface of the doubles detector rollers 406. Due to the close and constant contact between the doubles detector rollers 406 and the drive wheels 302, any dirt which attaches to the surface of the doubles detector rollers 406 is compounded on to the surface and can become difficult to remove. This can also lead to a significant accumulation of dirt on the surface of the rollers 406 over time. The resulting additional thickness between the rollers and the passing banknotes can lead to erroneous "multiple notes" signals.

Figure 4I:
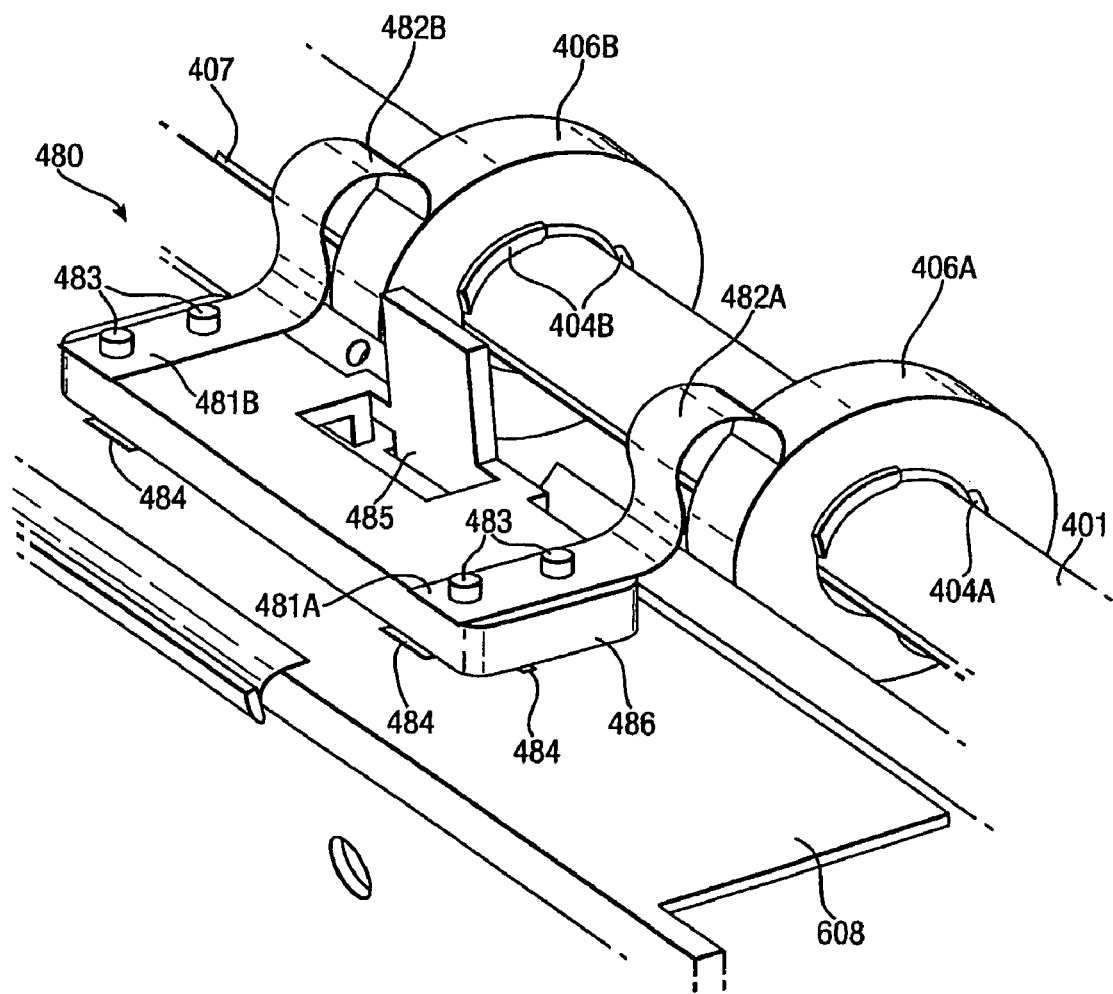
FIG. 4i depicts a scraper arrangement for cooperation with the doubles detector assembly.

In order to address this problem, the counter may be provided with a scraper 480 for cleaning the surface of the doubles detector rollers 406 during use. An example of a scraper arrangement 480 is shown in FIG. 4I. Scraper arms 482a and 482b are formed of hooked lengths of spring metal affixed to a scraper base 486 by pegs 483 at their ends 481a and 48b furthest from the hooked ends. The scraper base 486 is affixed to back plate 608 of the metal framework 600, described in section 6 below. This is located at the rear of the machine, immediately adjacent to the doubles detector assembly 400. The scraper block 486 is precisely positioned on the back plate 608 using locating tabs 485 and apertures 484.

The resilience of the scraper arm material urges each scraper hook 482a and 482b against the respective doubles detector roller 406a and 406b. The hooks have a flat edge arranged at an angle to the tangent of the doubles detector roller such that, as the rollers rotate, any dirt on their surface is removed. Thus, the accuracy of the thickness measurement by the doubles detector assembly 400 is maintained.

In the embodiment shown in FIG. 4I, the scraper hooks 482 are continuously in contact with the doubles detector rollers 406. However, in other arrangements, the scraper hooks may be arranged to be movable between a "storing" position and a "cleaning" position, such that the scraper is normally out of contact with the doubles detector rollers 406. Means, such as a lever arrangement, are provided to move the scraper assembly into contact with the rollers when it is required. This may be determined manually by an operator or could be automated by the machine and occur at predetermined intervals. Alternatively, the scraper hooks 482 are arranged to come into contact with the doubles detector rollers 406 when the detector box 200 is opened (i.e. pivoted into its upper position, see section 2). The rollers can then be rotated, manually or automatically for a time to remove any accumulated material.

5. STACKER MODULE 500

From the doubles detector 400, the banknotes pass into stacker module 500. The purpose of the stacker module is to form the counted banknotes into a well ordered stack for presentation to the user. The main components of the stacker module are shown in FIG. 5, and additional aspects may be viewed in FIGS. 1A and 3.

The main functional components of the stacker module are stacker wheels 502a and 502b which extend through elongate apertures 510 provided in transport plate 606. Each stacker wheel 502 consists of a plastics moulding having a central solid core and a plurality of curved fingers extending from the core in a spiralling manner. The gaps defined by the fingers are open-ended towards the doubles detector 400 such that they can receive notes from the doubles detector.

The two stacker wheels 502 are non-rotatably mounted to stacker shaft 501 which is supported in bushings 503A and 503B between in the sidewalls of the framework 600. The stacker wheels 502 are located in circumferential grooves 504 provided in the stacker shaft 501. The centre of each stacker wheel 502 is provided with a press-fit arrangement which fixes the wheels 502 relative to the shaft 501. The press-fit arrangement is also designed to assist in aligning the two stacker wheels 502 with one another during assembly. A tool on the assembly line fits with the press-fit arrangement to avoid misalignment of the stacker wheel fingers which would otherwise lead to skewing of the notes.

The stacker shaft 501 is referenced against the left hand side of the framework 600 by spring washer 505 which acts against clip 506. At the left hand end of the stacker shaft, a non-circular portion 501*a* is provided onto which stacker pulley 590 clips. The stacker pulley 590 is driven through a rubber belt 591 from a freewheeling pulley 591. The freewheeling pulley 591 is mounted to the left hand sidewall of the framework 600 via a bearing 592, but does not itself attach to any shafts within the apparatus. The freewheeling pulley 591 receives drive from the drive pulley 397 (see FIG. 4A and section 4), which in turn is driven by the drive motor 399. The rubber belt 591 is twisted through 180° between pulleys 590 and 591, such that the stacker wheels are caused to rotate in the opposite rotational sense to the drive pulley 397. A metal guide wire is mounted to the outside of the framework and shaped so as to extend between the twisted sections of the rubber belt 591 to prevent them coming into contact, which could lead to overheating and damage to the belt.

As each note leaves the double detector 400, it is received by the stacker wheels 502 and turned through approximately 90° as the stacker wheels rotate. The note exits the stacker wheel at the point where the fingers carrying the note move through aperture 510 and behind the transport plate 606. The banknote is left resting against transport plate 606, which is provided with a tab 512 to support the growing banknote stack in this position.

A transmissive optical sensor 515 and 516 is located such that the light beam will be intersected by banknotes which have been stacked. To this end, an emitter 515 is mounted in the tab 512 and a photodetector 516 is mounted in an aperture 511 in the transport plate 606 between the stacker wheels 502*a* and 502*b*. The signal from this sensor provides an indication to the control system that notes are present in the stacker module.

The completed banknote stack is then ready for collection by a user.

6. HOUSING 600

The metal housing that forms the main structure of the banknote counter is illustrated in FIG. 6A. A plated mild steel base 601 and two mild steel side panels 602 and 603 make up three sides of the metallic chassis and are slotted in a series of tongue-in-groove slots positioned laterally on the base plate 601. The slots are configured so the side panels 602,603 can only be assembled in the correct positions. The side panels 602, 603 are further secured by four screws at each of the four corners of the base plate 601.

Examples of the slots provided in the base plate 601 are shown in more detail in FIGS. 6B(i) and (ii). The "tongue" features or protrusions provided on the side plates are shown in FIG. 6B(iii).

The slots are dimensioned to accurately locate the sidewall relative to the base plate in at least one, preferably two, directions. This is achieved by varying the width of the aperture along its length (where length and width are perpendicular dimensions in the plane of the base 601). Referring to slot 611 (FIG. 6B(i)), each aperture has a central portion 612 which is narrower in width than the portions 613 and 614 either side. These enlarged portions can be of any length and need not be the same size as each other. In some examples, one or other of the enlarged portions could be "open", i.e. not enclosed by the base 601. An example of this is slot 625, shown in FIG. 6B(ii), in which the first enlarged portion 627 is provided by a large cut-out in the edge of the base (indicated as 627*a*). Thus the aperture 625 appears itself as a cut-out.

The central narrow portion 612, 626 is preferably sized to accommodate the thickness of the protrusion on the side wall (e.g. 640 shown in FIG. 6B(iii)) in a tolerance fit. That is, once the protrusion is inserted into the slot, the side wall is constrained and cannot move relative to the width of the slot. Hence, the wall is accurately located relative to the base plate in the direction parallel to the width of the slot. It is preferable that at least one of the enlarged portions 613, 614 is provided with a flat edge substantially perpendicular to the length of the slot. By abutting the protrusion against the flat edge, the side wall is further located accurately parallel to the length of the slot. In the case of slot 611, two flat edges 613*a* and 614*a* are provided, whereas slot 625 includes a single flat edge 628*a*. By providing each slot with an enlarged portion either side of a central narrow portion, ease of manufacture is significantly improved. In conventional systems using simple elongate narrow slots, the tool used to punch the slot out of the base plate would be prone to extensive damage due to the thinness of the tool in at least one dimension. In contrast, the present design uses a tool having two wide portions either side of the narrow region: this provides strength and reinforcement and prevent bending of the tool during punching.

The precise geometry of the slot and punch tool will vary according to the application. In some cases, it is preferable that the enlarged portion has a width substantially equal to its length (e.g. portion 614), to avoid a thin dimension. However, in many cases it is advantageous that the enlarged portion is longer than it is wide (e.g. portion 613), to increase the proportion of the stamp tool having increased width (and therefore strength). Preferably, the combined length of the enlarged portions is greater than that of the central narrow portion.

Conveniently, a second location aperture is provided in the base plate and also has a central narrow portion between enlarged portions (slot 615 in FIG. 6B(i)). Preferably, both slots are punched out of the base plate 601 in a single step using a single punch tool. This greatly increases positional accuracy.

A circular aperture 619 may be provided for joining the base to the wall, once suitably located, using a screw or similar fixing. FIG. 6B(iii) shows means 680 provided in the side wall for receiving a screw thread and so securing the plates together. The wall has at least two portions adjacent to one another and defined by cut(s) through the wall. In this example, three portions 681, 682, 683 are defined by two cuts 681*a* and 682*a* between them. The first portion is deformed out of the plane of the wall in a first direction (into the plane of the Figure), whereas the adjacent second portion 682 is deformed in the opposite direction, towards the viewer. The third portion 683 is deformed in the same manner as the first portion 681. Between them, the portions 681, 682 and 683 form a cavity for receiving the shank of a screw. The sizing of the portions is such that the portions contact and grip the screw shank, and a thread can be cut.

However, after repeated use, it has been found the threads can fail, thereby releasing the screw. To address this, an aperture 684 is provided adjacent the third portion 683. In use, the aperture 684 can receive a nut for engaging the screw shank, thereby securing the screw in place and relieving the portions 681, 682 and 683. It should be noted that the aperture 684 need not be provided after the last portion 683, as shown, but could for example be in between portions, provided it is continuous with the defined cavity.

The left side panel 603 provides a reference plane for the banknote counter. As an example, the right end of feeder wheel shaft 131 is shown in FIG. 6C. At its opposite end, the shaft 131 (or axle) sits within a flange bearing 157, the flange of the flange bearing 157 (see FIG. 1C) resting flush against the left side panel 603. At the right hand end, the shaft or axle is mounted within another flange bearing on the right side panel 602. A circular spring washer 153 is placed over the bearing and sits between the outer face of right side panel 602 and the flange of the bearing 154. The bearing is held in place by an e-ring or circlip 152 fastened in a groove 152a at the end of the shaft or axle. The circular sprung washer thus allows relative movement of the side panels 602,603, for example due to thermal expansion, yet each shaft or axle remains referenced to the left side panel 603.

The arrangement of the spring washer between the side wall and the flange bearing is advantageous since it avoids the spring washer slipping into the circlip groove 152a.

A transport plate is attached between both side panels 602,603 and is screwed in to place at a set of upper 662 and lower 672 mated flanges. Above the transport plate 606 is a transport roof plate (not shown), which separates the stacker wheels 502a, 502b mounted within the transport plate 606 from the feeder mechanism mounted above the transport roof plate. The feeder mechanism then protrudes through apertures within the feeder plate 101.

At the rear of the banknote counter device is located the power supply unit (PSU) assembly 620, which comprises a back plate 608 that is attached by the means of four screws to both side panels 602,603; power control circuitry 609 attached to back plate using four screws; and power socket 621 and power switch 624. In order to shield the sensitive magnetic detection devices from fluctuations in magnetic field generated by the PSU a mild steel shielding panel 607 is screwed over the PSU control circuitry.

Each lateral section 202, 203 of the detector box plate 200 is pivotably connected to a respective side panel 602, 603 at one end. At the other end of each lateral section the feed adjustment shaft 116 protrudes from the plane of the lateral 202, 203 section, typically by 2 or 3 mm. In use the protruding ends of the feed adjustment shaft lock into place behind two latch assemblies 630 mounted centrally to the top of the housing side panels 602,603, and the plane of the detector box is angled acutely from the vertical. Each latch assembly 630 comprises metallic latch block 642 plastic section 622 and bias spring 632. The plastic leaf spring section 622 is fastened to a respective housing side panel 602,603 at its rear and is sprung such that when pressure is applied to the plastic button at the front end of the plastic leaf spring section 622 the front end pivots outwards from the plane of the respective side section. The metallic latch block 642 is mounted within the plastic leaf spring section 622 and is formed with a lip, behind which the ends of the feed adjustment shaft 116 rest. Thus the lip of the metallic latch block 642 applies a force to one end of the feed adjustment shaft. The bias spring then applies pressure to the opposite side of the feed adjustment shaft in order to keep the shaft in place during operation and prevent any movement of the detector box section, which may interfere with the detectors. Once the feed adjustment shaft is locked into place behind the metallic latch box 642, the detector box 200 is locked in place until the plastic buttons at each end of the plastic leaf spring sections are pressed, which moves the metallic latch block section 642 perpendicular to the plane of the lateral sections 202,203 and releases the shaft and detector box from behind the latch assembly 630.

The metal housing is also provided with a number of apertures to enable cables to pass between sensors and processing equipment. One such feature is shown in FIG. 6D. Cut-out 685 is provided in the periphery of the side wall and is shaped so as to allow a cable to pass therethrough, and to receive a grommet for securing the cable in position. Unlike conventional structures, the cut-out is open: this enables the cable and grommet (already fitted on the cable) to be pushed into position through the open side of the cut-out. This allows for much faster assembly compared with prior art systems, in which a grommet had to be fitted into the hole provided and then the cable fed carefully through.

The cut-out 685 includes protrusions 686 for retaining the grommet (and cable) within the cut-out. In the example of FIG. 6D, this is achieved by giving the cut-out the form of a partial circle (a circle with a minor chord removed).

7. CONTROL AND ELECTRONIC SYSTEMS

The main controller PCB 610, mounted on the right side panel 602, controls both the feed and motor mechanisms, provides sensor processing, and sensor power distribution. It is available in several variants: a populated variant in which all possible sensor control systems are accommodated upon the PCB and a depopulated variant wherein only the control systems for sensors mounted within a particular bank note counter are present. The main control PCB 610 is further connected to the detector box PCB 206 and the front panel PCB 907 by two cables. These cables communicate all the relevant information related to installed sensors and detectors to the main controller electronics. This is an improvement on prior art designs wherein there were a greater number of individual PCBs and associated wiring.

The organisation of the banknote counter control systems are illustrated in FIG. 7. Main controller PCB 610 houses the main controller 701a, timing wheel assembly 701b and the feed and transport motor control and interface 701c. The power supply unit 703 receives filtered and switched power via filter and switch assembly 706 and provides power to the main control system 701. The main control system is grounded via power system 717. The motor control and interface 701c interfaces with feed 704 and transport 705 motors. The display panel control 712, double detect sensors 710 and 711, feed hopper sensor 709, stacker hopper sensor 707, lid sensor 708, metal thread detector 716 and EMG detector 715 all interface directly with the main controller 701a. One or more RS 232 ports on the base of the main control PCB 610 also interfaces into the main controller 701a. The detector board PCB 206 houses the detector processing unit 702 which processes certain detector signals and relays high-level data to the main controller 701a. One or more RS 232 ports 714 interface with the detector processing unit 702 together with the 3D/IR 719, SMDS 720, UV Fluorescence/UV PPD 721 and SD 722 systems. If the banknote counter contains these detector systems the track sensor system 718 is interfaced with the detector processing unit 702, otherwise it interfaces directly with the main controller 701a.

The main controller PCB 610 has a timing wheel mounted on the end of the doubles detector shaft and integrated into the PCB circuitry. The timing wheel comprises a series of slots cut into the outer circumference of the wheel and parallel to the axis of rotation. Typically, thirty-two slots are distributed around the circumference. These slots rotate between a slotted opto-sensor comprising a light emitting device and a light sensitive sensor. By analysing when the leading edge of the timing wheel passes between the slotted opto-sensor, an accurate measurement of the speed of operation of the bank note counter can be calculated. In prior art designs, the timing wheel often had slots arranged radially rather than parallel to the axis, causing dust to become stuck in the slots and complicating the overall design and manufacture. The use of parallel slots enables simpler construction of components and the use of a reactive centrifugal force to dislodge dirt and grime that become caught within the slots of the wheel. The timing wheel signal is sampled every 4.5 millimeters of note transport and that this signal is further interpolated to achieve an accuracy of 0.1 millimeters.

At the base on the main control PCB 610 is mounted one or more program ports typically utilising the RS 232 standard. Each program port is mounted on the base of the machine to prevent accidental connection of the main control PCB 610 to unsuitable computing apparatus by a lay user. Only a skilled engineer would know to tilt the machine to expose the underside and plug in diagnostic and programming apparatus. The program port has connections to the flash memory of the main processing circuitry and allows software updates. In some circumstances, it is necessary to limit the features of the PCB and this is done using a 20-digit hex enabling code to lock any features that should not be used. Each detector set will have a different enabling code that will lock and unlock their features. It is then possible to upgrade a bank note counter in the field by attaching suitable apparatus to the program port and entering in this 20-digit code to unlock the desired features. Such a system is described in EP 1371029.

The feed and transport motors are controlled by the main control PCB 610 using a pulse width modulation (PWM) scheme, wherein altering the width of a dc pulse controls the speed of each motor. Feedback control on the feed motor is achieved by measuring the back electromagnetic force (EMF) generated by the motor. This EMF signal can be used for further control. The transport motor is controlled using the signals obtained from the timing wheel.

8. COUNTER OPERATION

FIG. 8A illustrates the front display control panel of the banknote counter. The display control panel comprises total key 802, mode key 803, batch key 804, large start/stop key 805, autofeed key 806, speed key 807, detector key 808, clear key 809, denomination key 811, right 810 and left 812 arrow keys and numeric keypad 813. The numeric keypad is optional and may not be included on some embodiments. LCD display 801 is further illustrated in FIG. 8B. It comprises two main numerical display areas: batch display 821 which displays the note batch quantity and count display 823 which displays count and value figures. Bar 822 illustrates whether the counter is operating in count mode or value mode; in value mode this bar 822 is invisible. Icons 824 to 829 inform the user of the activation of additional features: icon 824 is visible if long or short edge detection is activated; icon 825 is activated, in some operational modes, if the banknote is connected on-line to a remote computer via an RS232 port 208 located on the rear of the detector box 200; icon 826 is visible if the machine is set automatically feed notes from the feed hopper; icon 827 is visible if any infrared detection systems are activated; icon 828 is visible if any sensor system using magnetic detection is activated; and icon 829 is visible if any ultraviolet based detector is activated.

When the device is plugged in to a mains socket via a standard cable plugged into socket 621 and switch 624 is activated the machine will power up and complete a self test routine. The default starting mode is count mode with a batch size of 100 notes and autofeed.

The counting device has two main modes of operation: a count mode, wherein the quantity of banknotes placed into the feed hopper is determined; and a value mode, wherein the deposited value of a number of banknotes placed into the feed hopper is calculated. Within each of these main modes there are various submodes that can be selected. The various modes of operation of the counting device will now be described.

8.1 Mode Select

Count mode or value mode is typically selected by pressing the mode key 803; one press of a button will display the current mode and a second press of a button will toggle to the other mode. When the current mode is displayed a submode can be selected by pressing the right arrow 810 or left arrow 812 keys.

Additionally, it is possible to set the mode key operation so that, after an initial press of the mode key 803, any subsequent press cycles through a number of quick access modes. For example, subsequent presses might cycle through two common counting modes then two common value modes. After the required mode is displayed on LCD display 801, that mode is selected by pressing the start/stop key 805 or by waiting for the LCD display 801 to time out.

8.2 Count Modes 8.2.a Piece Mode

This is the simplest mode of operation and will simply count any banknotes placed onto the feed hopper. No value will be attributed to any banknote and the total count will be displayed on LCD display 801 at location 823. During operation, the total key 802 can be pressed to display the number of notes counted by the device so far. The running total displayed can be cleared at any time by pressing the clear key 809. Counting can either operate continuously, in which the machine will count all notes deposited on the feed hopper until the stacker hopper is full, or in a batch mode, in which a given batch (number) of notes will be processed from the feed hopper. In continuous mode the stacker hopper is typically full when it contains 100 notes, although this value is customisable. If during the count the stacker limit is reached then notes must be removed from the stacker hopper in order for the count to continue. This mode is selected by continuously pressing the batch key 804 until off is displayed on the LCD display 801.

In batch mode the batch size can be selected from a series of preset batch sizes by pressing the batch key 804. Each press of the batch key 804 or the arrow keys 810, 812 will cycle through a different preset quantity. Alternatively, the batch number can be set to a value between 1 and 999 by pressing a batch key and then inputting the required batch size on the numeric keypad 813. The required batch number is confirmed by pressing the start key 805 or again waiting for the LCD display 801 to timeout. After batch mode is confirmed, the number of notes in the currently selected batch is displayed in the batch display 821 of the LCD display.

If the counting device is set to operate in batch mode there are several additional operating options that are available to the user. When the banknote counter has processed all of the notes deposited on to the feed hopper, detected by a lack of reflected IR at the photodiode of the reflective IR sensor 652, the total number of notes counted will flash on the LCD display 801 to indicate that there are not enough notes in the feed hopper to complete a batch. In this case more notes need to be added to the feed hopper. The machine will then continue to count automatically if auto feed is selected or wait for a user to press the start/stop key 805.

When in batch mode, every time a batch is completed, it will be added to a running total. Three different totals are stored within the banknote counter memory: one, the total number of counted notes in the stacker hopper; two, the total number of notes in the batch counted so far; and three, a grand total for a particular day or a particular teller. These totals can be cycled through by pressing the total key 802 or alternatively using the right 810 and left 812 arrow keys. If a value of the total overflows the number of digits available on the LCD display 801 at location 823, then the right 810 and left 812 arrow keys can be pressed to display the upper or lower digits. To clear the currently displayed total the clear key 809 can be pressed. Any amount cleared from a lower total using the total menu will also be removed from a higher total.

8.2.b Fixed Denomination

In this mode all notes of a given denomination set by the user are counted and the number of these notes displayed on the LCD 801. If a note of a denomination other than that set by the user is detected then the banknote counter will stop and display a denomination error. The user then has the option of removing the rogue note and restarting the count by pressing the start/stop key 805, or removing the notes deposited in the stacker, removing the rogue note and re-feeding the whole bundle retrieved from the stacker to the feeder hopper, minus the rogue note. The latter operation will reset the count. The exact operation is set by the supervisor or factory settings and could also include requiring the user to remove the suspect note or allowing the user to choose whether they want to keep or remove the note in the bundle.

A denomination is entered by the user by first pressing the denomination key 811 to display the current selected denomination. The denomination key 811 can then be pressed repeatedly to scroll up through a predefined list of denominations. This list is either entered by a supervisor or uploaded during a software update. Alternatively after pressing the denomination key 811, the right 810 and left 812 arrow keys can be used to scroll through the list. In a similar manner to selecting a batch, the numeric keyboard 813 can also be used to manually enter a denomination. In some embodiments this denomination must be limited to a single digit integer or a multiple of 10.

Depending on the currency being used, and the detectors fitted to a banknote counter, a note can be denominated using the SD, 3D, IR or SMDS detectors. The relevant properties of a banknote are measured by the fitted detector and compared with reference properties stored in a denomination table. The exact reference properties will be determined by the denomination selected by the user and the current currency. If the properties of the banknote match the reference entries then a note is counted, if they do not a denomination error is relayed to the user via LCD display 801.

Typically, if more than one detector is mounted within the banknote counter one detector is set as a primary detector, either by a supervisor or during factory initialisation, and the measurements from the primary detector are compared with the relevant reference properties in a lookup table. The signals from other detectors can then be used to confirm the authenticity of the note.

8.2.c Automatic Denomination

This mode counts all documents of a given denomination, with the selected denomination being the denomination of the note first fed into the counting device. If a denomination other than the denomination of the first fed note is detected then the banknote counter will stop counting, as for Fixed Denomination mode, and an error is displayed on LCD display 801. The same options for subsequent user action as Fixed Denomination mode are then available.

Again, this option is depends on the currency being used, and the detectors fitted to a banknote counter. Possible detectors that can be used are the SD, 3D, IR or SMDS detectors. The automatic detection of the first note can be performed by measuring the long and short edges of the note using a 3D detector and/or retrieving denomination data encoded in the magnetic thread of the note. The final total will be displayed at location 823 on the LCD 801.

8.3 Value Modes

8.3.a Denomination Enter

In this mode the documents placed on a feed hopper are counted and the final count value is multiplied by a denomination value entered by the user to generate a total value. The result is then displayed as a value at location 823 on the display 801. A denomination is entered in a similar way to that described in reference to the fixed denomination count mode. However, in this mode any denomination can be entered via the numerical keypad 813. The count value is calculated by the processing circuitry of the main control PCB 610, using the count information and the entered denomination.

This mode does not use any detector systems to denominate a note but presumes that all notes are of the same denomination.

8.3.b Fixed Denomination

In a similar manner to the fixed denomination count mode, this mode will count all documents of a predetermined denomination as specified by the user, multiply this count by the value of the specified denomination and display the total value of these documents at location 823 on the LCD display 801. A fixed denomination is entered as previously described in reference to the corresponding count mode and again this mode is only available to machines fitted with certain detectors, depending on the currency.

If any notes are detected that do not comply with the denomination properties of the selected denomination the banknote counter will stop and display an error as the equivalent count mode operation.

8.3.c Automatic Denomination

This mode will count all the documents placed in the feed hopper and set the denomination for the count as that of the first banknote fed into the banknote counter. The number of notes of the first fed denomination will be multiplied by the value of the denomination of the first note and the output displayed at location 823 on the LCD screen 801.

If a denomination other that that of the first fed note is detected then the banknote counter will stop as per the equivalent count mode operation.

8.3.d Special-Mixed Denomination

This mode allows for bundles of banknotes containing mixed denominations to be counted and the total value of the bundles of notes displayed at location 823 on the LCD screen 801. This mode depends on the properties of the current currency and the detectors fitted. For example, currencies with denominations with different short-edge dimensions can use the SD detector, whilst currencies with notes of the same size can only rely on the SMDS and IR detectors for denomination.

The banknotes must be of a denomination of a currency that has a denomination table stored within the device memory. As described in reference to the automatic denomination count mode, the denomination of each note is determined by detecting and comparing the properties of the note. The exact method of denomination will depend on the detector used. Details of each detector strategy are given in Section 2. If a banknote is detected that does not have an equivalent denomination an error is flagged to the user.

8.3.e Dispense Mode

This mode will count out a number of banknotes of a single denomination in order to provide a previously specified total value. Typically, the denomination is set as that of the note first fed into the machine. The banknote counter will then individually feed notes from the feed hopper and deduct the value of each note from the specified total value until the required amount has been with the remaining value displayed on the LCD display 801 dispensed or no notes remain in the feed hopper. The size of each subsequent banknote is then checked against the first fed note. Once an amount has been successfully dispensed the display 801 will show "DONE". If the dispensing operation cannot be completed successfully because the denomination set is larger than the remaining value required, the display will show "NEAR".

Alternatively, the user can set an amount to be dispensed and then enter a denomination as per Fixed Denomination mode. The banknote counter will feed in a number of notes and subtract the value of each note from the amount to be dispensed. If a denomination other than that entered by the user is detected the banknote counter will stop as per the other modes. Notes will continue to be dispensed until the amount to be dispensed is reached or no more notes can be dispensed without overshooting the total amount. In the latter case a user can enter a new, smaller denomination and continue to dispense notes if these notes are less than the remaining value to be dispensed. This process can continue for a number of notes of reducing value. The user also has the option of using automatic denomination rather than fixed denomination to select the denomination to dispense, i.e. the denomination can be set based on the first fed note of a bundle placed on the feed hopper. An example of this recursive dispensing operation is as follows: if 115 units of value needed to be dispensed, 5 notes of 20 units, 1 note of 10 units and 1 note of 5 units could be dispensed.

8.4 Feed Mode

The banknote counter allows three different feed modes for feeding in notes: manual, automatic and a combination of the two. The first two modes are selected by pressing the auto key 806. The current mode is displayed by the presence of automatic feed icon 826. In manual mode the notes placed on the feed hopper will be fed into the counter device and processed upon pushing the start/stop key 805 of the front display control panel. In auto mode the feed hopper IR sensor 652 is activated. When notes are placed onto the feed hopper this blocks the light emitted from the infrared LED of the IR sensor 652 and reflects the IR radiation back onto the photodiode. The signal from the photodiode is then used to indicate that notes have been placed onto the hopper and after a set time delay the notes will begin to be fed into the system. The time delay can be set by a supervisor selecting an auto start delay function, within which a delay can be set using the right 810 and left 812 arrow keys. The delay allows a user to safely remove hands from the machine before the feeder and transport motors begin operation.

The last mode is set by a remote computer when the banknote counter is on-line through the RS 232 connection. In this mode, after the banknote counter has been switched on or reset, the default feed mode is automatic. After one bundle of notes has been fed in this manner the banknote counter then resets to manual feed mode.

There is also an option to set an error delay, wherein after an error has been detected and flagged on the display 801 the feeding of notes will continue automatically after a set time delay. The error delay is typically shorter than the auto-start delay as banknotes are typically present on the feed hopper.

8.5 Detector Control

Each of the detectors mounted within the counting device can be individually switched on or off through the display control panel. To do this a user presses the detector key 808 upon the front panel, which displays the last accessed detector parameters. Subsequent presses of the detector key 808 allow the user to scroll through all of the available detectors on the current banknote counter. Once the required detector reference is displayed on the LCD display 801, keys 0 and 1 on the numeric keypad 813 or the denomination key 811 can be used to switch the detector off and on respectively. To confirm the edited detector parameter the start/stop key 805 can be pressed or a user can wait for the display to timeout.

An additional user shortcut is also provided, wherein if the detector key 808 is depressed for a set time, typically one or two seconds, all of the authenticity detectors within the banknote counter are deactivated, leaving only the detectors configured for denomination. This is useful if a user wants to perform a quick count or check without activating any of the authenticity detectors. To reactivate the detectors previously specified as active the user presses the detector key 808 a subsequent time.

8.6 External Operations

The counting device can be connected to a external computer or printer via one or more of the RS 232 ports 208 located on the back of the detector box.

This enables the following features:

8.6.a Manual Print/Remote Display

If the counting device is connected to a printer or remote display then the results of value operations can be output.

To select automatic printing, the total key 802 must be held down for a set time, typically one or two seconds. After this has been performed "print" will be displayed on the LCD display 801 and printing will be enabled.

A supervisor typically sets when data is printed and options include: on demand; when the stacker is emptied; and when both the stacker and feed hopper are empty. The supervisor also sets what totals are to be printed for each of these events, and whether to display all the denominations for a particular currency in the print out or only those denominations detected using a value count.

An example of the printed output is displayed in FIG. 8C, the number 831 and total value 832 of each denomination 830 are printed together with an overall total 833.

The functionality of the remote display operates in a similar manner to the print mode.

8.6.b External Computer Control

If a computer is connected to the RS 232 port then the results of count and/or value operations can be uploaded into various cash management systems running on the computer. In some modes the banknote counter will automatically configure to operate on-line without a user input. In other modes, the user must manually active the "on-line" functionality. To do this the auto key 806 must be pressed for a set time, typically one or two seconds, after which the current operating mode, either "offline" or "online" will be displayed on the display screen 801. The arrow keys 810, 812 are used to toggle between the two operations and again the start stop key 805 is pressed to confirm chosen mode or the user can wait for the display to time out. The counting device can be configured to connect to a remote computer automatically powering up or configured to wait until the online command is selected.

Examples of functions that can be provided when the banknote counter is 'on-line' are: transferring of total information; resetting total information; transferring status and error information; and remote operating parameter configuration.

8.7 Speed Adjustment

During operation a user may wish to reduce the speed that the counting device processes notes. For example, when counting very poor quality notes a lower speed must be used to prevent damage to the notes or erroneous readings from the detectors. The current operating speed is displayed by pressing the speed key 807. To cycle through the available speeds the speed key can be pressed repeatedly or the right 810 and left 812 arrows keys can be used. Once the required speed has been selected the start/stop key 805 can be pressed or a user can wait for the display to time out. Typical speeds that are available are 800, 1200, 1500, 1800 and 2000 notes per minute.

8.8 Currency Denomination Tables and Currency Selection

Each banknote counter can contain a number of different denomination look-up tables in memory, each table corresponding to a different currency. These denomination tables, as described earlier, will contain data specifying properties of each denomination of banknote within the currency; for example: value; size dimensions; UV fluorescence and reflectance parameters; IR image maps and locations of IR features; magnetic image maps and locations of magnetic features; metallic thread properties; and note thickness. These properties are then interrogated by the main processor during denomination and/or authentication of any particular note.

In some operational modes, the contents of the selected denomination/currency table is used to activate and/or disable selected detectors. For example, where the selected currency is US Dollars, the Size Detector (SD) and 3D Detector capabilities are not required since all US Dollar notes are the same size, regardless of denomination. In such a case, the table would contain data indicating that these characteristics of the note are not required to be measured. In response to this, the processor disables the SD and 3D detectors (see sections 2.5 and 2.6), provided the components are not required for any other detection process.

When the user switches between currency tables, a new set of detectors corresponding to the characteristics measurements required by the new table, is enabled. In "automatic" modes, selection of the currency/denomination table may be carried out by the processor if it initially has access to sufficient data to distinguish between currencies. If, during processing, the detected characteristics are found not to correspond to those stored in the selected denomination/currency table, an error message may be displayed and/or the user may be prompted to select an alternative table. In some modes, the processor itself may carry out a check to determine whether the note corresponds to another stored currency.

In some embodiments there is the option to use more than one currency on one banknote counter. In these cases a number of denomination tables for a plurality of currencies will be loaded into the memory of the counting device enabling a user to switch between different currencies. To do this, the user first presses and holds the denomination key 808 for a set time, typically one or two seconds, to display the current currency code. In denomination modes, subsequent presses of the denomination key 808 additional available currencies will be displayed on the screen 801. In piece mode no subsequent press is needed. One of the displayed currencies can be selected by pressing the start/stop key 805 or waiting for the display to time out. Alternatively, the currency codes can be selected by pressing the right 810 and left 812 arrows keys and again confirming the selection before. When a new currency setting is selected the detector settings and counting modes will automatically update to reference a new denomination table.

8.9 Error detection and display

There are a number of errors that can be detected by the banknote counter and relayed to the user. These are set out in turn below.

8.9.a Track Sensor Error—"Clear" Displayed

This error is shown when the IR sensors in either the feed hopper, stacker or transport are obscured by notes or dirt. The signal from each sensor is monitored, as is the current and/or voltage provided to the LED within the sensor, and these signals are used to detect a sensor error. If the current and/or voltage measurements signify that the LED is operating correctly, yet the sensor signal is other than that measured when covered or uncovered, then an error has occurred. Once this error message is displayed on the LCD display screen 801 a user can remove the notes from problem areas and/or clean the IR sensors.

8.9.b Feed Jam—"FEEd" Displayed

This indicates a feed error and often occurs when notes are stuck together in a feed bundle or are too thick for the set feed height of the feed mechanism. This is detected when the feed motor is measured as being operational, for example by measuring the supplied current and back EMF, and the feed hopper sensor is blocked, yet no notes are reaching the transport detectors. The displayed error instructs the user to remove any notes from the feed hopper and ensure that they are unstuck before re-feeding the notes. Alternatively, if the user is trying to feed notes that are too thick for the current feed height settings then the feed height must be adjusted as described in relation to the feed mechanism.

8.9.c Half Note Detection—"Half" Displayed

This is displayed when a half note is detected by the banknote counter. This is detected when two conflicting signals are measured on the left and right double detector sensors. Upon reviewing this error the user must remove and inspect the notes deposited in the stacker, remove any suspect notes from the bundle and re-feed the count. When the notes are re-fed the count display will return to zero or display the total when the stack was last emptied.

8.9.d Transport Jam—"JA" Display

This indicates that notes are jammed in the note transport. Like the feed jam this is detected when the transport motor is operational, determined by examining the timing wheel signal, yet no detectors within the transport pathway are activated by a passing banknote. When this error is displayed the machine must be switched off, the detector box released as described previously allowing access to the transport path, and the problem notes removed.

8.9.e Stacker Feed Error—"rFEED" displayed

This is displayed when the machine stops running due to an error with the stacker mechanism. This is detected by analysing the double detector signal in combination with the timing wheel signal and the count integrity. In this case all the notes must be removed from the stacker and the count must be repeated.

8.9.f Damaged or Degraded Notes—"ChEC" displayed

This is displayed when the machine has stopped working due to a damaged or degraded note. In this case all the notes must be removed from the stacker, any damaged note must be removed from a bundle and the notes recounted.

8.9.g Note Remaining in Transport—"LASt" Displayed

This is displayed when a note from a previous bundle of notes fed into the machine is left in the transport pathway. This is detected when both motors are determined to be off yet signals are still received from detectors mounted within the transport pathway. On highlighting this error the note(s) remaining within the transport path must be removed, possibly by opening the detector box assembly as previously described, and the count must be performed again.

8.9.h Multiple Notes—"GuLP" Displayed

This is displayed when three or more notes have passed together through the machine. This is detected by measuring a large double detector signal.

8.9.i Over Dispense—"oVER" Displayed

This is displayed in a mode when a higher value than originally requested has been dispensed.

8.9.j General Fault—"FAULT" Displayed

This is displayed when a general fault has been detected in the machine, such as when no signal is detected from an expected detector or any other general exception.

8.9.k Obstructed Sensors—"CLEAn" Displayed

This is displayed when dust or dirt from banknotes obstruct the machine sensors. In a similar manner to the track sensor the voltage and/or current used by the UV LEDs can be measured and compared with received detector signal levels, with and without notes in the transport pathway. In the case of this error, the machine must be opened as described and cleaned.

8.9.1 Obstruction on Double Detector—"CLEAn dd" Displayed

This is displayed when the machine has stopped as a result of dirt or dust on the double detector bearings or rollers. This is detected by analysing the double detector signals and looking for anomalous readings 8.9.m Double Detector Box is Open—"Lid" Displayed This is displayed when the detector box is opened, detected by switch 651 being open.

8.9.n Dispense Error—"nEAr" Displayed

This is displayed when the control circuitry detects that the value remaining to be dispensed is a less than the denomination being dispensed or the lowest value in a mixed denomination is set.

8.9.o Detector Error—"n rdY det" Displayed

This is displayed when a selected detector fails to start properly. One of the icons 824 to 829 will flash depending on the affected detector.

8.9.p Counterfeit Error—"CF" n

This indicates that the note "n" down from the top of the bundle in the stacker hopper (1 indicating the top note) may be counterfeit. In this case the user should inspect the note and, if happy, press start to continue the count, or remove the notes and start again.

8.9.q Denomination Error—"dEn" n

This is displayed when the note n down in the bundle in the stacker hopper has not been denominated (1 indicating the top note). In this case the user should inspect the note and, if happy, press start to continue the count, or remove the notes and start again.

8.10 Supervisor and Engineering Mode

In order to change the sensitivity of detectors and select various operating parameters a supervisor mode is available. To access such a specific sequence of keys are pressed and a code is entered through the numeric keypad 813. The supervisor functions are selected by scrolling through a list of available functions shown on the display 801 by using the arrow keys 810 and 812. As well as being able to edit the detector parameters and autofeed delay parameters, printer settings, stacker limits, communication settings, beeper settings and recovery settings can all be altered by a supervisor. The functions of various detectors can also be locked in order to prevent their use during standard operation.

Engineering mode is accessed in a likewise manner and provides diagnostic functions.

9. OUTER PLASTIC HOUSING

The inner metallic chassis is covered by a plurality of plastic panels that provide the outer finish to the banknote counter and close off the inner mechanisms to a user. Right plastic side casing 902 covers the main control PCB 610 and power supply circuitry and left plastic side casing 903 covers the feeder and transport outer drive mechanisms. Front casing 901 contains front panel PCB 907 plus polymer key panel 908 and front label panel 909. The polymer key panel 908 typically comprises moulded rubber keys with integrated carbon pins. When a key is pressed these pins make contact with the front panel PCB 907 and the keys are designed to offer suitable resistance to pressure from a human operator, allowing the user to appreciate that a key has been pressed. Also attached to the front panel PCB 907 is the LCD display 801. The front panel PCB 907 contains the input/output (I/O) circuitry to control the LCD display 801 and process any keyed input. On the upper surface of the front casing 901 at the mouth of the feed section a reflective IR sensor 652 is mounted to detect the presence of banknotes in the feed hopper. This sensor comprises an infrared LED and a photodiode and is connected to the front panel PCB. The front panel PCB then routes this IR sensor information to the main processor PCB via a cable.

Additional side trim panels 912,913 and front trim panel 905 are then attached over each of the side casing panels 902, 903 and the lower stacker section 673 respectively.

Detector box casing 904 covers the PCBs and mechanisms mounted with the detector box.

Rear metal trim 906 is fastened to the detector box casing 904 and two feed adjusters 922 are clipped into respective slots on the detector box casing 904. These feed adjustors can slide laterally in order to adjust a guide width when feeding banknotes. Upper casing assembly 921 is fastened to either side of the housing side panels 602, 603 and sits above the detector box casing 904 when the detector box 200 is locked into position. Finally, a handle consisting of handle assembly pieces 911 is pivotally mounted to either side of the upper casing assembly 921 and pivots from a carrying position just offset from the vertical and a position flush with the back of the detector box casing 904 for standard use.

The handle also provides a rest for the movable detector box. When the detector box is released from the latch assemblies 603 and pivots about its connections to the side panels 602, 603, a small pin that extends perpendicularly from the side of the detector box casing 904 contacts a cam surface in the form of a curved depression in one of the handle assembly pieces 911. As the detector box casing 904 pivots further backwards, the small pin pushes against and moves along the edge of the curved depression, in turn pushing the handle upwards in a cam-like motion and providing a level of clearance between the handle and the detector box casing 904. At this position, the handle obstructs any further movement of the detector box relative to the rest of the counter, thereby allowing the detector box casing to rest against the handle assembly and permitting a user to access the upper portions of the transport pathway to clear blockages without turning the banknote counter around. The handle can be raised further by a user to allow the detector box to be fully opened.

The invention claimed is:

1. A document sensing assembly for detecting the passage of documents therethrough, the document sensing assembly comprising:
   a rotatably-mounted shaft, the shaft carrying at least one roller assembly mounted on the shaft;
   a guide surface, the at least one roller assembly cooperating with the guide surface to define a nip therebetween;
   sensing means for sensing deflection of the at least one roller assembly relative to the guide surface in response to a passage of one or more documents through the nip between the roller assembly and the guide surface;
   monitoring means for monitoring sensed deflections; and
   a keying block adjacent to one end of the shaft and fixed to the shaft, the keying block being shaped to permit a passage of the keying block through a correspondingly-shaped aperture when the shaft is in a first predetermined orientation, and to prevent the passage of the keying block therethrough when the shaft is not in the first predetermined orientation;
   wherein at least a portion of the shaft is configured to rotate eccentrically, so that rotation of the shaft moves the at least one roller assembly towards or away from the guide surface such that the size of the nip defined between the at least one roller assembly and the guide surface can be adjusted by the rotation of the shaft.

2. The document sensing assembly according to claim 1, wherein the guide surface comprises at least one guide roller opposing the at least one roller assembly.

3. The document sensing assembly according to claim 1, wherein the at least one roller assembly is mounted on the shaft by means including a resilient portion, such that a deflection of the at least one roller assembly relative to the guide surface causes a deflection of the resilient portion relative to the shaft, and the sensing means senses the deflection of the resilient portion relative to the shaft to determine the deflection of the at least one roller assembly relative to the guide surface.

4. The document sensing assembly according to claim 3, the sensing means being disposed within the shaft.

5. The document sensing assembly according to claim 4, wherein the at least one roller assembly includes a rigid member protruding into the shaft, the rigid member being radially movable relative to the shaft in response to deflections of the resilient portion, and cooperating with the sensing means.

6. The document sensing assembly according to claim 5, wherein the sensing means includes means for generating and receiving electromagnetic radiation, a material of the rigid member being such that upon the deflection of the resilient portion, a proportion of electromagnetic radiation received by the receiving means varies due to a movement of the rigid member.

7. The document sensing assembly according to claim 6, wherein the generating means comprises one or more light emitting diodes, and the receiving means comprises a phototransistor.

8. The document sensing assembly according to claim 5, wherein the at least one roller assembly comprises an inner race and an outer race surrounding a bearing means, the inner race being coaxial with the shaft and being supported on the shaft by the resilient portion.

9. The document sensing assembly according to claim 8, wherein the rigid member comprises a pin abutting an inner surface of the inner race and protruding through an aperture in the shaft.

10. The document sensing assembly according to claim 1, wherein the monitoring means includes a detection means for detecting whether the deflection of the resilient portion is caused by the passage of one or more sheets through the nip.

11. The document sensing assembly according to claim 1, wherein the sensing means is mounted in a housing which is slidable into and out of the shaft.

12. The document sensing assembly according to claim 1, further comprising two roller assemblies being mounted on the shaft and being spaced from each other.

13. The document sensing assembly according to claim 1, wherein the keying block is arranged such that the size of the nip between the roller assembly and the guide surface is greater when the shaft is in the first predetermined orientation than when the shaft is not in the first predetermined orientation.

14. A document handling apparatus comprising a first and second laterally spaced side walls and a document sensing assembly according to claim 1, the shaft being supported between the first and second side walls, the first side wall being provided with an aperture shaped to permit a passage of the keying block from a position between the first and second side walls through the first side wall when the shaft is in the first predetermined orientation, and preventing the passage of the keying block from a position between the first and second side walls through the first side wall when the shaft is not in the first predetermined orientation.

15. The document handling apparatus according to claim 14, wherein the keying block is provided with a protrusion and the aperture being shaped to engage the protrusion when the shaft is in a second predetermined position, thereby securing the document sensing assembly in a position.

* * * * *